United States Patent
Dye et al.

(10) Patent No.: US 10,195,558 B2
(45) Date of Patent: Feb. 5, 2019

(54) FILTER SEALING ASSEMBLY AND FILTRATION VESSEL

(71) Applicants: Andrew Dye, Aledo, TX (US); Jack David Burns, Mineral Wells, TX (US); Eddie Blake Brown, Houston, TX (US); Bulent Turan, Fort Worth, TX (US)

(72) Inventors: Andrew Dye, Aledo, TX (US); Jack David Burns, Mineral Wells, TX (US); Eddie Blake Brown, Houston, TX (US); Bulent Turan, Fort Worth, TX (US)

(73) Assignee: PECOFacet (US), Inc., Mineral Wells, TX (US)

( * ) Notice: Subject to any disclaimer, the term of this patent is extended or adjusted under 35 U.S.C. 154(b) by 444 days.

(21) Appl. No.: 14/951,869

(22) Filed: Nov. 25, 2015

(65) Prior Publication Data
US 2017/0144094 A1    May 25, 2017

(51) Int. Cl.
*B01D 46/00* (2006.01)
*B01D 46/24* (2006.01)
*B01D 46/52* (2006.01)

(52) U.S. Cl.
CPC ....... *B01D 46/0005* (2013.01); *B01D 46/009* (2013.01); *B01D 46/2414* (2013.01); *B01D 46/52* (2013.01); *B01D 2265/024* (2013.01); *B01D 2265/027* (2013.01); *B01D 2271/027* (2013.01)

(58) Field of Classification Search
CPC ............ B01D 46/0005; B01D 46/2414; B01D 46/24; B01D 46/2403; B01D 46/2407; B01D 46/2411; B01D 2265/024; B01D 2265/027; B01D 2271/027; B01D 46/4227
See application file for complete search history.

(56) References Cited

U.S. PATENT DOCUMENTS

| | | |
|---|---|---|
| 4,948,737 A | 8/1990 | Quenin et al. |
| 5,893,956 A | 4/1999 | Perry, Jr. et al. |
| 5,919,284 A | 7/1999 | Perry, Jr. et al. |
| 6,168,647 B1 | 1/2001 | Perry, Jr. et al. |
| 6,506,302 B2 | 1/2003 | Janik |
| 8,062,523 B2 | 11/2011 | Cloud et al. |
| 8,293,106 B2 | 10/2012 | Cloud et al. |

(Continued)

FOREIGN PATENT DOCUMENTS

WO    WO 2012/153117 A1    11/2012

*Primary Examiner* — Robert Clemente
(74) *Attorney, Agent, or Firm* — Reinhart Boerner Van Deuren P.C.

(57) ABSTRACT

A filter element is provided with a cartridge locating system. The filter element includes a closed end cap and an open end cap with a tubular ring of filter media disposed between the end caps. The filter element includes an annular seal that can seal to round and non-round sealing surfaces and acts to block fluid flow between the open end cap and a pipe assembly in a pressure vessel assembly. A support bar is enclosed by the filter media and has a key. The filter element has a key receptacle to receive the key of the support bar. The user knows that the seal between the filter element and the pipe assembly is fully aligned and engaged when the key from the support bar fully enters the key receptacle of the filter element.

34 Claims, 31 Drawing Sheets

(56) References Cited

U.S. PATENT DOCUMENTS

| | | |
|---|---|---|
| 8,499,939 B2 | 8/2013 | Cloud et al. |
| 8,936,661 B2 | 1/2015 | Burns et al. |
| 8,961,644 B2 | 2/2015 | Burns et al. |
| 2004/0182777 A1 | 9/2004 | Stankowski et al. |
| 2005/0172590 A1 | 8/2005 | Burns et al. |
| 2005/0172810 A1 | 8/2005 | Burns et al. |
| 2009/0049814 A1* | 2/2009 | Baseotto et al. ..... B01D 46/009 55/482 |
| 2010/0000934 A1 | 1/2010 | Brown |
| 2010/0140176 A1 | 6/2010 | Krogue et al. |
| 2012/0210688 A1* | 8/2012 | Burns et al. ....... B01D 46/0024 55/483 |
| 2013/0025246 A1 | 1/2013 | Burns et al. |
| 2013/0055693 A1 | 3/2013 | Clarke et al. |
| 2013/0062273 A1 | 3/2013 | Burns et al. |
| 2015/0089909 A1 | 4/2015 | Burns et al. |

* cited by examiner

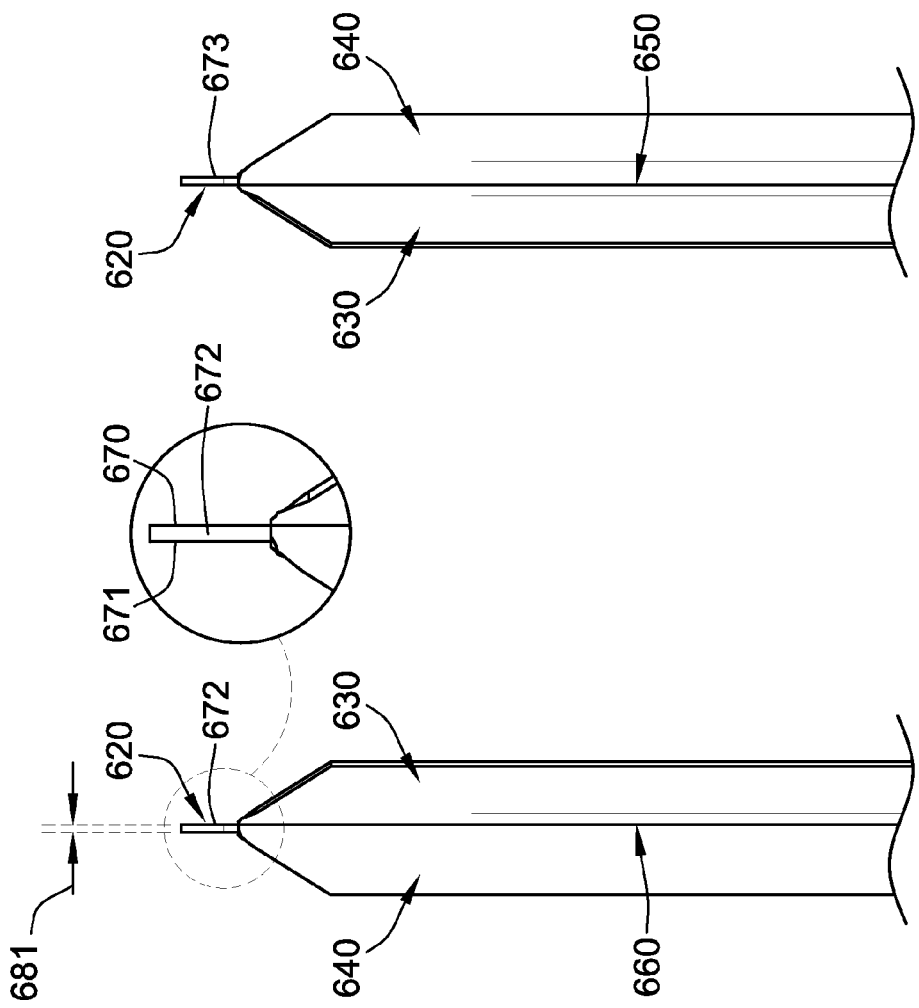
FIG. 11
FIG. 10
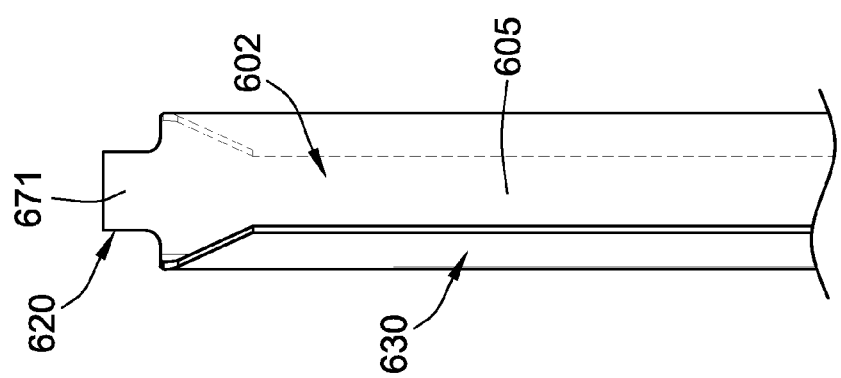
FIG. 9

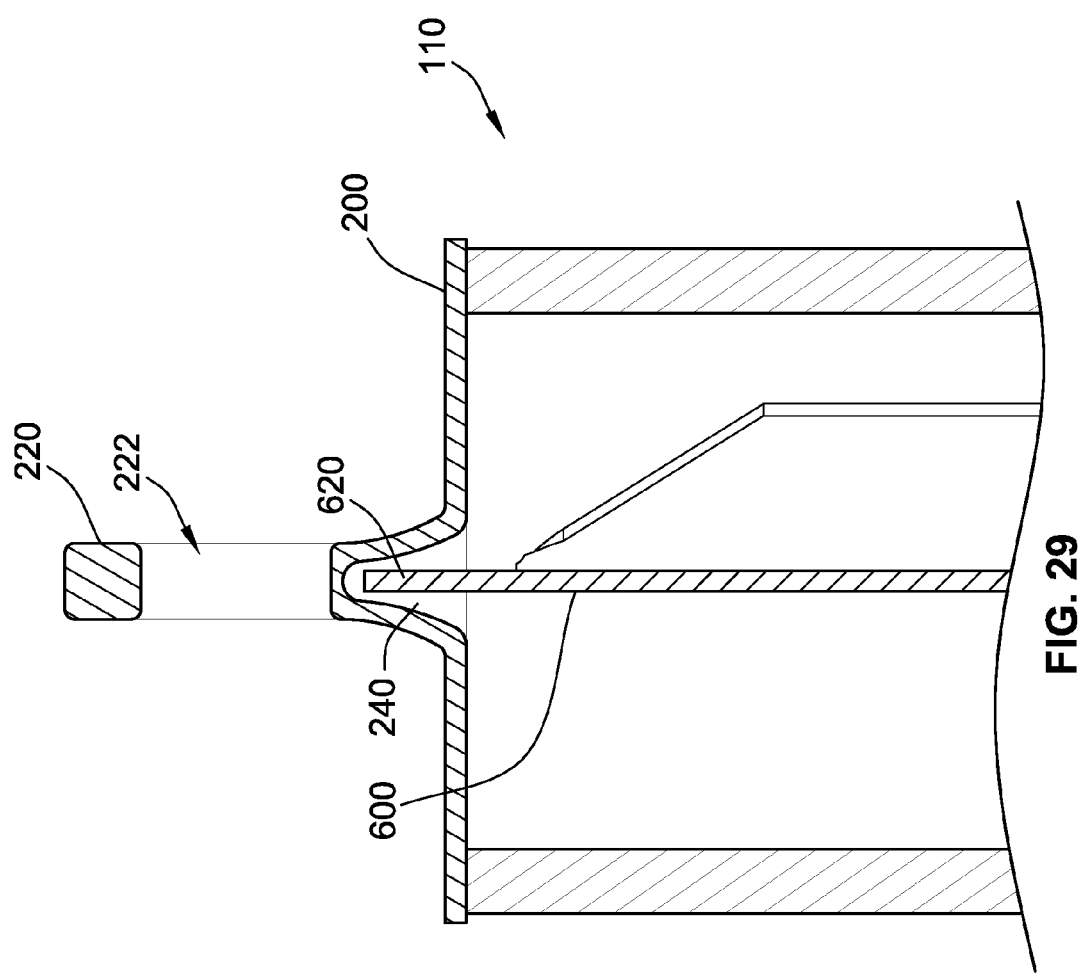

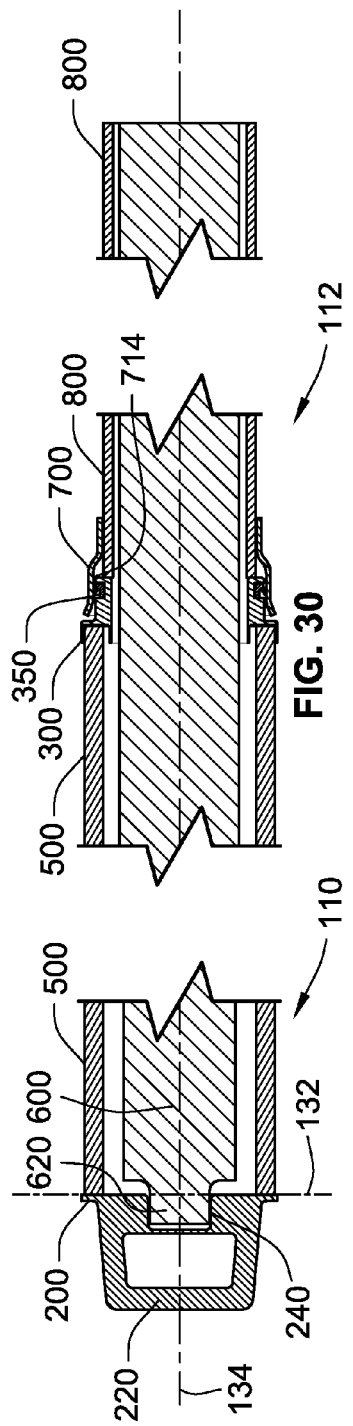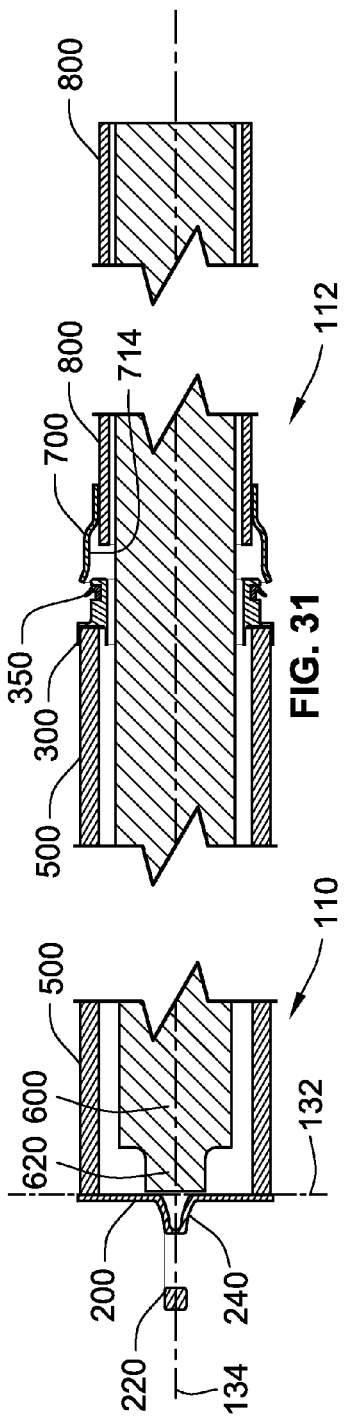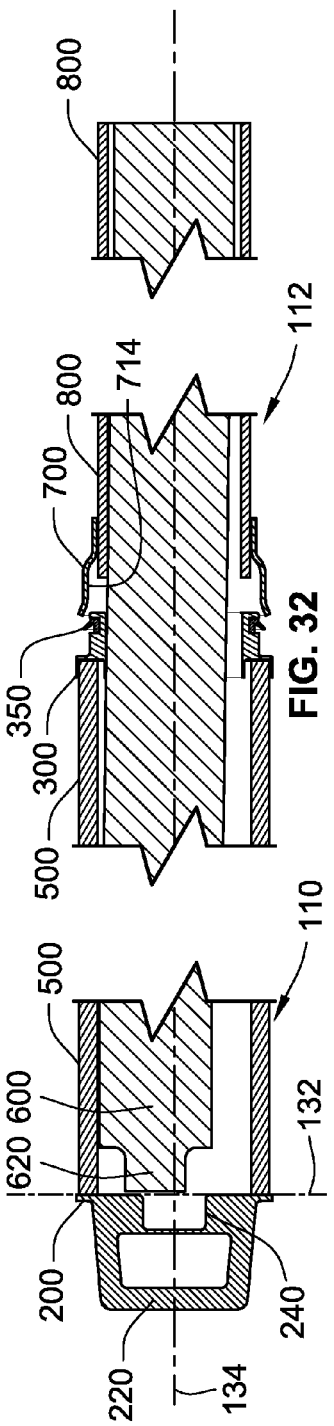

FILTER SEALING ASSEMBLY AND FILTRATION VESSEL

FIELD OF THE INVENTION

This invention generally relates to filters, and more specifically to filters having seals, and methods for installing the same reliably and/or more easily.

BACKGROUND OF THE INVENTION

Natural gas is used as a fuel generating over 27% of the total U.S. power supplied by electricity. It is also used in factories, homes, chemical processing plants and refineries as a fuel or feed stock. Once produced, natural gas is dehydrated, processed, compressed and transported from natural gas wells to points of use through extensive pipeline networks.

Natural gas naturally contains solid and liquid contaminants from production reservoirs. As it also picks up contamination from dehydration, processing, and compression operations, natural gas requires multiple stages of contaminant removal through filtration and separation processes. The filtration separation stages are located prior to and following dehydration, processing, and compression plants located along the pipeline networks.

A filter separator is a pressure vessel that directs a gas stream to travel through multiple filter elements, configured in a parallel arrangement, such that the gas stream is divided to equally flow through the filter elements. The filter elements are constructed of a porous filter media and may be supported by a plastic or metal flow support core and sealed on each end by caps with a gasket attached to seal the cartridges to sealing surfaces within the pressure vessel. Positive, robust cartridge sealing is required to force the entire gas stream through the filter media, not allowing contamination to bypass the filter media and travel downstream.

As the gas stream travels through the filter media, solid particles will be stopped and captured on and within the filter media. Small liquid droplets and aerosols will travel with the gas stream relatively equally to each of the filter elements. As the gas stream enters the porous filter media, the liquid aerosols and mist will be trapped within the filter media. The liquid aerosols and mist trapped within the filter media will converge together and join forming larger liquid droplets. The converging of liquid droplets within a filter media to form larger droplets is a process referred to as coalescing.

The filtered gas stream will exit the filter media with the larger coalesced liquid droplets. Once the gas stream exits the filter media, it will normally travel to a mist extraction device configured within the same pressure vessel. The mist extraction device can be an impaction-type high surface area structure such as a wire mesh pad or a vane-type separator, or a bank of cyclonic devices designed to extract liquid droplets from the filtered gas stream. Filter elements trap and remove solid particles and receive smaller liquid droplets and aerosols, coalesce them, and release them as larger liquid droplets. The coalescing mechanism creates liquid droplets that are large enough to be effectively removed by the unit's second stage mist extractor.

The filter separator filters solids and separates liquids from a gas stream. Filter separators have been considered as standard equipment in the natural gas industry since the 1950's and can be found on most, if not all, natural gas pipelines.

A typical filter element sealing assembly includes a cartridge-sealing seat welded to a flow pipe, a support bar, a threaded bolt, seal plate, nut, washer, and gasket. The flow pipe will be welded to a support plate that will be welded to the pressure vessels inside surface. The support plate will separate the pressure vessel's first stage from its second stage and will act as a stopping point designed to force the unfiltered gas through the filter elements sealed on the filter element sealing assembly. The filter element slides over a "z" shaped support bar.

Once fully engaged, the filter element seal gasket will contact the sealing assembly. Next, a seal plate will be installed and pressed up against the filter element's opposite end, followed by a gasket, washer, and sealing nut. The sealing nut will be tightened to compress the sealing plate against the filter element and the filter element against the sealing seat. The process to replace a typical filter element in the prior art is typically slow, but provides a positive seal of the filter element preventing contaminant bypass.

Furthermore, the process is dependent on the operator following instructions, including properly installing the filter element and the associated hardware. For example, the operator needs to apply the appropriate amount of torque to the sealing nut to form a positive seal between the filter element and the sealing seat. If the operator over-torques the sealing nut and the filter element compresses the support core to the point that it bends and loses contact with its sealing surface contaminant bypass will occur. Once the contact is lost between the support core and the sealing surface it will allow contaminants to bypass the filter media. As torque wrenches are not normally available to the operator, it leaves trying to determine the narrow sealing torque gap up to the operator's feel and judgment. This makes the improper installation of the filter element assembly a possible occurrence that could result in contaminants being able to bypass the filter media.

Thus, there remains a need for a filter element with sealing technology that eliminates the need for an operator to estimate the amount of torque required to properly seal a filter element on the sealing seat, while also limiting the need to use hardware to effectively and efficiently replace filter elements in pressure vessel assemblies. The invention provides such a filter element sealing assembly. These and other advantages of the invention, as well as additional inventive features, will be apparent from the description of the invention provided herein.

BRIEF SUMMARY OF THE INVENTION

According to one aspect of the present application, a filter element is provided having a tubular ring of filter media that extends axially along a central axis between front and rear ends. The tubular ring of media has an inner cavity. The filter element has an open end cap secured to the front end and there is an opening through the open end cap. An annular seal is in surrounding relation to the external perimeter of the open end cap. The filter element also has a closed end cap that is secured to the rear end of the tubular ring of filter media. The closed end cap acts to enclose the inner cavity at the rear end. The closed end cap having an internal surface along the inner cavity and an external surface facing away from the inner cavity. The filter element having a key receptacle arranged along or proximate to the internal surface facing the inner cavity.

According to another aspect of the present application, the key receptacle may be spaced away from the tubular ring of filter media.

According to another aspect of the present application, the key receptacle may intersect the central axis.

According to another aspect of the present application, the key receptacle can be formed by a continuous or discontinuous surrounding wall that defines a slot. The slot may extend in a transverse axis that is perpendicular to the central axis such that the slot intersects the central axis.

According to another aspect of the present application, the filter element may also contain an annular well structure with an inner and outer annular wall projecting from a disc portion of the annular well structure of the open end cap. The tubular ring of filter media can be telescopically received by the annular well structure and can be bonded to the annular well structure.

According to another aspect of the present application, the key receptacle can also be formed from a continuous or discontinuous wall that is distinct from the well structure and projects from the closed end wall toward the front end.

According to another aspect of the present application, the rear end of the tubular ring of filter media may be integrally welded to the closed end wall of the closed end cap so that the key receptacle is formed by a continuous wall defining a slot that projects from the closed end wall and away from the front end.

According to another aspect of the present application, the closed end cap can have an imperforate central region covering the inner cavity without any holes, which prevents fluid communication through the closed end cap.

According to another aspect of the present application, the closed end cap can also have a handle that projects from the external surface that is opposite the key receptacle. The key receptacle may extend along a transverse axis that is extendingly perpendicular to the central axis and the handle can be aligned with the transverse axis.

According to one aspect of the present application, the handle can define a loop structure secured to the closed end wall of the closed end cap and defining a through opening sized to be grasped.

For improving these types of filter applications as contemplated in the Background of the Invention, the filter element may also contain an axial length between the open end cap and the closed end cap that can be in the range of 12 and 120 inches.

According to another aspect of the present application, the key receptacle of the closed end cap and key of a support bar may provide a positive visual indication of a full seal engagement between the annular seal and a sealing wall, due to the full insertion of the key within the key receptacle.

In another aspect, the closed end cap has an axis of rotation that is 360°. A full seal engagement between the annular seal and a sealing wall can be determined by the location of the handle about its 360° axis of rotation.

In another aspect, when the key is inserted into the key receptacle it causes the annular seal to compress radially with a sealing wall (e.g. "a radial seal"), thereby ensuring a proper compression of the annular seal against the sealing wall.

Another aspect of the present application provides a pressure vessel assembly that implements a filter element disclosed by the present application according to another embodiment or aspect herein. The pressure vessel can have an external shell having an inlet port and an outlet port. The pressure vessel may also have a partition plate dividing the shell into an inlet side connected to the inlet port and an outlet side connected to the outlet port. The partition plate can define at least one hole.

In such a pressure vessel, a pipe assembly can be connected to a hole in the partition plate and extend in at least one of the inlet and outlet sides. The pipe assembly can have an annular axial abutment and an annular sealing wall extending from the axial abutment with the axial distance in surrounding relation of the axial abutment. There can also be a support bar fixed relative to the pipe assembly and extending concentrically relative to the annular sealing wall and axially away from the axial abutment.

In certain embodiments, the tubular ring of media of the filter element can be received on the support bar with the support bar projecting in the inner cavity. The support bar can project through the opening of the inner cavity. The annular seal can create a seal against an inner periphery surface of the annular sealing wall in a fully installed position.

According to another aspect of the present application, the annular seal may create a seal against the inner wall of the pipe or sealing cup or sealing wall of the pipe assembly.

According to another aspect of the present application, the annular seal may create a seal against a sealing wall of the pipe assembly.

According to another aspect of the present application, the annular seal may create a seal against a sealing wall of a seal cup.

According to another aspect of the present application, the annular seal may create a seal against an external wall of the pipe of the pipe assembly.

According to another aspect of the present application, the annular seal may create a seal against an internal wall of the pipe of the pipe assembly.

According to another aspect of the present application, the pressure vessel assembly may also have a back flow plate or lid arranged in axial spaced relation to the axial abutment and separated by a first maximum axial length in a closed position. The back flow plate or lid can be moved from the closed position to an open position. The filter element can be installed and removed from the pressure vessel when in the open position, and the back flow plate or lid will not be able to return to the closed position when the filter element is installed in the pressure vessel without the annular seal sealing on the annular sealing wall. This arrangement can ensure a proper seal engagement.

According to one aspect of the present application, the second maximum axial length that is defined as the axial length between the open end cap and the closed end cap of the filter element.

According to one aspect of the present application, the second maximum axial length being less than the first axial length and being no less than the first axial length minus the axial distance.

According to another aspect of the present application, the pressure vessel assembly may have a back flow plate or lid arranged in axial spaced relation to the axial abutment and separated by a first axial length in a closed position. The back flow plate or lid can be moved from the closed position to an open position. The filter element can be installed and removed from the pressure vessel when in the open position, and the back flow plate or lid will not be able to return to the closed position when the filter element is installed in the pressure vessel without the annular seal sealing on the annular sealing wall.

According to another aspect of the present application, the pressure vessel assembly may also have a second maximum axial length that is defined as the axial length between the open end cap and the closed end cap of the filter element, the second maximum axial length being greater than the first maximum axial length and being no greater than the first maximum axial length minus a maximum axial distance of a sealing surface.

According to another aspect of the present application, the maximum axial distance being defined as the axial distance of the annular sealing wall.

According to another aspect of the present application, the second maximum axial length being less than the first maximum axial length and being no less than the first axial length minus the axial distance.

According to another aspect of the present application, the support bar has a key. The key receptacle and the key provide a positive visual indication of a full seal engagement between the annular seal and the sealing wall, due to the full insertion of the key within the key receptacle.

According to another aspect of the present application, the support bar has a key. The closed end cap has a handle and the closed end cap has an axis of rotation that is 360°. Further, it can be determined by the location of the handle about its 360° axis of rotation when a full seal engagement between the annular seal and the sealing wall has been made.

According to another aspect of the present application, where the support bar includes a key and the engagement of the key and the key receptacle positions the annular seal perpendicularly to the annular sealing wall, thereby ensuring a maximum compression of the annular seal against the annular sealing wall.

According to another aspect of the present application, a method of using the filter element in the pressure vessel assembly comprising aligning the key receptacle with a key located on the support bar by rotating the closed end cap until the key receptacle is aligned with the key and is stationary along a transverse axis.

According to another aspect of the present application, the method further comprises providing an axial force to the closed end cap, whereby the axial force moves the filter element in a longitudinal direction towards a pipe assembly turning the key into the receptacle.

According to another aspect of the present application, the method further comprising inserting the second end cap into a seal cup defining the sealing wall causing the annular seal to contact the sealing wall, thereby, creating a seal that prevents fluid from leaking between the second end cap and the annular sealing wall.

According to another aspect of the present application, filter element is provided that can be installed and removed from a pressure vessel. The pressure vessel comprising an external shell that can have an inlet port, and an outlet port. The pressure vessel can have a partition plate dividing the shell into an inlet side connected to the inlet port and an outlet side connected to the outlet port. The partition plate can define a hole, and a pipe assembly can be connected to the hole. The pipe assembly may also include a pipe extending in at least one of the inlet and outlet sides with a seal cup secured to the pipe. The pipe assembly can include an annular axial abutment and an annular sealing wall extending from the axial abutment at an axial distance and in surround relation of the axial abutment. There may also be a support bar fixed relative to the pipe assembly and extending concentrically relative to the annular sealing wall and axially away from the axial abutment. Further, there can be a back flow plate or lid arranged in axial spaced relation to the axial abutment and separated thereby by a first maximum axial length in a closed position.

The filter element can have a tubular ring of filter media extending axially between front and rear ends. The tubular ring of media defining an inner cavity that is sized and configured to receive the support bar. The filter element may also have an open end cap secured to the front end. The open end cap can define an opening that is sized and configured to receive the support bar. The filter element can also contain an annular seal mounted to the open end cap in surrounding relation to the opening of the open end cap. The annular seal may have an outer periphery sized to be received and seal against the annular sealing wall. The filter element may also have a closed end cap secured to the rear end and enclosing the inner cavity at the rear end. The filter element can have a second maximum axial length defined as the axial length between the open end cap and the closed end cap. The second maximum axial length can be less than the first maximum axial length and, being no less than the first maximum axial length minus the maximum axial distance.

According to another aspect of the present application, the filter element may also include a closed end cap having an imperforate central region covering the inner cavity without any holes, which prevents fluid communication through the closed end cap.

According to another aspect of the present application, the closed end cap may also include a key receptacle that is adapted to receive a key lug projecting from the support bar at a predetermined angular orientation.

According to one aspect of the present application, the closed end cap may also have a handle projecting from a side opposite the key receptacle, where the key receptacle extends along a transverse axis that is transverse to the second maximum axial length, the handle being aligned in the transverse axis.

According to one aspect of the present application, the filter element may have a second maximum axial length in the range between 12 and 48 inches.

According to another aspect of the present application, the filter element may have a second maximum axial length in the range between 78 and 120 inches.

According to another aspect of the present application, a filter element is provided for use with a pressure vessel assembly. The pressure vessel assembly comprising an external shell having an inlet port, and an outlet port. The pressure vessel assembly having a partition plate dividing the shell into an inlet side fluidly connected to the inlet port and an outlet side fluidly connected to the outlet port. The partition plate having at least one hole that a pipe assembly may couple to. The pipe assembly having an annular sealing wall.

The filter element for use in the pressure vessel having a tubular ring of filter media extending axially along a central axis between front and rear ends with the tubular ring of media defining an inner cavity. The filter element having a first end cap secured to the front end. The filter element having an annular seal arranged in surrounding relation to the second end cap. The second end cap being secured to the rear end of the tubular ring of filter media. The filter element having an aligning means integrated into the filter element for aligning the annular seal of the filter element to form a proper sealing relationship with the annular sealing wall of the pipe assembly.

According to one aspect of the present application, the aligning means of the filter element may comprise a handle on the first surface of the closed end cap. The handle defining a loop structure that defines a through opening that is sized to be grasped.

According to another aspect of the present application, the aligning or location means of the filter element may comprise a key receptacle located on the second end cap and a key located on a support bar. The second end cap capable of being rotated to align the key receptacle with the key, thereby providing the correct alignment of the filter element during installation. According to another aspect of the present application, the aligning means may comprise the external shell of the pressure vessel having a back flow plate or lid that is located in a close proximal relationship to the second end cap when the end cap is installed. The second end cap can have a key receptacle and a support bar having a key. The second end cap will interfere with the closure of the back flow plate or lid unless the key of the support bar is inserted into the key receptacle of the second end cap.

According to one aspect of the present application, a method for installing the filter element into a pressure vessel comprising pushing the filter element along a central axis into sealing engagement with the pressure vessel where the pressure vessel has an annular sealing wall that engages an annular seal of the filter element. The method further comprising, installing the filter element over a support bar with the support bar being received into an internal cavity of the filter element. The method further comprising, closing a back flow plate or lid of the pressure vessel that is arranged in spaced relation to the sealing engagement and over an end of the filter element, where the flow plate or lid will not properly close if the filter element is not properly in sealing engagement.

According to another aspect of the present application, the method may also include keying a key and lock between the filter element and the support bar to allow for installing and if the keying is not conducted, the flow plate or lid will not close properly.

According to another aspect of the present application, the method may also include rotating the filter element to facilitate the keying, where the filter element has an end cap defining a key receptacle to provide the lock and the support bar includes the key that rides along the end cap and outside of the receptacle until rotated into alignment with the key receptacle.

According to another aspect of the present application, the method may also include using an end cap that has a handle and then manipulating the handle to align the key receptacle and the key.

According to another aspect of the present application, the method may also include using a plurality of filter elements that are installed in the pressure vessel, each filter element having a handle, and when the filter elements are installed properly all of the handles have a long axis that align in an orientation parallel to each other.

According to another aspect of the present application, the method may also include using a key which has a necked down end portion projecting at the terminating end of the support bar.

According to another aspect of the present application, the method may also include using a filter element where the annular seal is a radial seal and the annular sealing wall of the pipe assembly has a sealing surface extending over an axial span to allow the filter element to slide in sealing engagement with the pipe assembly.

According to another aspect of the present application, the method may also include using a sealing wall that is sized such that when the flow plate or lid is properly closed the filter element can slide along the sealing wall over a range of axial movement in sealing engagement with the sealing wall and will engage the flow plate or lid that acts as a stop to limit the movement of the filter element within the range of axial movement to ensure proper sealing engagement.

According to another aspect of the present application, a method of installing a filter element into a pressure vessel can comprise pushing the filter element along a central axis into sealing engagement with the pressure vessel, where the pressure vessel has an annular sealing wall that engages with an annular seal of the filter element. The method further comprising, installing the filter element over a support bar where the support bar is received into an internal cavity of the filter element. The method further comprising, closing a back flow plate or lid of the pressure vessel that is arranged in spaced relation to the sealing engagement and over an end of the filter element, where the flow plate or lid will not properly close if the filter element is not in sealing engagement with the pressure vessel.

According to another aspect of the present application, the method may also comprise, keying a key and lock between the filter element and the support bar to allow for installing, such that if the keying is not conducted then the flow plate or lid will not properly close.

According to another aspect of the present application, the method may also comprise, rotating the filter element to facilitate the keying, where the filter element has an end cap defining a key receptacle to provide the lock and the support bar includes the key that rides along the end cap and outside of the receptacle until rotated into alignment with the key receptacle.

According to another aspect of the present application, the method may also comprise, a filter element having an end cap that has a handle and then manipulating the handle to align the key receptacle and the key.

According to another aspect of the present application, the method may also comprise a plurality of the filter elements that are installed in a pressure vessel, and each of the filter elements has a handle, and when the filter elements are installed properly then all of the handles have a long axis that align in the same orientation parallel to each other.

According to another aspect of the present application, the method may also comprise a key having a necked down end portion projecting at the terminating end of the support bar.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 9 is a back view of the support bar illustrated in FIG. 7;

FIG. 10 is a side view of the support bar illustrated in FIG. 7;

FIG. 11 is a side view opposite the view as illustrated in FIG. 9;

FIG. 29 is a side view of the filter element illustrated in FIG. 28 taken from a perpendicular view;

FIG. 30 is a partial perspective cross-sectional side view of one embodiment of a filter element and a pipe assembly of a pressure vessel assembly according to one aspect of the present application, showing the filter element correctly inserted into the pipe assembly;

FIG. 31 is a partial perspective cross-sectional view of one embodiment of a filter element and a pipe assembly according to one aspect of the application, showing an unsuccessful attempt at inserting the filter element into the pipe assembly because the key receptacle of the closed end cap is not aligned along the same axis of the key of the support bar;

FIG. 32 is a partial perspective cross-sectional side view of one embodiment of a filter element and a pipe assembly according to one aspect of the application, showing an unsuccessful attempt at inserting the filter element into the pipe assembly because the key receptacle of the closed end cap is not centered with the key of the support bar;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
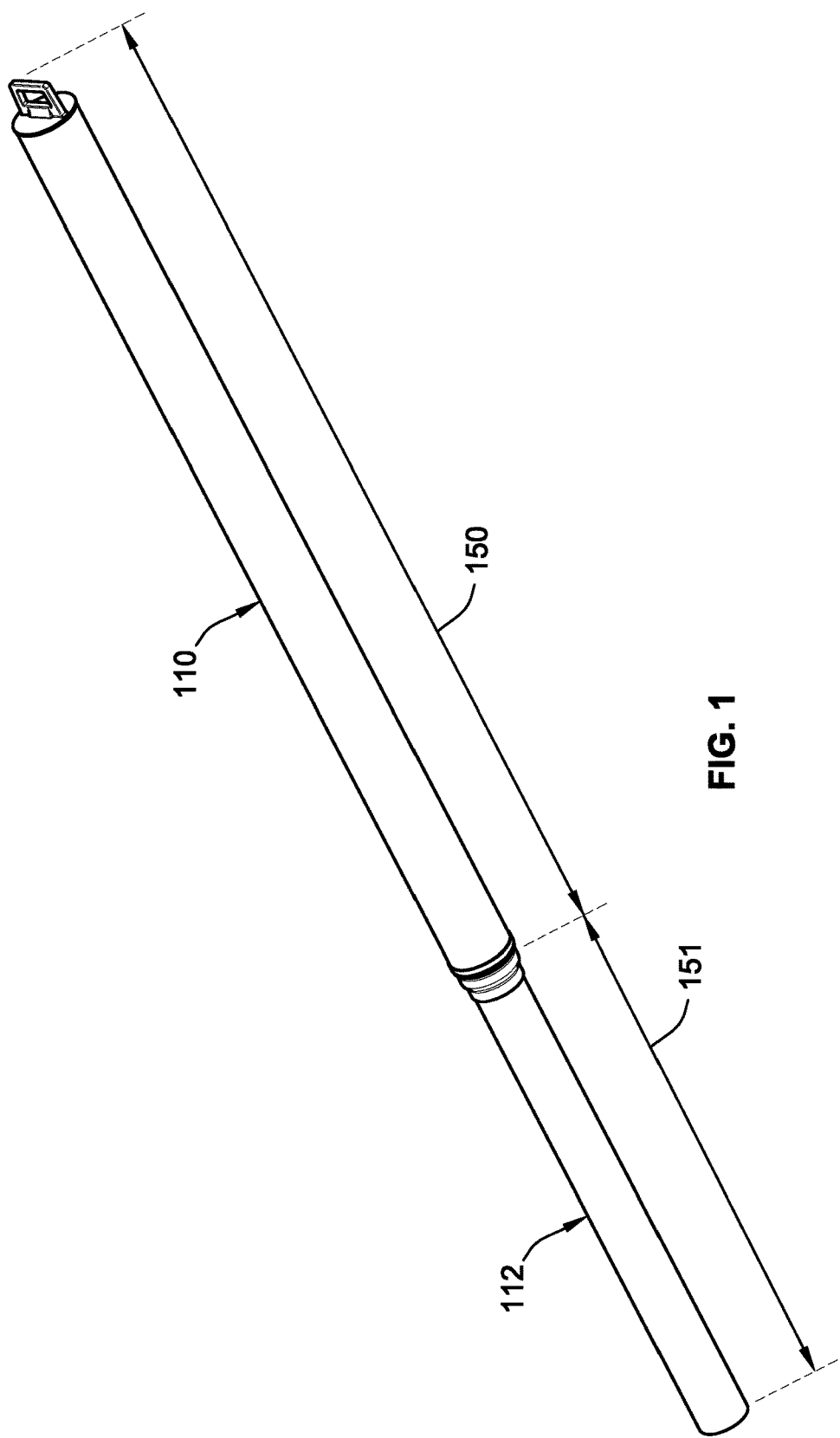
FIG. 1 is a perspective view of one embodiment of a filter element and a pipe assembly according to one aspect of the present application.

FIG. 1 illustrates one embodiment of a filter element 110 and a pipe assembly 112 according to one aspect of the present application. As illustrated, the filter element has an axial length that is generally indicated by 150. Likewise, the pipe assembly 112 has an axial length as generally indicated by 151.

In one exemplary non-limiting embodiment, the axial length 150 of the filter element 110 can be, but is not limited to, a range between 12 and 120 inches and the axial length 151 of the pipe assembly 112 can be, but is not limited to, a range between 4 and 100 inches.

However, in a more preferred exemplary non-limiting embodiment the axial length 150 of the filter element 110 can be, but is not limited to, a range between 12 and 80 inches and the axial length 151 of the pipe assembly 112 can be, but is not limited to, a range between 6 and 36 inches.

Figure 2:
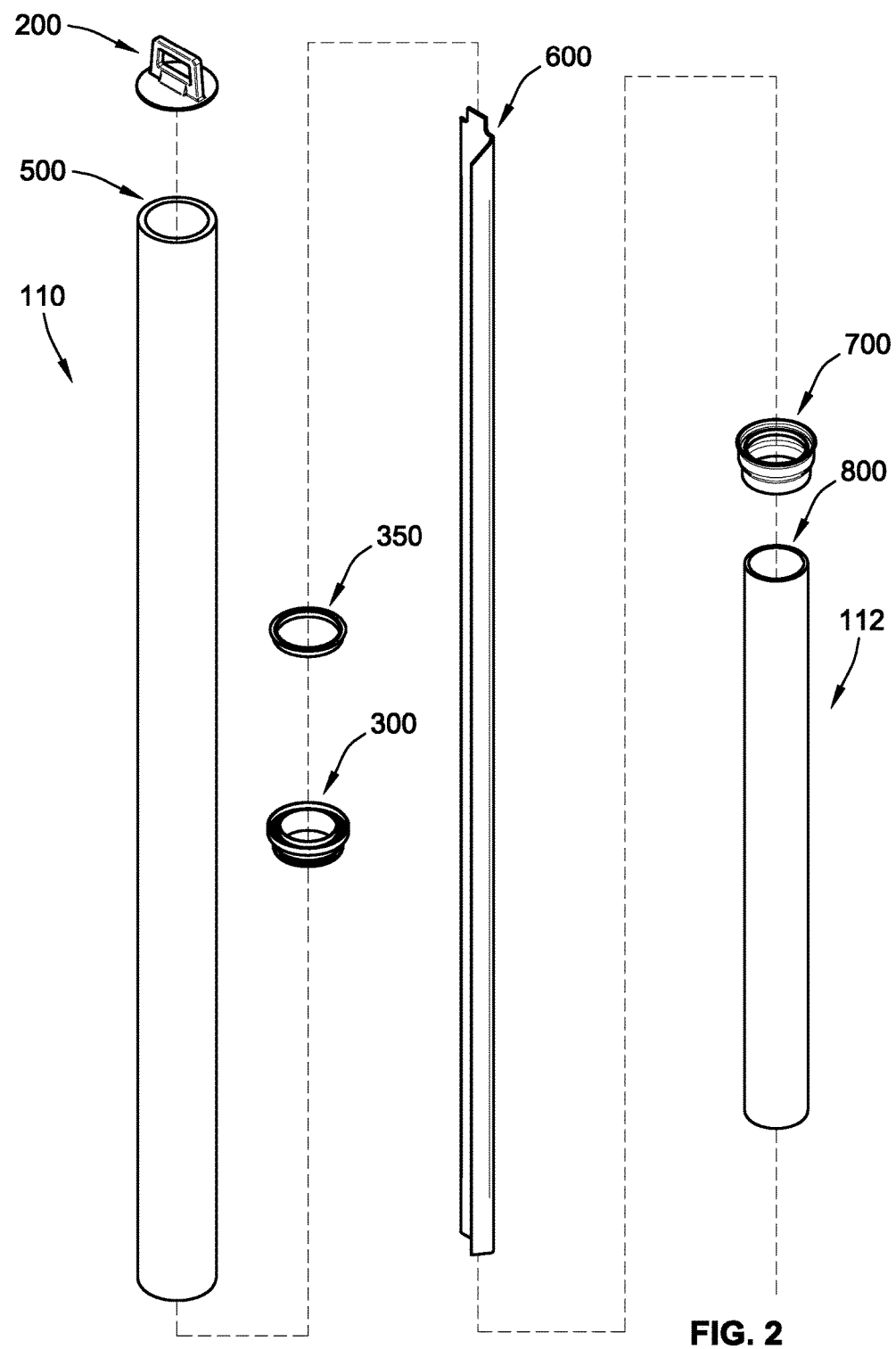
FIG. 2 is an exploded perspective view of the filter element and the pipe assembly illustrated in FIG. 1.
Figure 3:
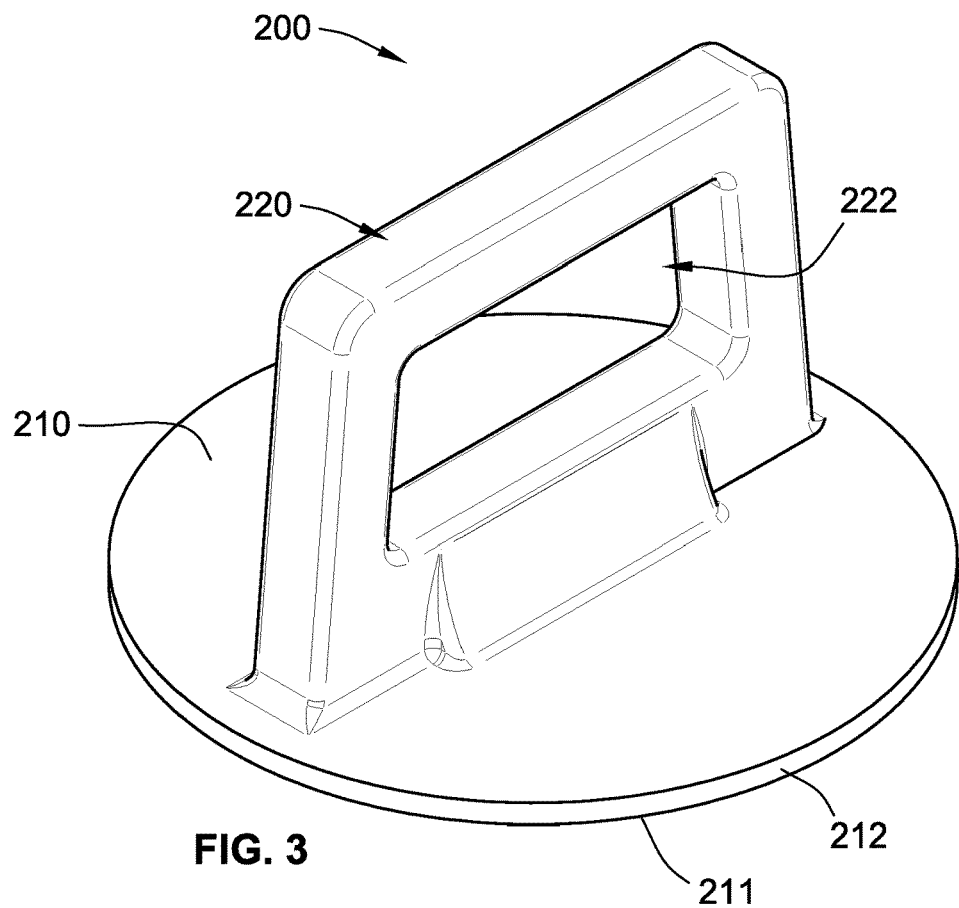
FIG. 3 is a perspective view of one embodiment of a closed end cap according to one aspect of the present application.
Figure 4:
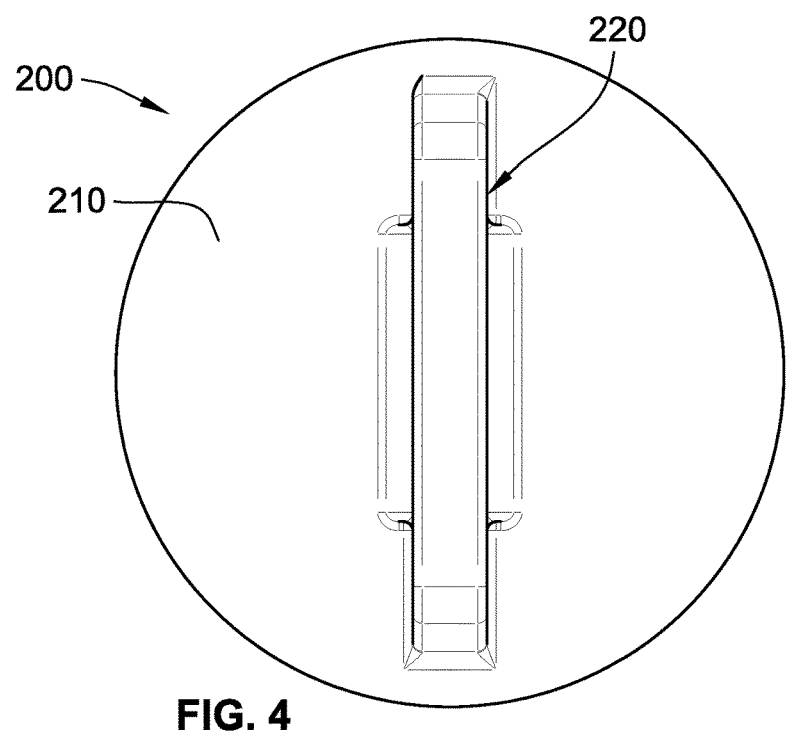
FIG. 4 is a top view (e.g. external surface) of the closed end cap illustrated in FIG. 3.

FIG. 2 illustrates an exploded perspective view of the embodiment of the filter element 110 and pipe assembly 112 illustrated in FIG. 1. The filter element 110 has a closed end cap 200 and an open end cap 300. The filter element 110 also includes a tubular ring of filter media 500. Tubular in this sense refers to the overall structure and does not refer to cylindrical or cylindrical structures. The closed end cap 200 and the open end cap 300 are coupled to the tubular ring of filter media 500 such as by, but not limited to, welding, potting, or adhesive attachment. Furthermore, FIG. 2 illustrates the annual seal 350.

FIG. 2 also one embodiment of the pipe assembly 112. The pipe assembly 112 has a pipe 800 and a seal cup 700 that can couple to the pipe 800. The pipe assembly 112 also has a support bar 600 fixed relative to the pipe assembly 112 that extends concentrically from the pipe 800.

FIGS. 3-6 illustrate the closed end cap 200. The closed end cap 200 has a first or external surface 210. Secured to the first or external surface 210 is a handle 220 that may be a loop structure having a through opening 222.

According to one aspect of the present application, the through opening 222 may have dimensions that allow it to be comfortably grasped by a human hand. However, as will be appreciated by one of ordinary skill in the art, the handle 222 may be any size or shape desired and may also be designed to be grasped by objects other than a human hand, such as, but not limited to, alignment or locating means commonly implemented during the replacement of filter elements.

Figure 5:
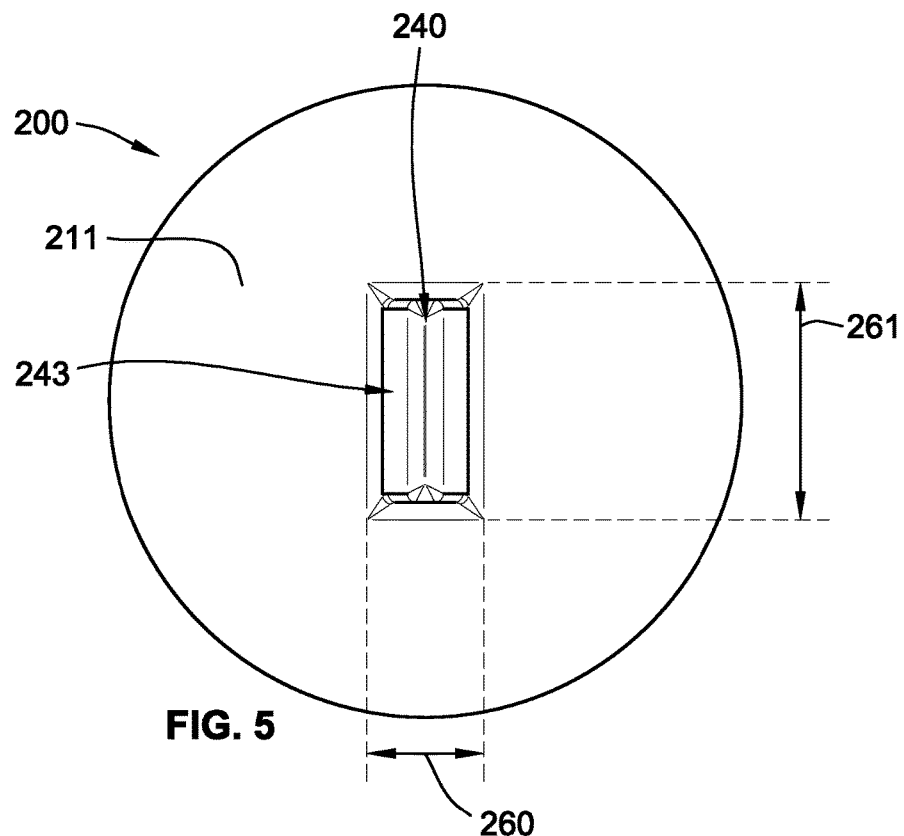
FIG. 5 is a bottom view (e.g. internal surface) of the closed end cap illustrated in FIG. 3.

FIG. 5 illustrates the second or inner surface 211 of the closed end cap 200. The second or inner surface 211 of the closed end cap 200 contains a key receptacle 240. The second or inner surface 211 of the closed end cap 200 has an aperture 243, which provides access to the key receptacle 240.

In one exemplary non-limiting embodiment, the aperture 243 may be, but is not limited to, a width 260 in the range between 0.125 and 2 inches, and a length 261 in the range of 0.5 and 4 inches.

However, in a more preferred exemplary non-limiting embodiment the aperture 243 may be, but is not limited to, a width 260 in the range between 0.25 and 1 inch; and a length 261 in the range between 1 and 3 inches.

Figure 6:
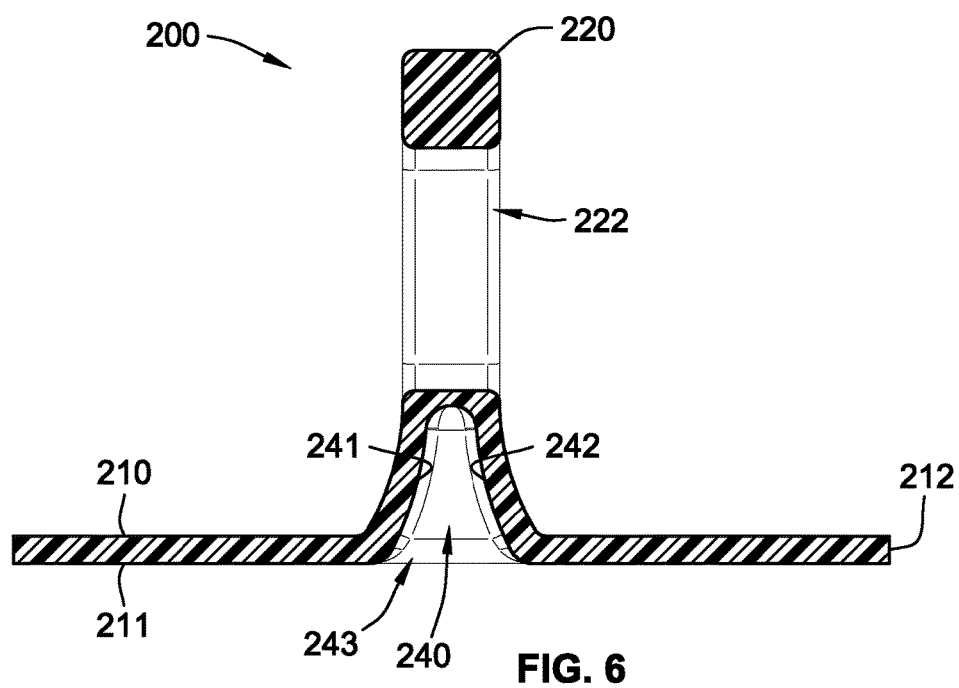
FIG. 6 is a cross-sectional side view of the closed end cap illustrated in FIG. 3.
Figure 7:
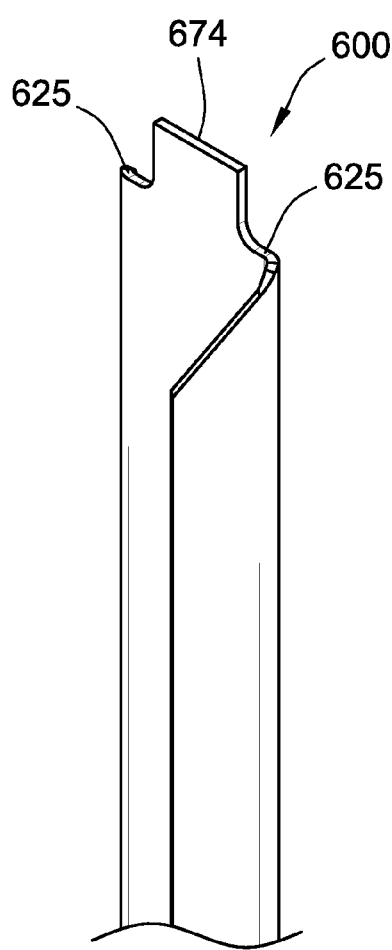
FIG. 7 is a perspective view of one embodiment of a support bar according to one aspect of the present application.

FIG. 6 illustrates a cross-sectional view of the closed end cap 200 and further illustrates the key receptacle 240 projecting into the handle 220 secured to the first or external surface 210 of the closed end cap 200. The first and second sidewall 241 and 242 are tapered so the key receptacle 240 becomes narrower as it extends away from the second or inner surface 211.

Figure 8:
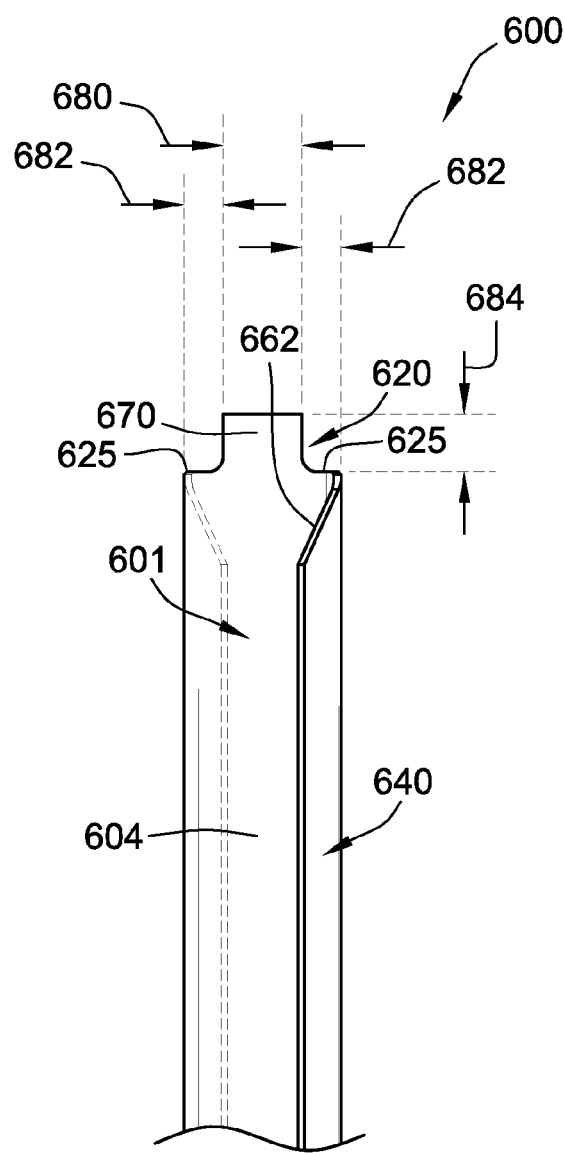
FIG. 8 is a front view of the support bar illustrated in FIG. 7.

However, as will be readily understood by one of ordinary skill in the art the shape and dimensions of the key receptacle 240 is not limited to those in the illustrated embodiment. Indeed, one of ordinary skill in the art will readily recognize that other embodiments governed by the principles of the present application can have key receptacles 240 of any shape or dimension desired. Furthermore, it will be appreciated by those of ordinary skill in the art that the tapered first and second sidewall 241 and 242 provides an alignment and centering function to correct misalignment by providing a wider entrance mouth for the key 620 (see FIG. 8) when aligning and inserting the key 620 into the key receptacle 240.

FIGS. 7-11 illustrate a partial view of one embodiment of a support bar 600 according to one aspect of the present application. The illustrated embodiment of the support bar 600 has a "z-configuration" having a first flat longitudinal surface 604 and second flat longitudinal surface 605. The support bar 600 also has a first inwardly extending flange 630 and a second inwardly extending flange 640. As illustrated, inwardly extending flange 640 projects inwardly toward flat surface 604 and inwardly extending flange 630 projects inwardly toward flat surface 605.

FIGS. 7-11 further illustrate one embodiment of a key 620 that can be a narrow long portion of the support bar 600 according to one embodiment of the present application. The key 620 is a part of the first flat longitudinal surface 604 and second flat longitudinal surface 605 and is formed after removing a portion of the support bar 600 to create shoulders 625, which allows the key 620 to contact inner surfaces 241 and 242 of the key receptacle (see FIG. 6).

As further illustrated in FIGS. 7-11, the key has a first long surface 670 and a second long surface 671. Disposed between the first long surface 670 and the second long surface 671 are short surfaces 672 and 673 respectively. Further, the key 620 has atop portion 674 that may contact the upper portion of the key receptacle 240 according to one aspect of the present application or be closely spaced, within typically a cm, although other possibilities exist.

In one exemplary non-limiting embodiment, the support bar 600 can have, but is not limited to having, a key 620 with a width 680 in the range of 0.25 and 3 inches; a depth 681 in the range of 0.1 and 0.25 inches; and a height 684 in the range of 0.25 and 4 inches.

However, in a more preferred non-limiting exemplary embodiment the key 620 may have, but is not limited to, a width 680 in the range of 1 and 3 inches; a depth 681 in the range of 0.1 and 0.125 inches; and a height 684 in the range of 1 and 2 inches.

However, as will be appreciated by one having ordinary skill in the art, in other embodiments governed by the principles of this application the width 680, depth 681, and height 684 of the key 620 can be any desired dimension above or below the ranges described above.

As will further be understood by one of ordinary skill in the art, the width 680, depth 681, and height 684 of the key 620 will also typically be determined by the shape and dimension of its corresponding key receptacle 240 and vice versa although the key receptacle 240 may be slightly larger to provide clearance for the key 620. Therefore, as will be understood by one having ordinary skill in the art, both the key 620 and the key receptacle 240 may have any shape or dimension required to accommodate one another.

Figure 12:
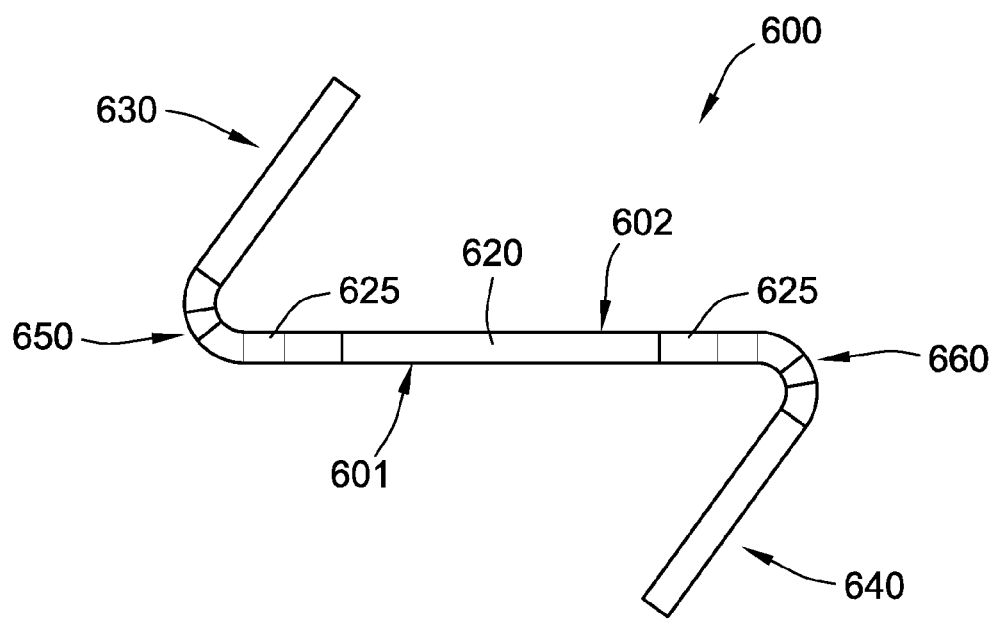
FIG. 12 is a top view of the support bar illustrated in FIG. 7.
Figure 13:
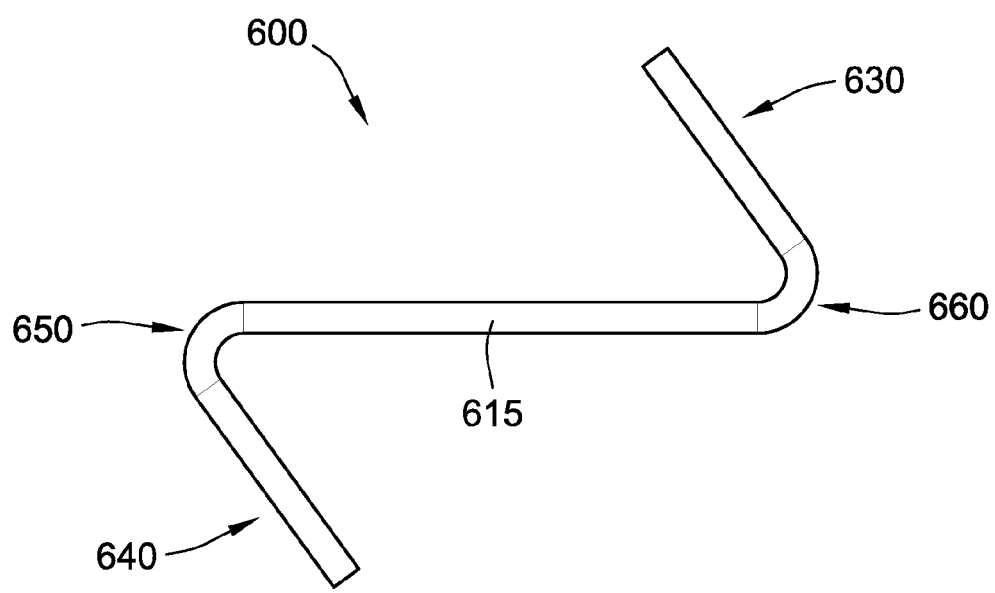
FIG. 13 is a bottom view of the support bar illustrated in FIG. 7.

FIGS. 12-13 illustrate a top view and bottom view of the support bar 600 illustrated in of FIGS. 7-11. The support bar 600 has a "z-configuration." As further illustrated in FIG. 12, inwardly extending flange 630 is formed by bend 650 and inwardly extending flange 640 is formed by bend 660. Likewise, as illustrated in FIG. 13, the bottom of the support bar has an end surface 615. As shown, the inwardly extending flange 630 is formed by bend portion 660, and inwardly extending flange 640 is formed by bend 650.

As will further be appreciated by one of ordinary skill in the art, the support bar 600 can be formed from any suitable material, but it may be advantageous to make the support bar 600 from a strong yet malleable material, such as, but not limited to, sheet metals; and particularly sheet steel.

As will be understood by one of ordinary skill in the art, support bars 600 that are produced from sheet metal will be relatively inexpensive to manufacture, yet strong. As will further be appreciated by one of ordinary skill in the art, sheet metal is bendable, which means the inwardly extending flanges 630 and 640 of the support bar 600 can be made from the same sheet of metal as the first and second flat longitudinal surfaces 604 and 605.

Further, as will be appreciated by one of ordinary skill in the art, sheet metal can easily be cut using tin snips, power shears, laser cutting, etc. This provides the additional benefit of easily being able cut key 620 into any dimensions or shape desired by the user or manufacturing a key 620 having a shape or dimension that corresponds with the shape or dimensions of a key receptacle 240.

Figure 14:
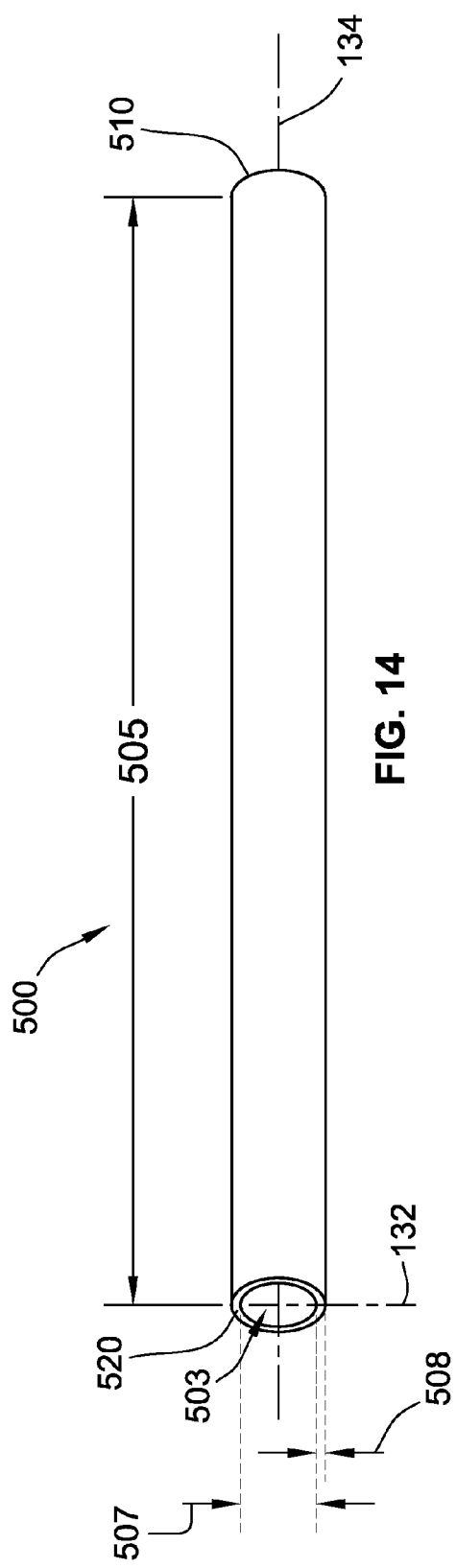
FIG. 14 is a side perspective view of one embodiment of a tubular ring of filter media according to one aspect of the present application.
Figure 15:
FIG. 15 is a side perspective opposite of the view illustrated in FIG. 14.
Figure 16:
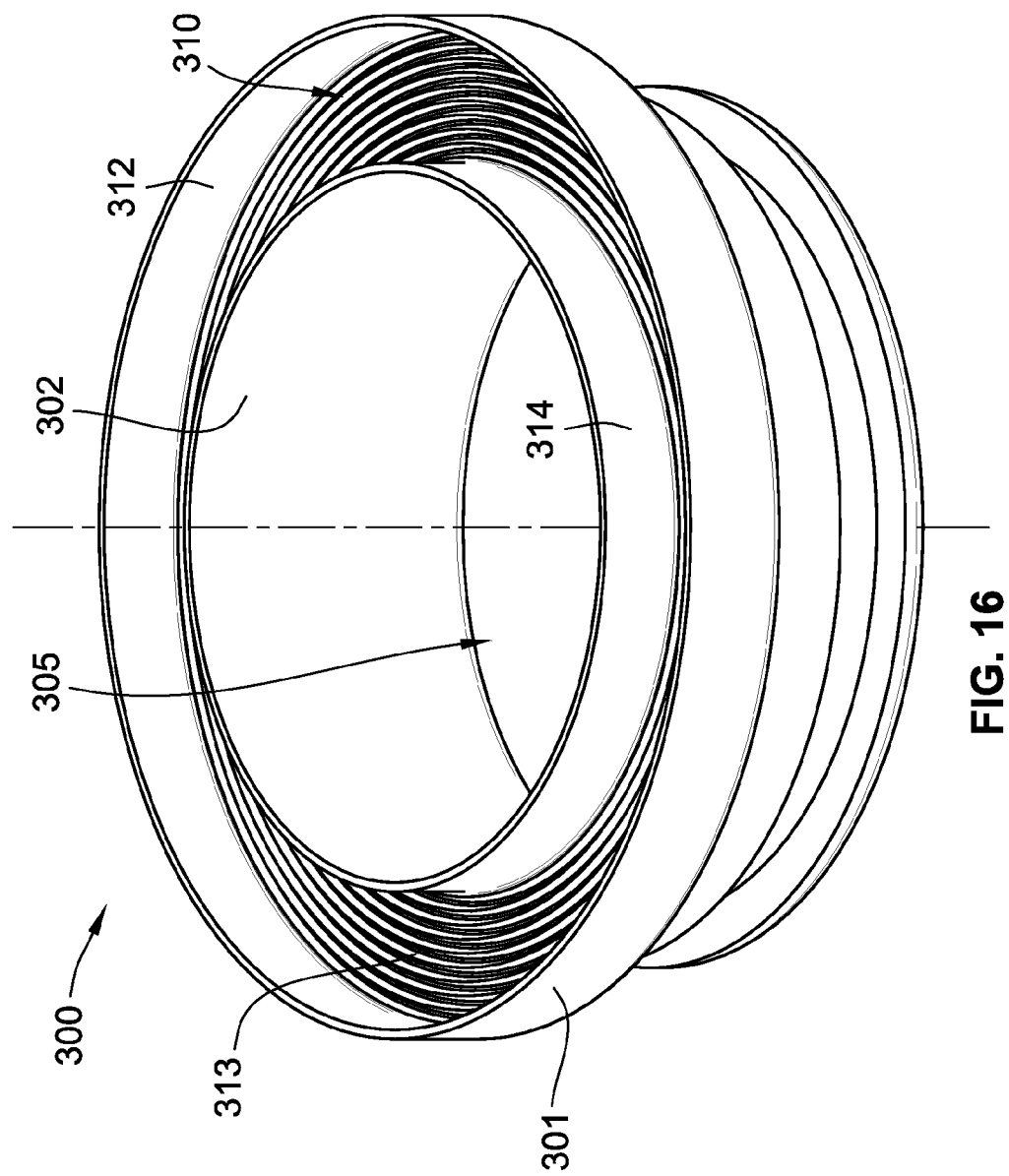
FIG. 16 is a perspective view of one embodiment of an open end cap according to one aspect of the present application.

FIGS. 14 and 15 illustrate one embodiment of the tubular ring of filter media 500 according to one aspect of the present application. As discussed above, the tubular ring of filter media 500 has a first or rear end 510 and a second or front end 520. Running between the front end 520 and rear end 510 is a ring of filter media 501 that defines an internal cavity 503. In addition, FIGS. 14 and 15 illustrate the thickness 508 of the filter media 501.

In one exemplary non-limiting embodiment, the tubular ring of filter media 500 may have, but is not limited to, an external diameter 506 in the range of 1 and 10 inches; and an inner diameter 507 in the range of 0.5 and 9.5 inches. In another exemplary non-limiting embodiment the tubular ring of filter media 500 may have, but is not limited to, an axial length 505 in the range of 12 and 120 inches. In another exemplary non-limiting embodiment, the filter media 501 may have, but is not limited to, a thickness 508 in the range of 0.125 and 3 inches.

However, in a more preferred exemplary non-limiting embodiment the tubular ring of filter media 500 may have, but is not limited to, an external diameter 506 in the range between 2 and 6 inches; an inner diameter 507 in the range between 1.0 and 5.5 inches; an axial length 505 in the range between 12 and 79 inches; and a thickness 508 in the range between 0.25 and 1 inch.

As will be readily recognized by one of ordinary skill in the art, the tubular ring of filter media 500 is not meant to be limited to the dimensional ranges above and other embodiments governed by the principles of this application may have tubular rings of filter media 500 with dimensions that are both above and below the ranges provided above.

FIGS. 14 and 15 also illustrate a central axis 134 of the tubular ring of filter media 500. As illustrated, the central axis 134 is running longitudinally from the rear end 510 to the front end 520 of the tubular ring of filter media 500. FIGS. 14 and 15 also illustrate a transverse axis 132 that intersects the central axis 134.

In one exemplary and non-limiting embodiment, the tubular ring of filter media 500 may be composed of, but is not limited to being composed of, filter media 501 as disclosed in U.S. Pat. Nos. 5,893,956, 8,062,523, 8,293,106, and 8,499,939, which are commonly owned by the assignee of the present application and whose teachings are incorporated by reference herein.

Further, according to another exemplary non-limiting embodiment, the tubular ring of filter media 501 may be composed of, but is not limited to such a tube shaped structure that may take the form of PEACH® media, other wound tubular constructions, fiberglass media, tubes of pleated synthetic media, pleated fiberglass media, pleated cellulose media, carbon, melt blown or string wound.

However, as one of ordinary skill in the art will readily recognize, the tubular ring of filter media 500 is not meant to be limited to the examples listed above and other embodiments governed by the principles of this application may use any filter media 501 generally known in the filtration arts. Furthermore, as stated above and as will be readily recognized by one having ordinary skill in the art, tubular in this sense refers to the overall structure and does not refer to cylindrical or cylindrical structures.

FIGS. 16-20 illustrate one embodiment of an open end cap 300 according to one aspect of the present application. The open end cap 300 has an external surface 301 and an inner surface 302. The inner surface 302 of the open end cap 300 defines a flow opening 305 extending through the open end cap 300. The open end cap 300 also has an annular well 310. The annular well 310 has an annular base surface 313 that is bounded by an inner annular wall 314 and an outer annular wall 312.

Figure 17:
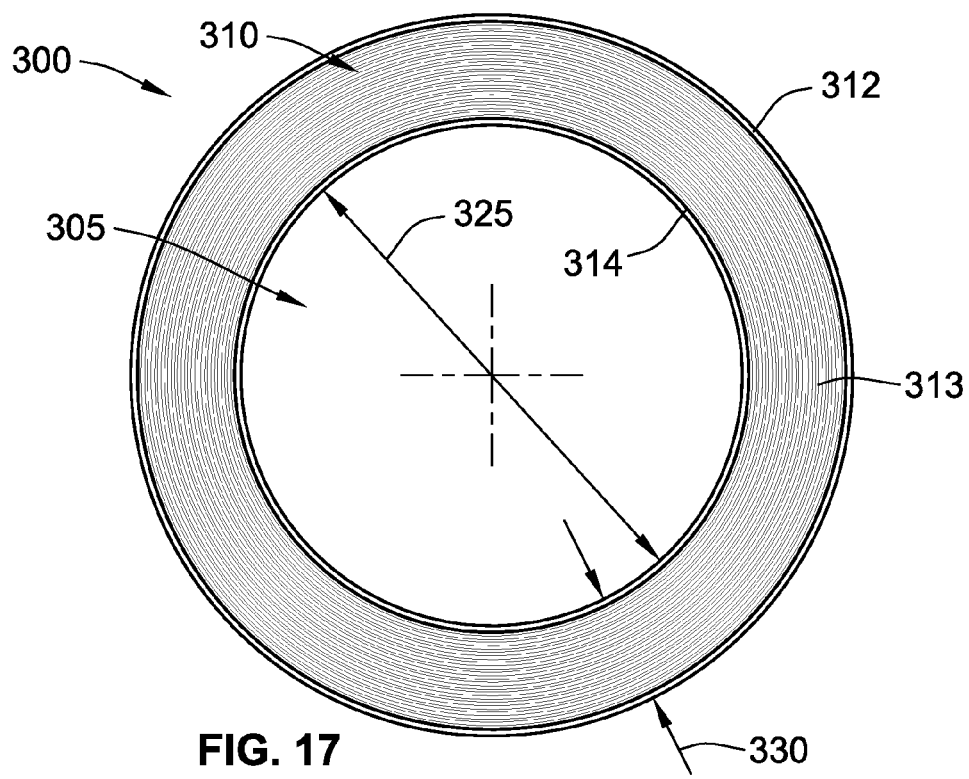
FIG. 17 is a top view (aka internal surface for media attachment) of the open end cap illustrated in FIG. 16.
Figure 18:
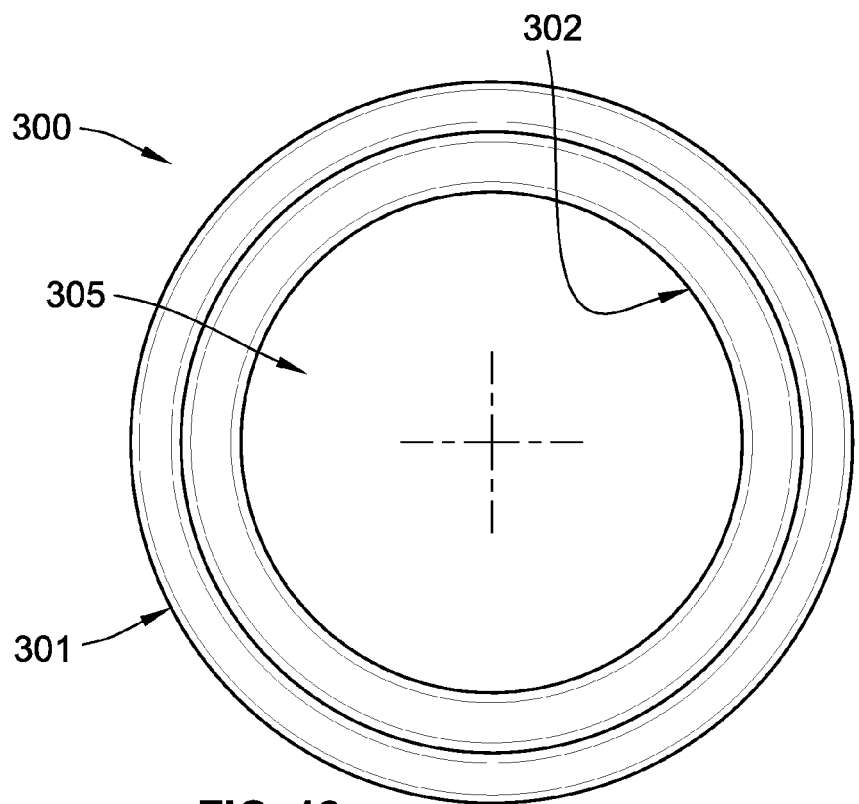
FIG. 18 is the bottom view of the external surface of the open end cap illustrated in FIG. 16.

FIGS. 17 and 18 illustrate a top view and bottom view, respectively, of the open end cap 300 according to one aspect of the present application. The annular well 310 has a width 330 defined by the inner and outer annular wall 314 and 312. As further illustrated, the inner annular wall 314 also defines the diameter 325 of the flow opening 305.

In one exemplary non-limiting embodiment, the width 330 of the annular well 310 can be, but is not limited to, a range between 0.125 and 4 inches. In another exemplary non-limiting embodiment, the diameter 325 of the flow opening 305 may be, but is not limited to, a range between 1 and 8 inches.

However, in a more preferred non-limiting embodiment the width 330 of the annular well 310 may be, but is not limited to, a range between 0.25 and 1.5 inches; and the diameter 325 of the flow opening 305 may be, but is not limited to, a range between 1 and 7 inches.

In use, the annular well 310 acts as a seat for the tubular ring of filter media 500. Further, to prevent bypass of contaminated fluid between the annular well 310 and the tubular ring of filter media 500 an adhesive is used to secure and seal the filter media 500 to the annular well 310 of the open end cap 300.

In one embodiment it is envisioned that the filter media 500 is adhered to the closed end cap 200 (see FIG. 3) and the open end cap 300 by an adhesive such as, but not limited to, an epoxy or resin.

In another embodiment according to the present application it is envisioned that the filter media 500 is adhered to the closed end cap 200 (see FIG. 3) or the open end cap 300 by bonding, such as, but not limited to thermal bonding.

As will also be appreciated by one of ordinary skill in the art, the annular well 310 not only acts to axially receive the tubular ring of filter media 500, but also increases the contact surface area between the open end cap 300 and the filter media 500 thereby creating a larger area to adhere or bond the filter media 500 to the open end cap 300, which in turn creates a stronger seal between the open end cap 300 and the filter media 500.

Figure 19:
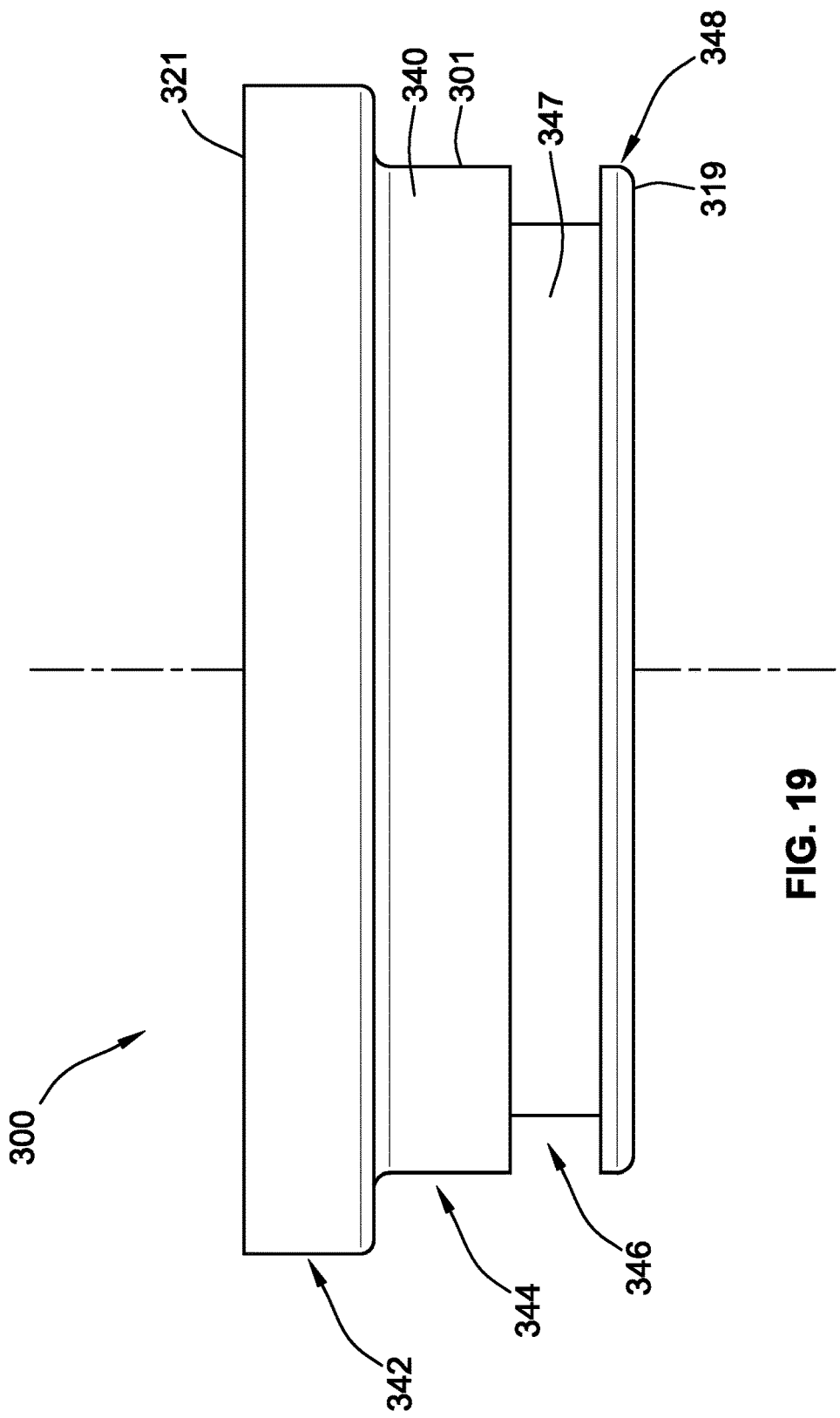
FIG. 19 is a side view of the open end cap illustrated in FIG. 16.

FIG. 19 illustrates a side view of one embodiment of the open end cap 300 according to one aspect of the present application. The open end cap 300 has a front end 321 and a distal end 319 in which the external surface 340 of the open end cap 300 will be disposed. The external surface 301 of the open end cap 300 has a first tier 342, a second tier 344, a third tier 346, and a fourth tier 348. The first tier 342 has an annular diameter greater than the second tier 344 and the second tier 344 has an annular diameter greater than the third tier 346. However, the annular diameter of the fourth tier 348 is greater than the annular diameter of the third tier 346, which provides a seal seat 347.

Figure 20:
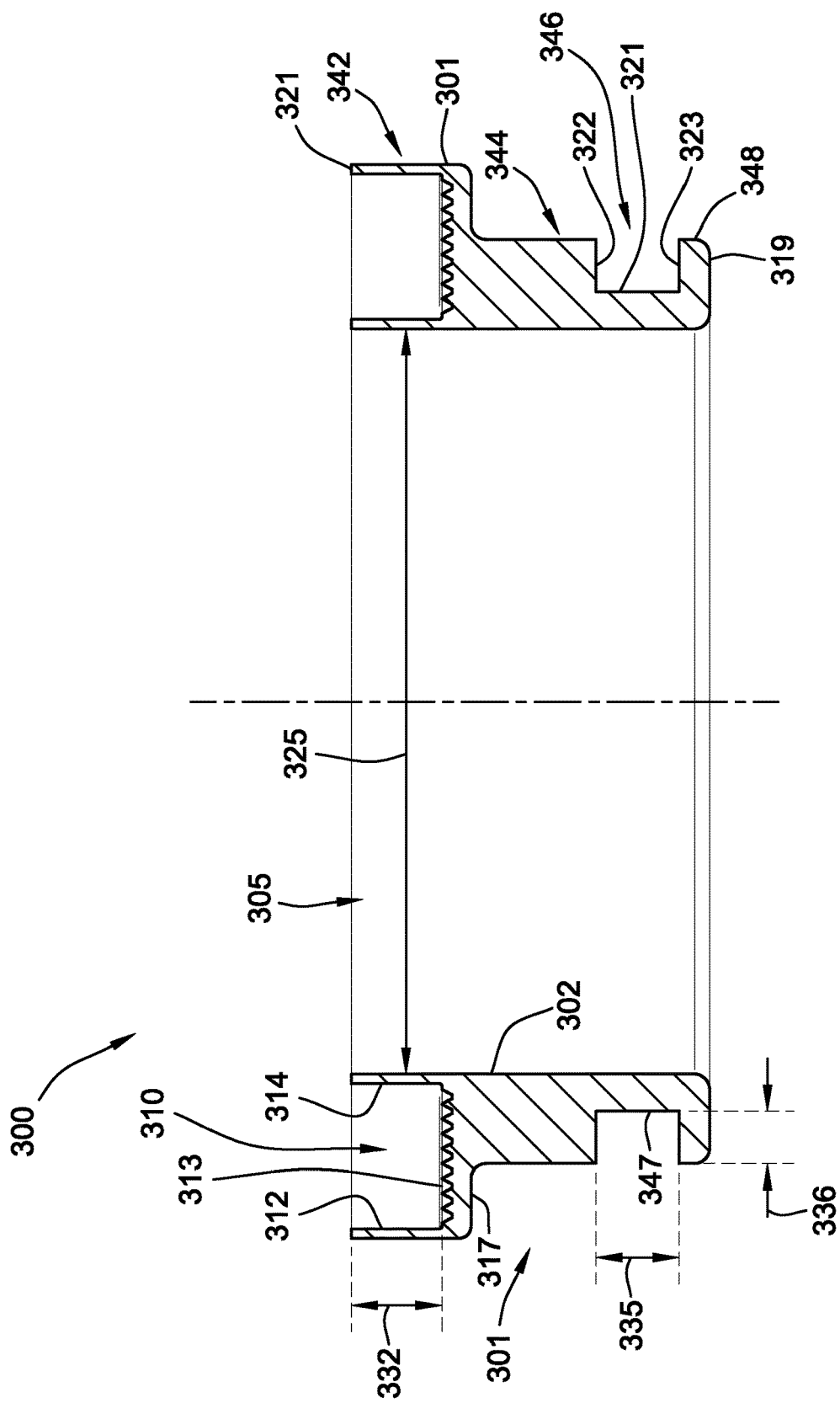
FIG. 20 is a side cross-sectional view of the open end cap illustrated in FIG. 16.

FIG. 20 illustrates a side cross-section of one embodiment of an open end cap 300 according to one aspect of the present application. The seal seat 347 has a base surface 321 that runs parallel to the central axis of the flow opening 305 defined by the external surface 301 of the open end cap 300. Hereinafter, the term "parallel" is defined to mean perfectly parallel or plus or minus 5° from perfectly parallel. Projecting from the base surface 321 of the seal seat 347 are a first and second sidewall 322 and 323 that sit in an opposed spaced relationship and are perpendicular to the flow opening 305 that is defined by the inner surface 302 of the open end cap 300. Hereinafter, the term "perpendicular" is defined to mean perfectly perpendicular or plus or minus 5° from perfectly perpendicular. The seal seat 347 has a width 335 that is defined by the distance between the first and second sidewall 322 and 323. Further, the seal seat 347 has a depth 336 that is defined by the difference between the annular diameter of the second tier 344 and the third tier 346, as well as the difference between the annular diameter of the fourth tier 348 and the third tier 346.

In one exemplary non-limiting embodiment, the seal seat 347 may be, but is not limited to, a width 335 in the range between 0.2 and 1.0 inch; and a depth 336 in the range between 0.1 and 0.75 inches.

However, in a more preferred exemplary non-limiting embodiment the width 335 of the seal seat 347 may be, but is not limited to, a range between 0.2 and 0.375 inches; and a depth 336 of the seal seat 347 may be, but is not limited to, a range between 0.2 and 0.375 inches.

As will be appreciated by one of ordinary skill in the art, in one exemplary non-limiting embodiment the open end cap 300 and/or the closed end cap 200 can be made from, but are not limited to, thermoplastic polymers such as, but not limited to, polypropene; polyethylene terephthalate; polybutylene terephthalate; polyphenylene sulfide.

In yet another exemplary non-limiting embodiment the open end cap 300 and/or the closed end cap 200 can be made from, but are not limited to being made from, synthetic polymers, such as but not limited to, nylon.

In still yet another exemplary non-limiting embodiment the open end cap 200 and/or the closed end cap 300 can be made from, but are not limited to being made from, a metal, such as, but not limited to, carbon steel, stainless steel or aluminum.

However, as one of ordinary skill in the art will readily appreciate the open end cap 300 and the closed end cap 200 can be made from any materially generally known in the art and the materials that make up the open end cap 300 and the closed end cap 200 are not meant to be limited to the materials listed in the above exemplary embodiments.

Further, as one of ordinary skill in the art will readily appreciate, the material selected to make the open end cap 300 and the closed end cap 200 will be dependent on specific operating conditions or limits, such as, but not limited to, the fluid type to be filtered in the system, the pressure of the system, the fluid chemical compatibility of the system, or the temperature of the system.

Figure 21:
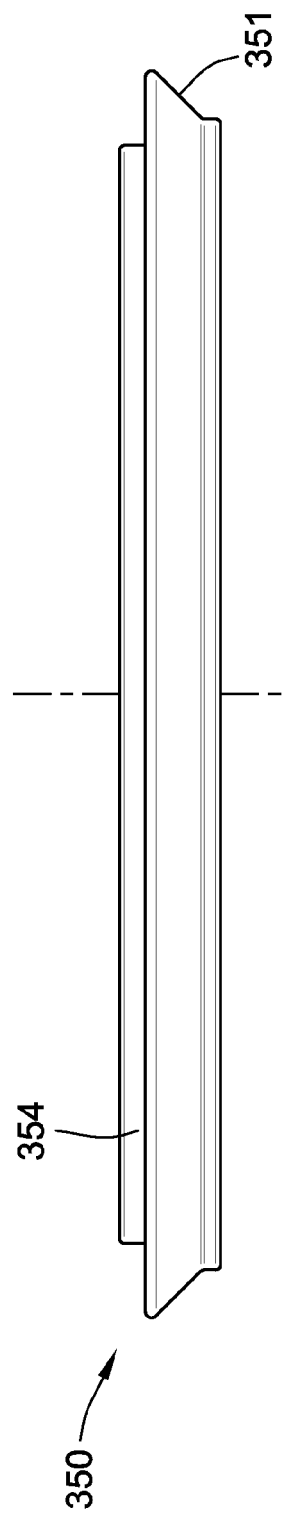
FIG. 21 is a side view of one embodiment of an annular seal in the form of a radial seal such as a chevron seal according to one aspect of the present application.
Figure 22:
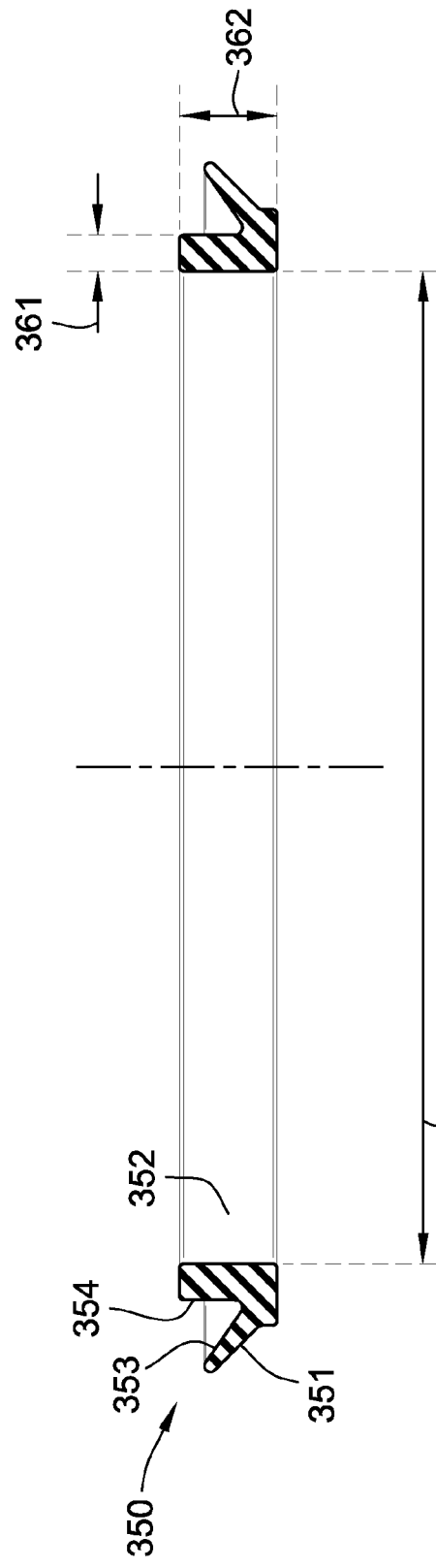
FIG. 22 is a side cross-sectional view of the annular seal illustrated in FIG. 21.

FIGS. 21 and 22 illustrate one embodiment of the annular seal 350 according to one aspect of the present application. The annular seal 350 has an inner surface 352 that can provide a secure seal against the seal seat 347 of the open end cap 300 (see FIG. 19). The annular seal 350 also has an annular base portion 354 and an annular sealing flange 353. The annular base portion 354 has a width 362, a depth 361, and an inner diameter 360.

In one exemplary non-limiting embodiment the width 362 of the annular base portion 354, may be, but is not limited to be, a range between 0.125 and 1 inch; the depth 361 of the annular base portion 345, may be, but is not limited to, a range between 0.05 and 0.375 inches; and the inner diameter 360 of the of annular base portion 354 may be, but is not limited to, a range between 1.75 and 7.875 inches.

However, in a more preferred exemplary non-limiting embodiment the width 362 of the annular base portion 354, may be, but is not limited to be, a range between 0.125 in. to 0.25 in.; the depth 361 of the annular base portion 345, may be, but is not limited to, a range between 0.05 in. to 0.2 in.; and the inner diameter 360 of the of annular base portion 354 may be, but is not limited to, a range between 1.875 in. to 7.875 in.

However, as will be readily recognized by one of ordinary skill in the art, there should be correspondence between the diameter 360, width 362 and the depth 361 of the annular base portion 354 and the diameter of the third tier 346, and the width 335 and the depth 336 of the seal seat 347, such that the annular base portion 354 of the annular seal 350 has a diameter 360, width 362 and a depth 361 that correspond to the diameter 346, width 335 and the depth 336 of the seal seat 347, thereby creating a secure seal between the annular seal 350 and the open end cap 300.

However, as will be understood by one having ordinary skill in the art, the diameter 360, width 362, and depth 361 of the annular base portion 354 of the annular seal 350 are not limited to the above ranges, nor are they limited to any range corresponding to the diameter 346, width 335, or depth 336 of the seal seat 347.

In another exemplary non-limiting embodiment, the annular seal 350 may be a seal that seals with non-round holes, such as the seal disclosed by U.S. Pat. No. 8,961,644, which is commonly owned by the assignees of the current application and the teachings of which are herein incorporated by reference.

In another exemplary non-limiting embodiment the annular seal 350 can be made from synthetic rubbers, such as, but not limited to Nitrite Rubber or Buna; Hydrogenated Nitrile Butadiene Rubber; Ethylene Propylene Diene Monomer Rubber or EPDM; and Viton.

However, as will be readily understood by one having ordinary skill in the art, the annular seal 350 is not meant to be limited to the above materials and can be made from any material generally known in the art.

Further, as one of ordinary skill in the art will readily understand, the type of material selected for the annular seal 350 will be dependent on specific operating conditions or limits, such as, but not limited to, the fluid type being filtered, the pressure of the fluid being filtered, the chemical compatibility of the fluid being filtered, or the temperature of the fluid being filtered.

Figure 23:
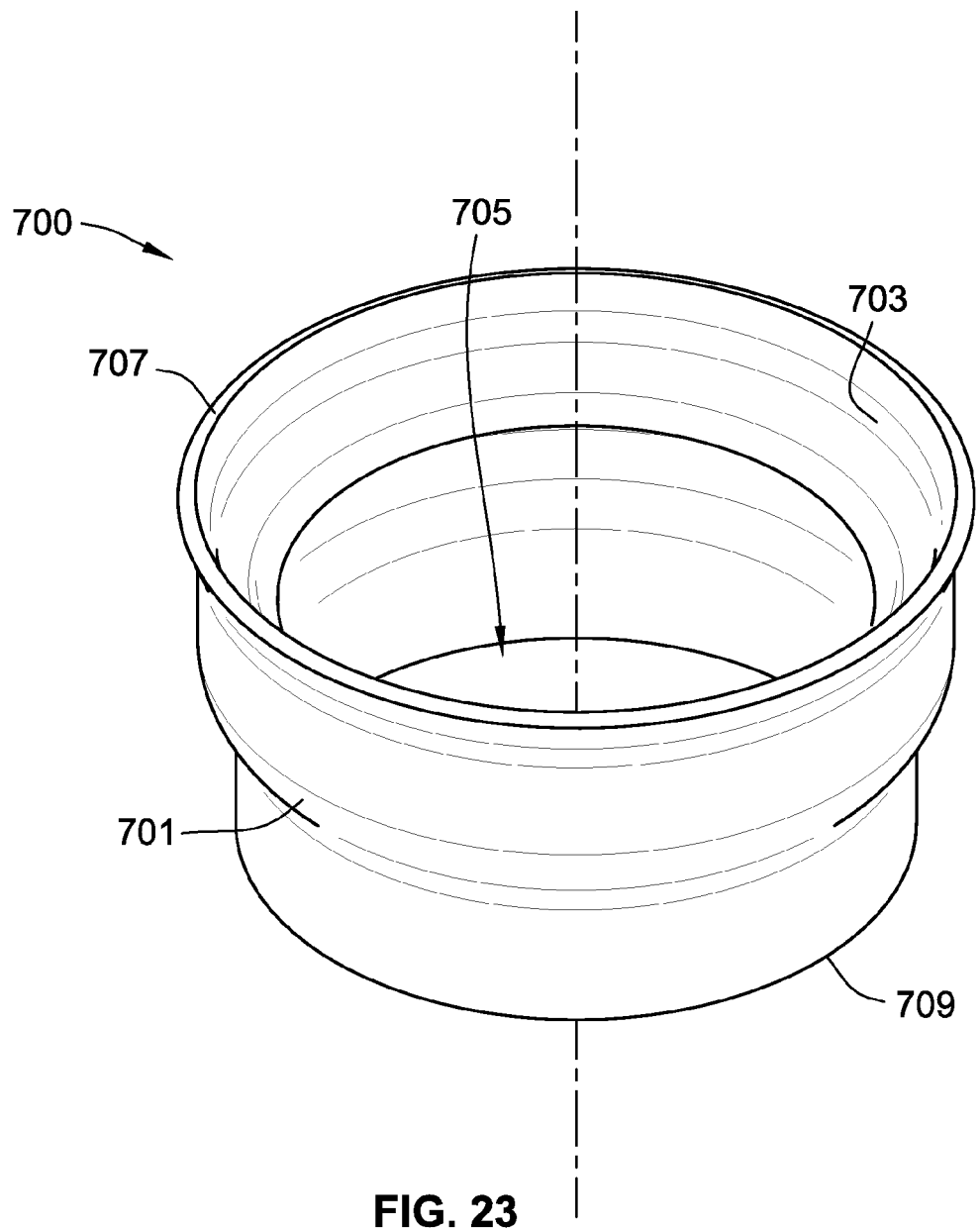
FIG. 23 is a perspective view of one embodiment of a seal cup according to one aspect of the present application.
Figure 24:
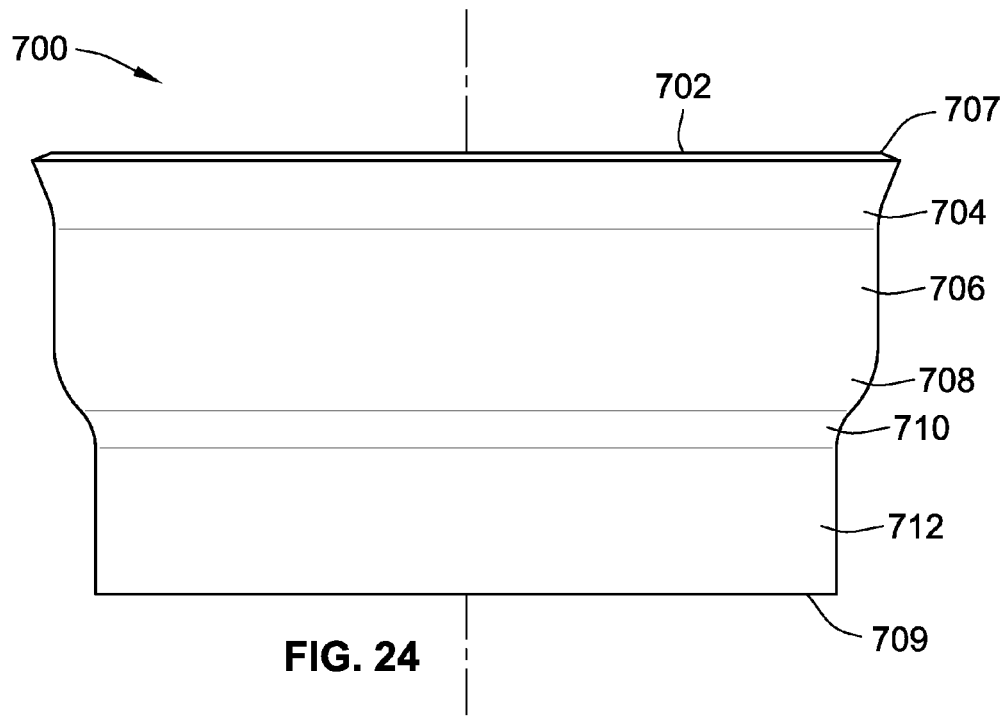
FIG. 24 is a side view of the seal cup illustrated in FIG. 23.
Figure 25:
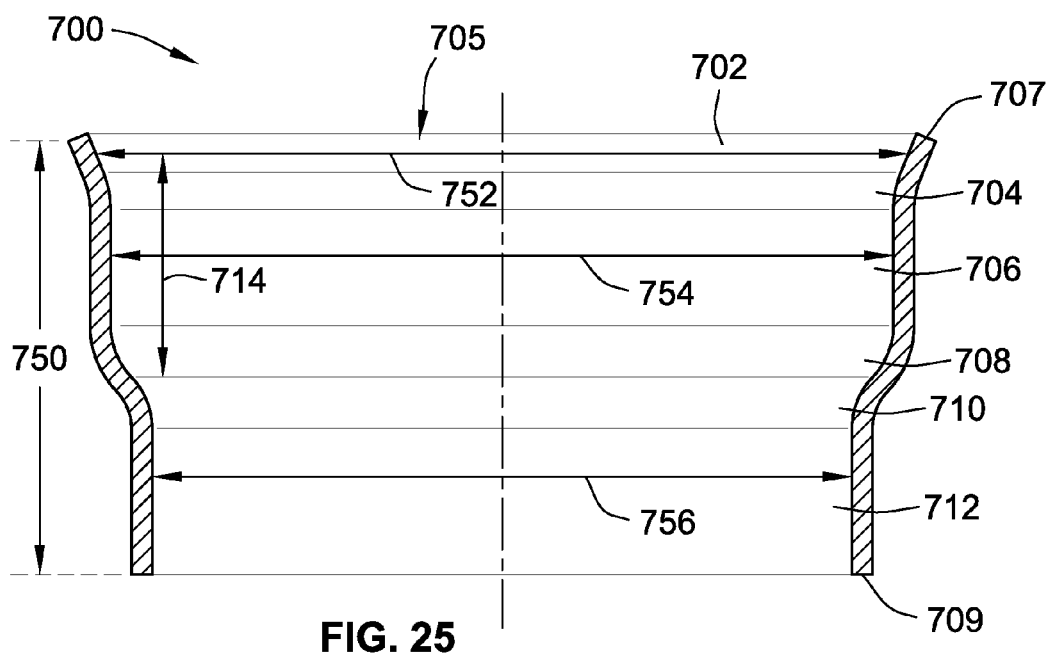
FIG. 25 is a side cross-sectional view of the seal cup illustrated in FIG. 23.

FIGS. 23-25 illustrate one embodiment of the sealing cup 700 according to an aspect of the present application. Turning to FIG. 23, the sealing cup 700 has an external surface 701 and an inner surface 703. The inner surface 703 of the sealing cup 700 defines an internal cavity 705 that extends from the first or front end 707 to the second or back end 709 of the sealing cup 700.

FIG. 24 illustrates a side view of the embodiment of the sealing cup 700 illustrated in FIG. 23. The sealing cup 700 has tiers 702, 704, 706, 708, 710 and 712. As illustrated, the first tier 702 starts at the first or front end 707 of the sealing cup 700 then ascending down the sealing cup 700 towards the second or back end 709 of the sealing cup. Adjacent to the first tier 702 is the second tier 704, then the third tier 706, then the fourth tier 708, then the fifth tier 710, and then a sixth tier 712, whose lowermost portion defines the second or back end 709 of the sealing cup 700.

FIG. 25 is a cross-sectional view of the embodiment of the seal cup 700 illustrated in FIG. 24. As illustrated, the first tier 702 has a first diameter 752, which defines the first or front end 707 of the sealing cup 700 and the sixth tier 712 has a diameter 756, which defines the diameter of the second or back end 709 of the sealing cup. Further illustrated, is an annular sealing wall 714. The annular sealing wall 714 acts to provide a contact point to create a strong and robust seal with the annular seal 350 (see FIG. 21) when the filter element 110 is properly inserted in the pipe assembly 112.

Further, as will be understood by one of ordinary skill in the art, the annular sealing wall 714 is not limited to being located on the seal cup 700. Indeed, in other embodiments the annular sealing wall 714 may be located on any part of the pipe assembly 112 that allow the annular seal 350 to form a strong and robust seal with the pipe assembly 112, such as, but not limited to, the inner wall 870 of the pipe 800 (see FIG. 41; see also FIG. 44) or the exterior wall 875 of the pipe 800 (see FIG. 42).

In one exemplary non-limiting embodiment the diameter 752 of the first tier 752 can be, but is not limited to, a range between 1.1 and 8 inches, and the diameter 756 of the sixth tier 712 may, but is not limited to, a range between 0.5 and 7.5 inches. In yet still another exemplary non-limiting embodiment, the annular diameter 754 of the annular sealing surface 714 may be, but is not limited to, a range between 1 and 7.9 inches.

However, in a more preferred exemplary non-limiting embodiment the diameter 752 of the first tier 752 may be, but is not limited to, a range between 3 and 5 inches; a diameter 756 of the sixth tier 712 may be, but is not limited to, a range between 2.5 and 3.8 inches; and the annular diameter 754 of the annular sealing surface 714 may be, but is not limited to, a range between 3 and 4 inches.

Figure 27:
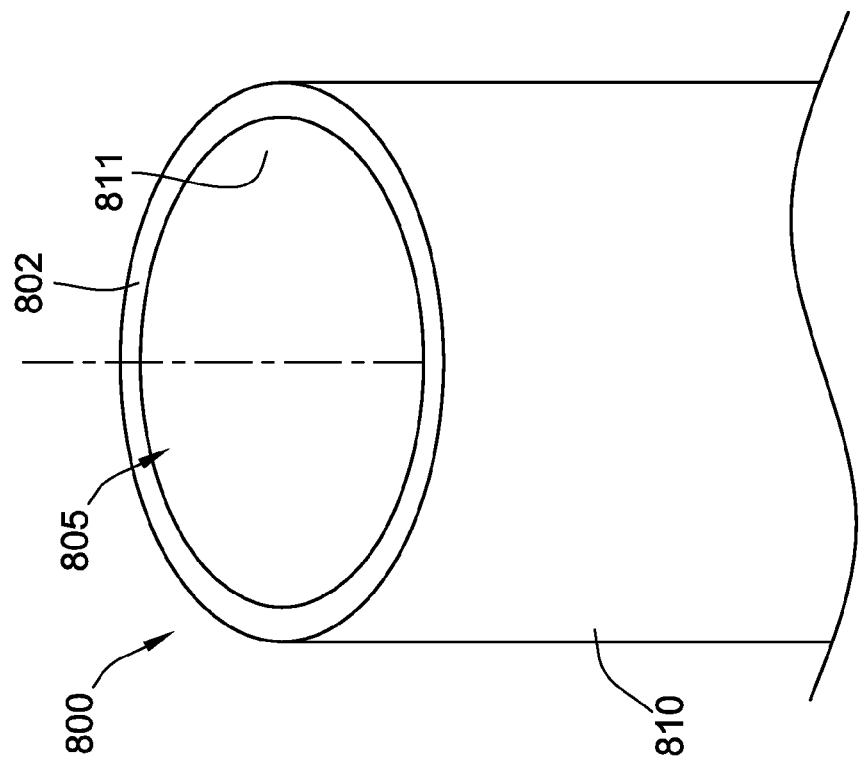
FIG. 27 is a partial perspective view of the opposite end of the flow pipe illustrated in FIG. 26.
Figure 26:
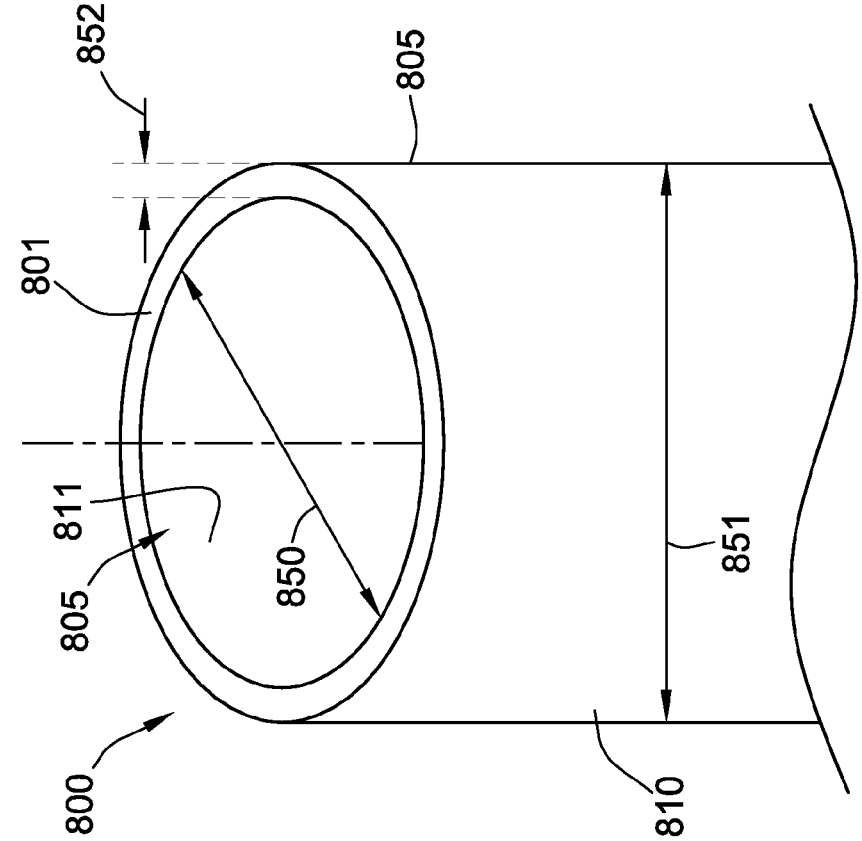
FIG. 26 is a partial perspective view of a first end of a flow pipe according to one aspect of the present application to which a seal cup may be affixed.

FIGS. 26 and 27 illustrate, respectively, one embodiment of a first or front end 801 of a pipe 800 and the second or rear end 802 of the pipe 800 according to one aspect of the present application. FIG. 26 illustrates the first or front end 801 of the pipe 800. FIG. 27 illustrates the second or rear end 802 of the pipe 800.

Figure 40:
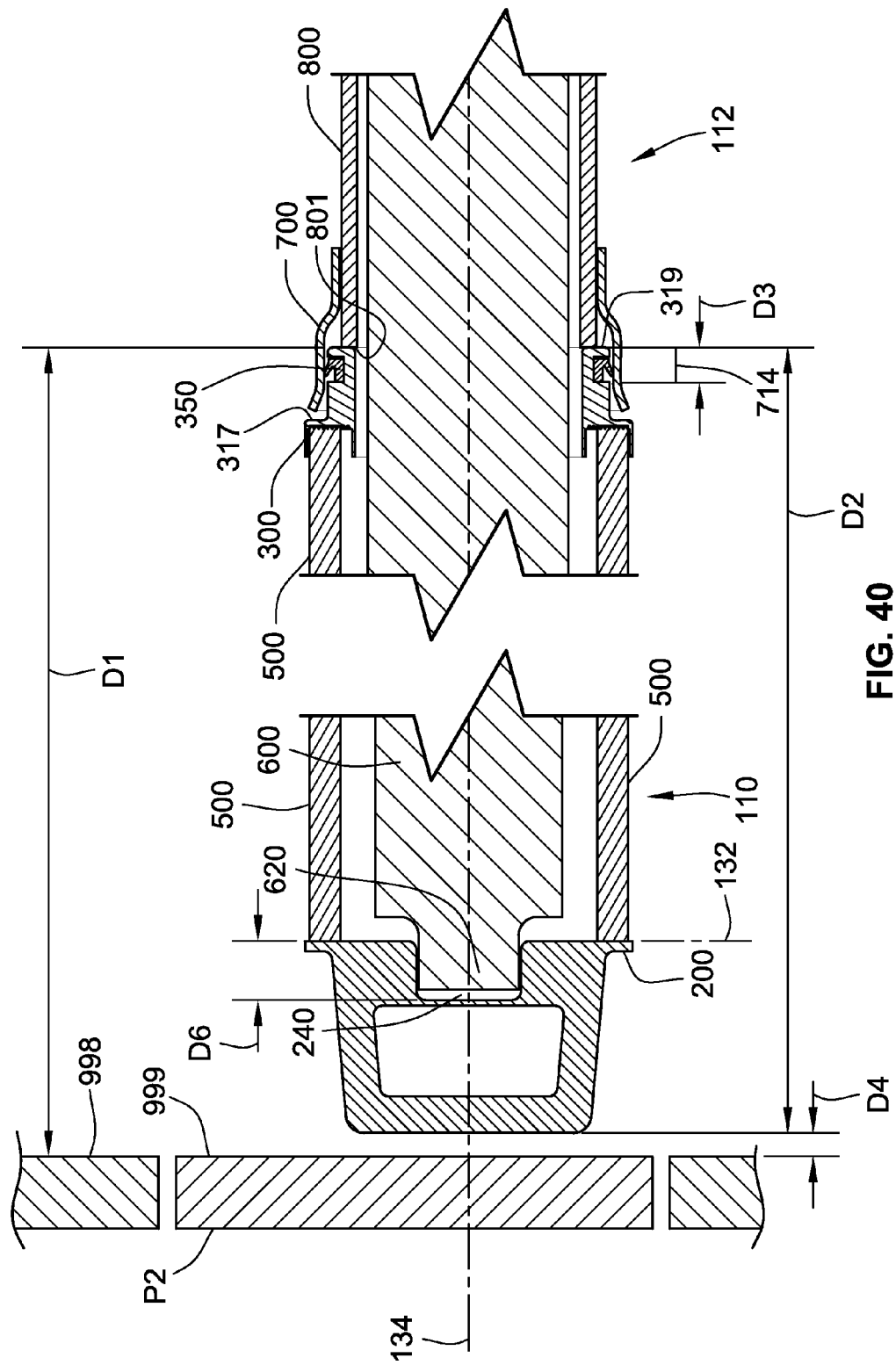
FIG. 40 is a partial side cross-sectional view of the embodiment illustrated in FIG. 39 showing the filter element sealingly engaged with the pipe assembly and further illustrating the lid of the pressure vessel assembly, such as either pressure vessel assembly shown in FIG. 38 or 39, being able to be moved to the closed position because the filter element has sealing engaged with the pipe assembly.

In one embodiment according, the first or front end 801 of the pipe 800 can act as an axial abutment against which the distal end 319 (see FIG. 20) of the open end cap 300 can abut when the filter element 110 has been correctly inserted into and engages with the pipe assembly 112 (see FIG. 40).

Figure 41:
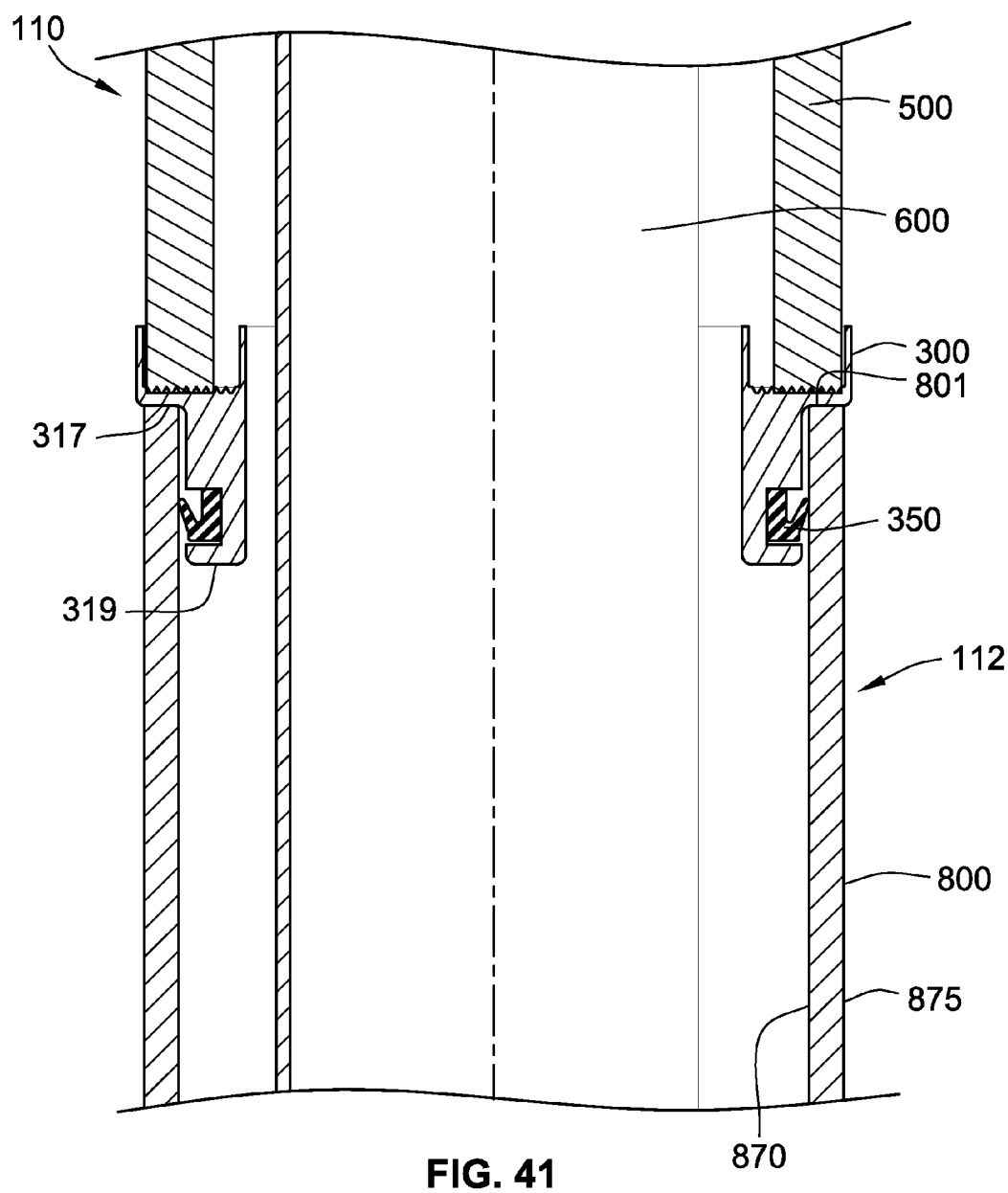
FIG. 41 is a partial cross-sectional view of one embodiment of a filter element sealingly engaged with the inner wall of a pipe of one embodiment of a pipe assembly according to one aspect of the present application.
Figure 42:
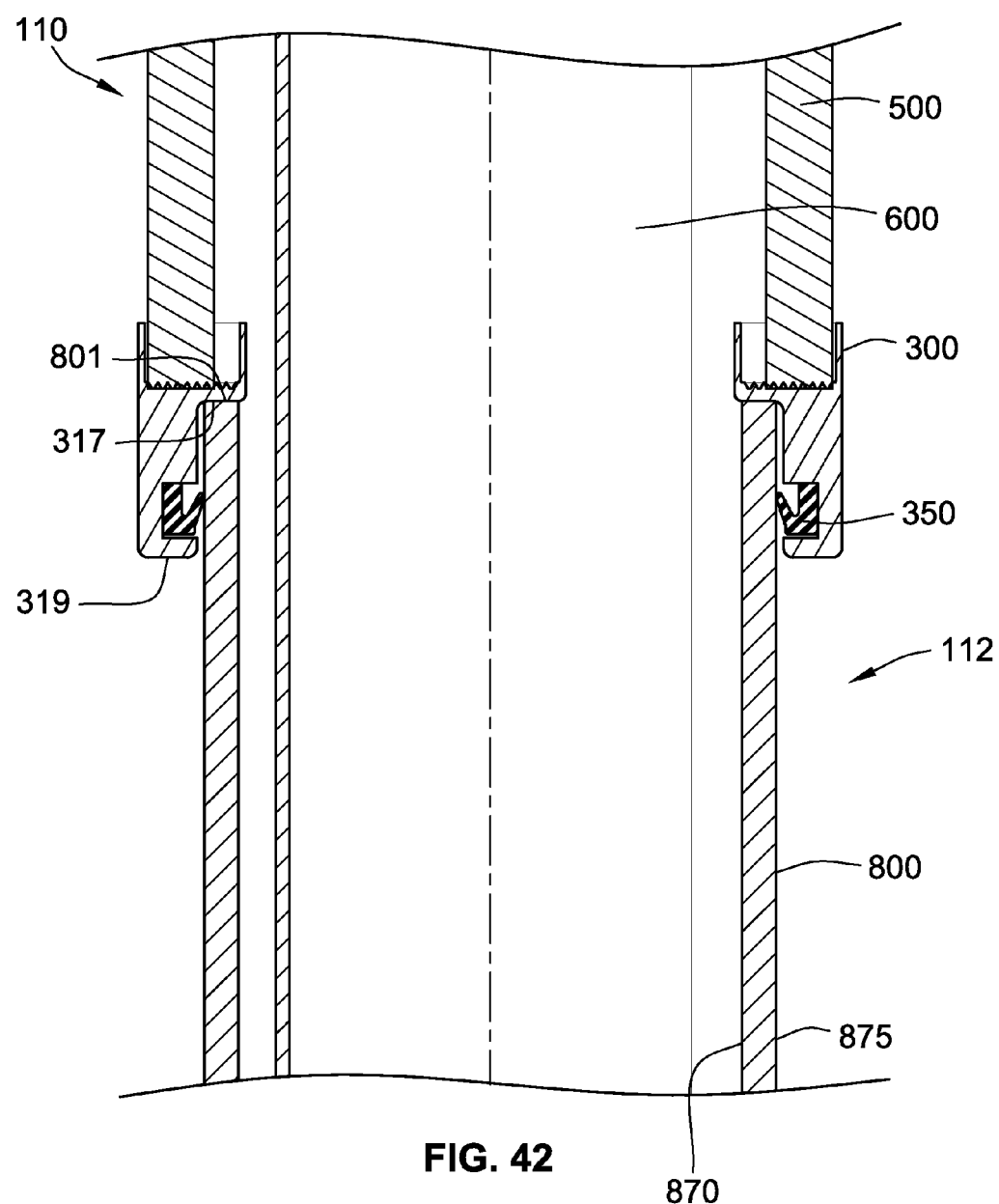
FIG. 42 is a partial cross-sectional view of one embodiment of a filter element inserted sealingly engaged with the external wall of a pipe of one embodiment of a pipe assembly according to one aspect of the present application.

In yet another embodiment according to one aspect of the present application, the first or front end 801 of the pipe 800 can act as an axial abutment against which the distal abutment 317 of the open end cap 300 will abut when the filter element has been inserted and correctly engages with the pipe assembly 112 (see FIG. 41; see also FIG. 42).

However, as will be readily understood by one having ordinary skill in the art, the axial abutment of the pipe assembly 112 is not meant to be limited to only the first or front end 801 of the pipe. Indeed, it is envisioned that other embodiments governed by the principles of this application may have an axial abutment on any portion of the pipe assembly 112 that can act to prevent any further axial movement of the filter element 110.

As further illustrated in FIGS. 26 and 27, the pipe 800 has an external surface 810 and an inner surface 811 and an internal cavity 805 that extends longitudinally from the first or front end 801 to the second or rear end 802.

FIGS. 26 and 27 further illustrate the inner diameter 850 and the outer diameter 851 of the pipe 800. Still further FIGS. 26 and 27 illustrate the thickness 852 of the pipe 800. In one exemplary non-limiting embodiment the pipe 800 may have, but is not limited to, an inner diameter 850 in the range between 1 and 8 inches; and an outer diameter 851 in the range between 1.1 and 9 inches. In another exemplary non-limiting embodiment the thickness 852 of the pipe 800 can be, but is not limited to, a range between 0.1 and 1 inch.

However, in a more preferred non-limiting exemplary embodiment the inner diameter 850 of the pipe 800 may be, but is not limited to, a range between 2.4 and 3.1 inches; the outer diameter 851 of the pipe 800 may be, but is not limited to, a range between 2.8 and 3.5 inches; and the thickness 852 of the pipe 800 may be, but is not limited to, a range between 0.1 and 0.5 inches.

Figure 28:
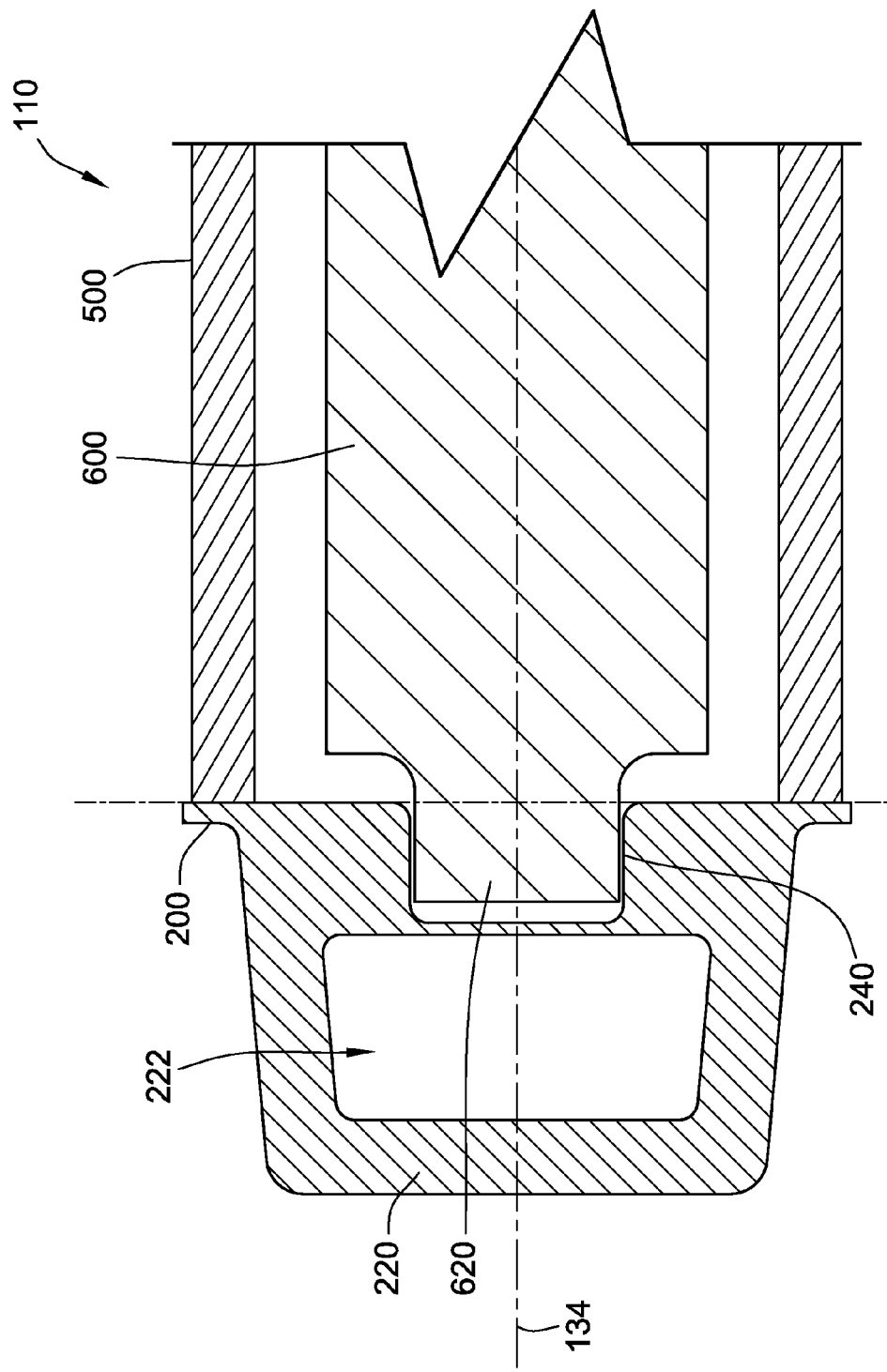
FIG. 28 is a cross-sectional side view of one embodiment of a filter element according to one aspect of the present application.

FIG. 28 illustrates a partial cross-sectional view of one embodiment of the filter element 110 according to an aspect of the application. FIG. 28 further illustrates the relationship of the closed end cap 200 and the support bar 600.

Specifically, FIG. 28 illustrates the key 620 of the support bar 600 correctly inserted into the key receptacle 240 of the closed end cap 200. As illustrated, the handle 220, the key receptacle 240 and the key 620 of the support bar 600 are aligned along the transverse axis 132.

FIG. 29 illustrates a partial side cross-sectional view of the filter element 110 illustrated in FIG. 28 with the key 620 correctly inserted into the key receptacle 240 of the closed end cap 200.

As will be appreciated by one having ordinary skill in the art, in the embodiment illustrated in FIGS. 28 and 29 when an operator grasps the through opening 222 of the handle 220 and rotates the handle 220 along with the filter element 110, the key receptacle 240 will likewise be rotated because the handle 220 and the key receptacle 240 are in a parallel relationship with one another.

Therefore, according to one aspect of the present application the operator can reliably grasp the handle 220 by the through opening 200 and rotate the handle 220 and the filter element 110 knowing that the key receptacle 240 will be similarly rotated to the position of the handle 220. It is envisioned that in such an embodiment it would provide the operator with an efficient and reliable way to align the key receptacle 240 with the key 620 of the support bar 600 that remain stationary along the transverse axis 132.

In addition, the operator is ensured that the filter element 110 has been properly inserted because the key 620 of the support bar 600 will only insert into the key receptacle 240 of the closed end cap 200 when the key receptacle 240 has been rotated to align with the key 620 that is stationary along the transverse axis 132.

However, the above exemplary description of one method an operator may use to align one embodiment of a key 620 and one embodiment of a key receptacle 240 is not meant to be limiting. Indeed, as will be readily understood by one having ordinary skill in the art any means generally known in the art can be used to align the key 620 with the key receptacle 240 and still be governed by the principles of the present application.

FIG. 30 illustrates a partial cross-sectional perspective view of one embodiment of a filter element 110 and pipe assembly 112 according to one embodiment of the present application and further illustrates the filter element 110 correctly inserted and sealingly engaged to form a strong and robust seal with the pipe assembly 112. As illustrated, the key 620 of the support bar 600 is properly inserted into the key receptacle 240 of the closed end cap 200, which, as described above, also means that a strong and robust seal has been has been formed between the annular seal 350 and the pipe assembly 112.

FIG. 30 further illustrates the relationship between the open end cap 300 and the sealing cup 700 when the filter element 110 is properly inserted into the pipe assembly 112. As illustrated, when the filter element 110 is properly inserted into the pipe assembly 112 the second end cap 300 sits partially within the sealing cup 700 and the annular seal 350 makes sealing contact with the annular sealing surface 714 of the sealing cup 700.

More specifically, as illustrated in FIG. 30 the annular sealing flange 353 (see FIG. 22) makes sealing contact with a sealing surface 714 of the sealing cup 700 and forms a strong and robust seal between the second end cap 300 of the filter element 110 and the sealing cup 700 of the pipe assembly 112, which prevents contaminated fluid from leaking between the second end cap 300 and the sealing cup 700 and therefore bypassing the filter media 500. Thus, when the filter element 110 is properly inserted into the pipe assembly 112, all of the contaminated fluid must pass through the tubular ring of filter media 500.

FIG. 31 illustrates a partial cross-sectional view of the filter element 110 and a pipe assembly 112 illustrated in FIG. 30. However, FIG. 31 shows the filter element 110 incorrectly inserted and not sealing engaged to form a strong and robust seal with the pipe assembly 112. As illustrated, the key 620 is located at a fixed position along the transverse axis 132. However, the key receptacle 240 of the closed end cap 200 is not aligned along the same position of the transverse axis 132 as the key 620, such that an operator could apply an axial force to the filter element 110 to insert the 620 into the key receptacle 240.

Further illustrated in FIG. 31 is the relationship between the second end cap 300 and the sealing cup 700 of the pipe assembly 112. When an operator has not aligned the key receptacle 240 of the closed end cap 200 with the position of the key 620 on the transverse axis 132 then when the operator applies an axial force to the filter element 110 during instillation of the filter element 110 the key 620 will abut the inner surface 211 (see FIG. 5) of the closed end cap 200, which prevents the annular seal 350 from engaging the seal cup 700 of the pipe assembly 112.

As will be understood by one having ordinary skill in the art, when the key 620 abuts the inner surface 211 of the closed end cap 200 it prevents the axial movement of the filter element 110 in a direction towards the pipe assembly 112, which prevents the annular seal 350 from forming a strong and robust seal with the sealing cup 700, which means that a strong and robust seal has not been formed between the filter element 110 and the pipe assembly 112.

However, as will be appreciated by one having ordinary skill in the art, if an operator takes measures to align the key receptacle 240 along the transverse axis 132, such that the key 620 can be inserted into the key receptacle 240, then the operator can apply an axial force to the filter element 110, such that the key 620 can be inserted into the key receptacle 240, which will allow the filter element 110 to shift axially towards the pipe assembly 112 to a position where the annular seal 350 can sealingly engage with the sealing cup 700, thereby, forming a strong and robust seal between the filter element 110 and the pipe assembly 112.

Additionally, as will further be appreciated by one having ordinary skill in the art, if the key 620 is inserted into the key receptacle 240, as illustrated in FIG. 30, the operator will know that the axial seal 350 has sealingly engaged to the sealing cup 700, thus, providing the operator with a positive indication that a strong and robust seal has been formed between the filter element 110 and the pipe assembly 112.

Further, as will be appreciated by one having ordinary skill in the art, the positive indication of the key 620 being inserted into the key receptacle 240, thereby, ensuring to the operator that that the filter element 110 has formed a strong and robust seal with the pipe assembly 112 not only eliminates the risk that no seal is formed between the filter element 110 and the pipe assembly 112, but also eliminates the risk that only a partial seal is formed between the filter element 110 and the pipe assembly 112, which eliminates an operator from using a pressure vessel assembly or other system governed by the principles of this application having a filter element 110 that is only partially sealed with a pipe assembly 112, which may lead to the contamination of any of the filtrate filtered by other filter elements 110 that may be employed in such a system and that have been properly inserted into the pipe assembly 112.

Thus, as will be appreciated by one of ordinary skill in the art, at least one degree of human error is removed during the replacement or installation of the filter elements 110 because an operator cannot improperly insert the filter element 110 into the seal cup 700 of the pipe assembly 112 and create a weak seal with the annular seal 350 and the pipe assembly 112, which may lead to contaminated fluid bypassing the between the filter element 110 and the pipe assembly 112.

However, as will be readily understood by those of ordinary skill in the art, the above embodiment is not meant to limit the key receptacle 240 from having to be rotated to align with the key 620 along the transverse axis 132 in order for the key 620 to be inserted into the key receptacle 240. Indeed, it is envisioned that the any suitable means to align the key 620 with the key receptacle 240 can be used to ensure that when the key 620 is inserted into the key receptacle 240, thereby, ensuring the operator that a strong and robust seal has been formed between the filter element 110 and the pipe assembly 112. For example, in one embodiment according to the principles of the present application the key 620 or the key receptacle 240 may have, but is not required to have, dimensions that are circular or spheroidal.

FIG. 32 illustrates a partial cross-sectional view of the embodiment of the filter element 110 and a pipe assembly 112 illustrated in FIG. 30. In FIG. 32 the key 620 and the key receptacle 240 are aligned along the transverse axis 132. However, although the key receptacle 240 and the key 620 are both aligned along the transverse axis 132, an operator would not be able to apply an axial force to the filter element 110 to urge the key 620 into the key receptacle 240 because the key receptacle 240 is not centered along the transverse axis 132 such that they key 620 could be inserted into the key receptacle 240 when the operator applies an axial force to the filter element 110.

As will be appreciated by one of ordinary skill in the art, such a relationship between the key 620 and the key receptacle 240 eliminates the filter element 110 from being inserted into the pipe assembly 112 when the filter element 110 is not correctly aligned with the pipe assembly 112 even if the filter element 110 and the pipe assembly 112 are aligned along the same position of the transverse axis 132.

Further, as will also be appreciated by one having ordinary skill in the art, such a relationship between the key receptacle 240 and the key 620 eliminates the possibility of a filter element 110 being inserted into a pipe assembly 112 when the filter element 110 is not centered along the transverse axis 132 such that the key 620 could be inserted into the key receptacle 240, which, as will be understood by one having ordinary skill in the art, eliminates the possibility of the annular seal 350 making only a partial seal with the seal cup 700 or the annular seal 350 making a weak seal to the seal cup 700, which as will be understood by one having ordinary skill in the art can cause the compression between the annular seal 350 and the seal cup 700 to diminish over time, which can eventually lead to the seal breaking and contaminated fluids leaking between the filter element 110 and the pipe assembly 112.

Thus, as will be appreciated by one of ordinary skill in the art, a degree of human error is removed during the replacement or installation of filter elements 110 with pipe assemblies 112 by removing the possibility of an operator inserting a filter element 110 that is not centered with the pipe assembly 112, such that the filter element 110 is unlikely to form a strong and robust seal with the pipe assembly 112.

Figure 33:
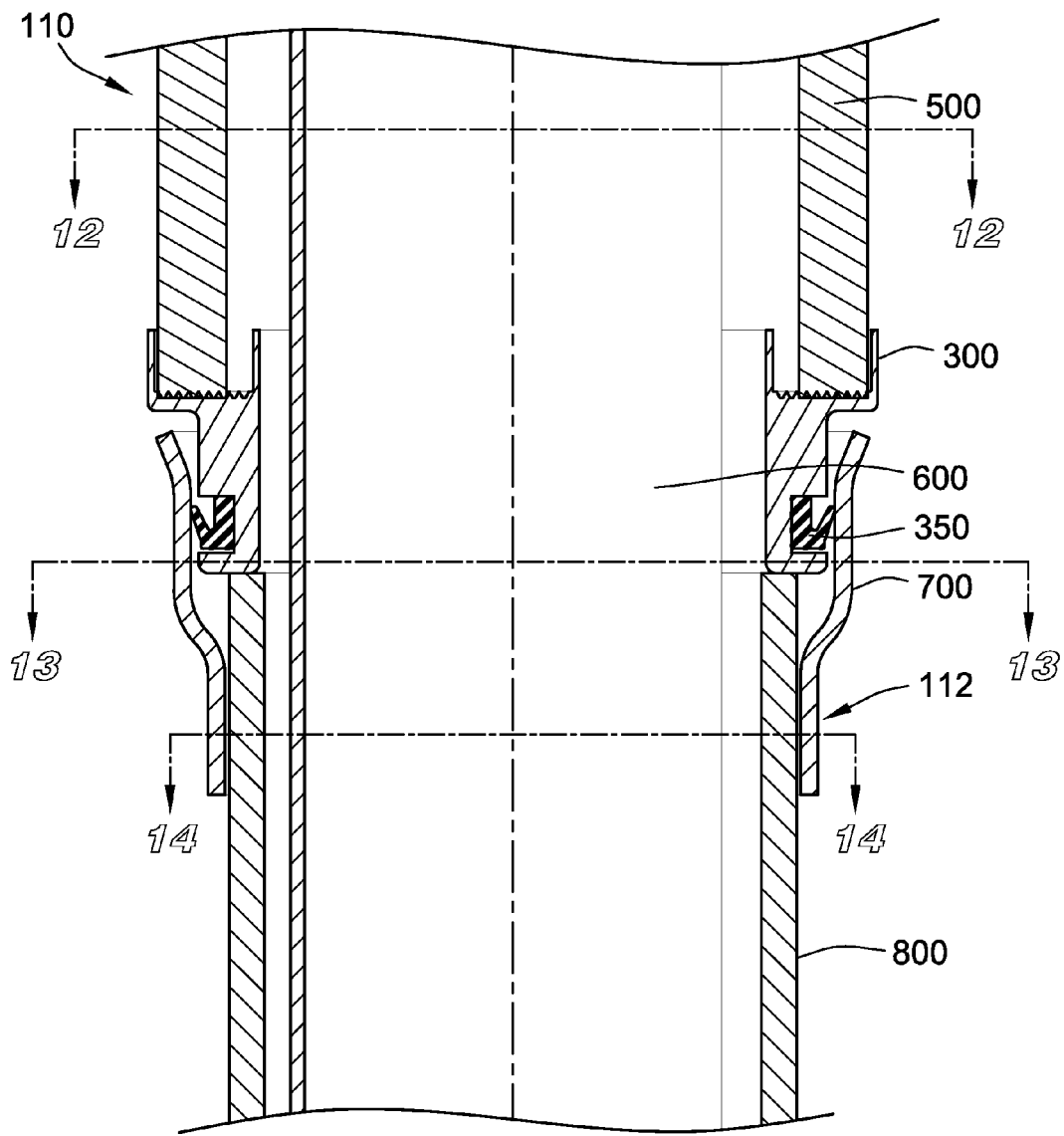
FIG. 33 is a cross-sectional view of one embodiment of a filter element filter in sealing contact with a pipe assembly of a pressure vessel assembly according to one aspect of the present application.

FIG. 33 illustrates a partial cross-sectional view of one embodiment of a filter element 110 sealingly engaged with a pipe assembly 112 according to one aspect of the present application. As illustrated, the filter media 500 is secured to the annular well 310 (see FIG. 20) of the open end cap 300. The filter media 500 can be secured to the annular well 310 of the open end cap 300 by adhesive, such as, but not limited to, a one part heat cured epoxy, a two part epoxy or thermal bonding of the filter media to the end cap. However, as will be readily recognized by one of ordinary skill in the art, any adhesive or coupling means generally known in the art may be used to adhere the tubular ring of filter media 500 and the annular well 310 of the open end cap 300, such that a seal is created to prevent the leaking of contaminated fluid between the filter media 500 and the annular well 310 of the open end cap 300.

Also illustrated in FIG. 33, is the annular seal 350 making sealing contact with the seal seat (see FIG. 19) of the second end cap 300 to provide a robust and tight seal between the annular seal 350 and the seal seat 347 so as to prevent any bypass of fluid between the open end cap 300 and the annular seal 350. Further illustrated is the strong and robust seal formed between the annular seal 350 and the sealing cup 700, which prevents the leaking of contaminated fluids between the filter element 110 and the pipe assembly 112.

Further illustrated in FIG. 33 is the pipe 800 coupled to the seal cup 700. The pipe 800 will be coupled to the seal cup 700 to create a strong and robust seal between the pipe and the seal cup 700 to prevent the bypass of contaminated fluid between the pipe 800 and the seal cup 700. As will be understood by one having ordinary skill in the art, the pipe 800 can be coupled to the seal cup 700 by any means generally known in the art such as, but not limited to, welding, or mechanical locking mechanisms, such as, but not limited to, threads and locating tabs. Further, as one of ordinary skill in the art will readily appreciate, coupling the pipe 800 to the seal cup 700 via welding or a mechanical locking means will provide a strong and robust seal between the pipe 800 and the seal cup 700 and also relatively inexpensive.

FIG. 33 also illustrates the support bar 600 extending longitudinally through the pipe assembly 112 and the filter element 110. As will be appreciated by one of ordinary skill in the art, the support bar 600 can be coupled to any suitable portion of the pipe assembly 112 or pressure vessel assembly (see FIG. 38) by any suitable coupling means generally known in the art such as, but not limited to, welding or a mechanical locking mechanism.

FIG. 41 illustrates a partial cross-section of one embodiment of a filter element 110 and a pipe assembly 112 according to one aspect of the present application. In the illustrated embodiment the pipe assembly 112 does not include a seal cup 700, such as the embodiment illustrated in FIG. 33. Instead, FIG. 41 illustrates the filter element 110 sealingly engaged to form a strong and robust seal directly to the pipe 800 of the pipe assembly 112.

More specifically, FIG. 41 illustrates the annular seal 350 of the filter element 110 is sealingly engaged to the inner wall 870 of the pipe 800 to form a strong and robust seal between the filter element 110 and the pipe assembly 112. Further, as will be readily apparent to those having ordinary skill in the art, the illustrated embodiment may include any of the other features described within the present application and may also be governed by any of the other principles described herein.

FIG. 42 illustrates a partial cross-section of one embodiment of a filter element 110 and a pipe assembly 112 according to one aspect of the present application. In the illustrated embodiment the pipe assembly 112 does not include a seal cup 700, such as the embodiment illustrated in FIG. 33. Instead, FIG. 42 illustrates the filter element 110 sealingly engages to form a strong and robust seal directly to the pipe 800 of the pipe assembly 112.

More specifically, FIG. 42 illustrates the annular seal 350 sealingly engaged to the external wall 875 of the pipe 800 to form a strong and robust seal between the filter element 110 and the pipe assembly 112. Further, as will be readily apparent to those having ordinary skill in the art, the illustrated embodiment may include any of the other features described within the present application and may also be governed by any of the other principles described herein.

Figure 34:
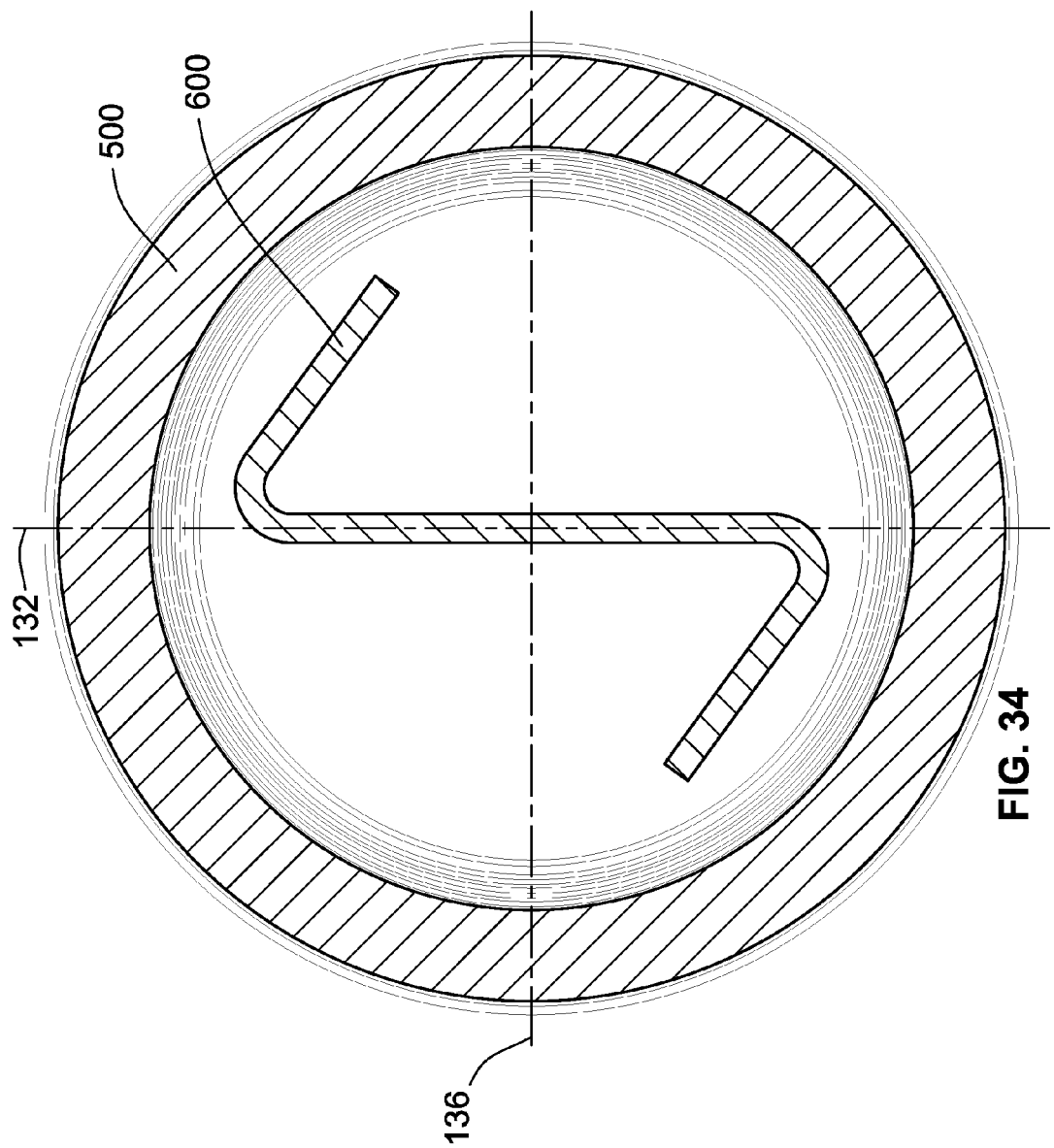
FIG. 34 is a cross-sectional view along line 12 as illustrated in FIG. 33.

FIG. 34 illustrates a cross-section along line 12 of FIG. 33. As illustrated in FIG. 33, line 12 is a cross-section of the filter element 110. The cross-section of the filter element 110 along line 12 shows the support bar 600 surrounded by the tubular ring of filter media 500. Further, FIG. 34 illustrates the transverse axis 132 and an intersecting axis 136 that is on the same plane as the transverse axis 132, but cannot be perfectly parallel with the transverse axis 132.

Figure 35:
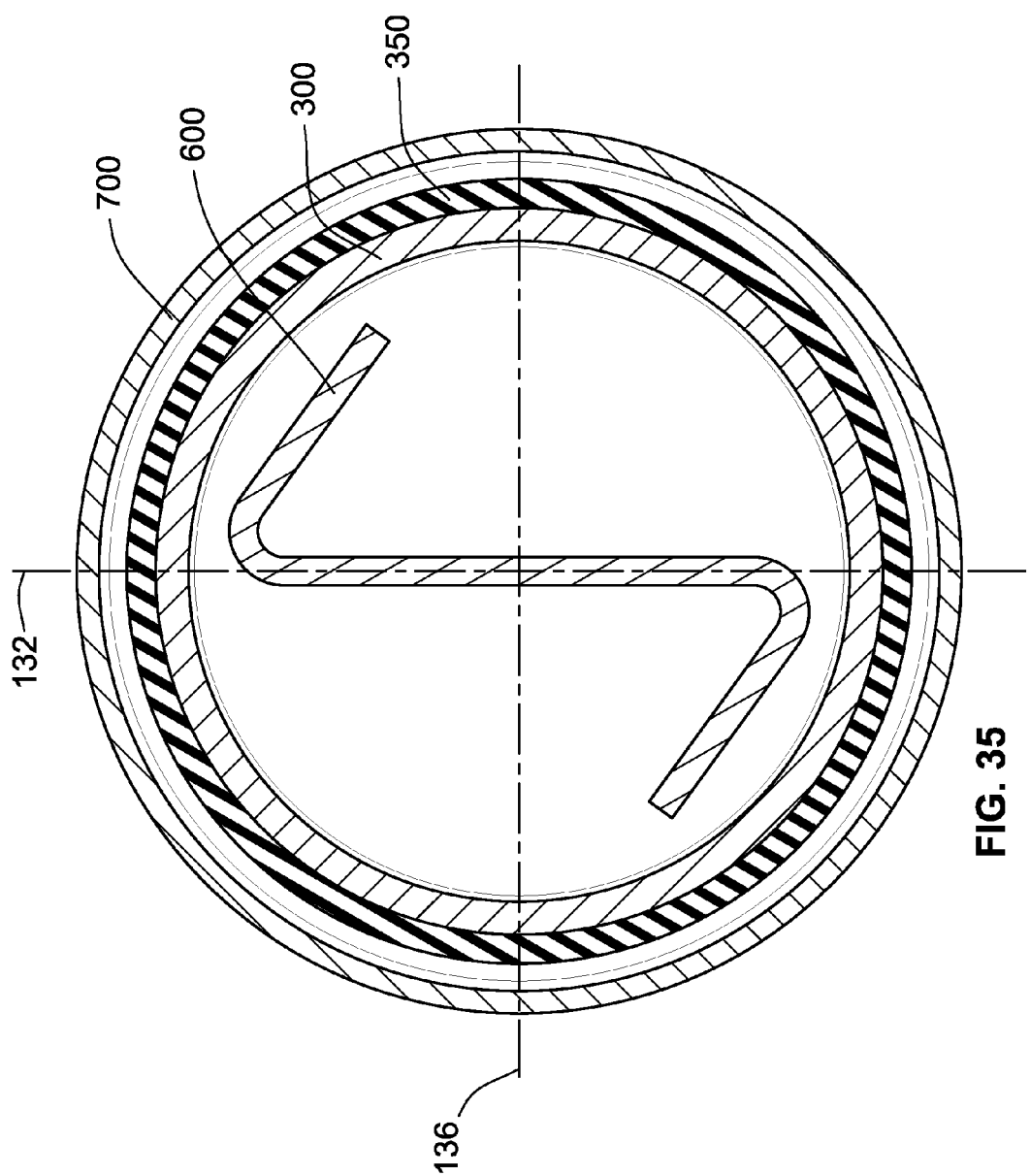
FIG. 35 is a cross-sectional view along line 13 as illustrated in FIG. 33.

FIG. 35 illustrates a cross-section along line 13 of FIG. 33. As illustrated in FIG. 33, line 13 is a cross-section showing the annular seal 350 while it is secured to the seal seat 347 (see FIG. 20) of the second end cap 300. FIG. 35 further illustrates the annular seal 350 sealing engaged to form a strong and robust seal with the sealing cup 700, thereby preventing bypass of contaminated fluids between filter element 110 and the pipe assembly 112.

Figure 36:
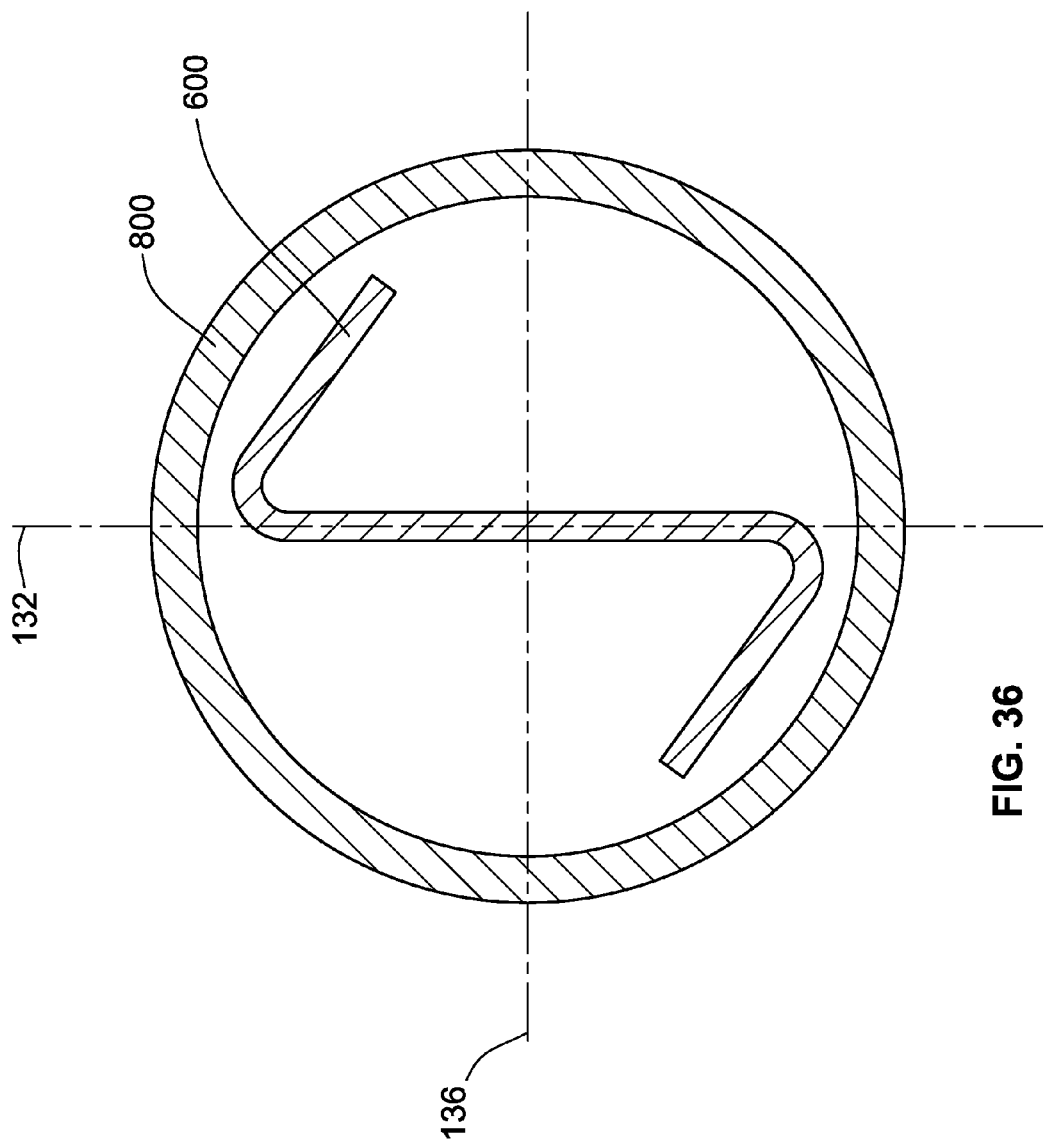
FIG. 36 is a cross-sectional view along line 14 as illustrated in FIG. 33.

FIG. 36 illustrates a cross-section along line 14 of FIG. 33. As illustrated in FIG. 33, line 14 is a cross-section showing the support bar 600 situated in the pipe 800 of the pipe assembly 112.

Figure 37:
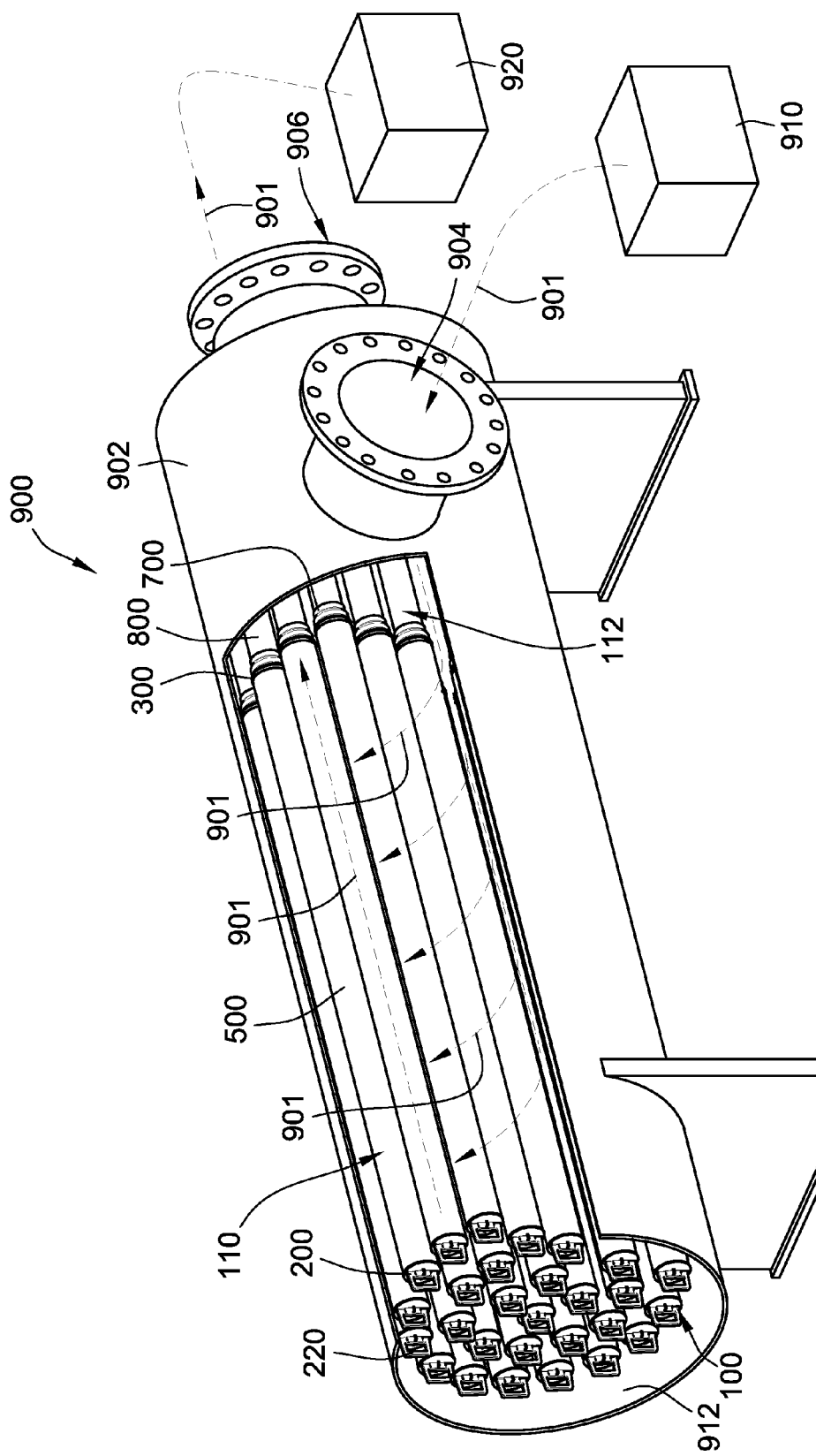
FIG. 37 is a partial perspective cross-sectional view of one embodiment of a pressure vessel assembly according to one aspect of the present application that may employ the filter elements and/or pipe assemblies of any embodiment discussed herein.

FIG. 37 illustrates one embodiment of a pressure vessel assembly 900 according to one aspect of the present application. The pressure vessel assembly 900 has an external shell 902. The external shell 902 of the pressure vessel assembly 900 has an inlet port 904 and an outlet port 906. Contained within the external shell 902 of the pressure vessel assembly 900 are filter elements 110 that are coupled to corresponding pipe assemblies 112.

As illustrated in FIG. 37, the pressure vessel assembly 900 has a high-pressure reservoir 910 that is holding the feed fluid to be filtered by filter elements 110. The high-pressure reservoir 910 will be located before the inlet port 904 along the fluid flow path 901. The pressure vessel assembly 900 will also have a low-pressure reservoir generally indicated as 920. The low-pressure reservoir 920 will be located after the outlet port 906 along the fluid flow path 901. In between the high pressure reservoir 910 and the low-pressure reservoir 920 is the pressure vessel assembly 900, which houses the filter elements 110 when they are installed into or engaged with their corresponding pipe assemblies 112.

Figure 38:
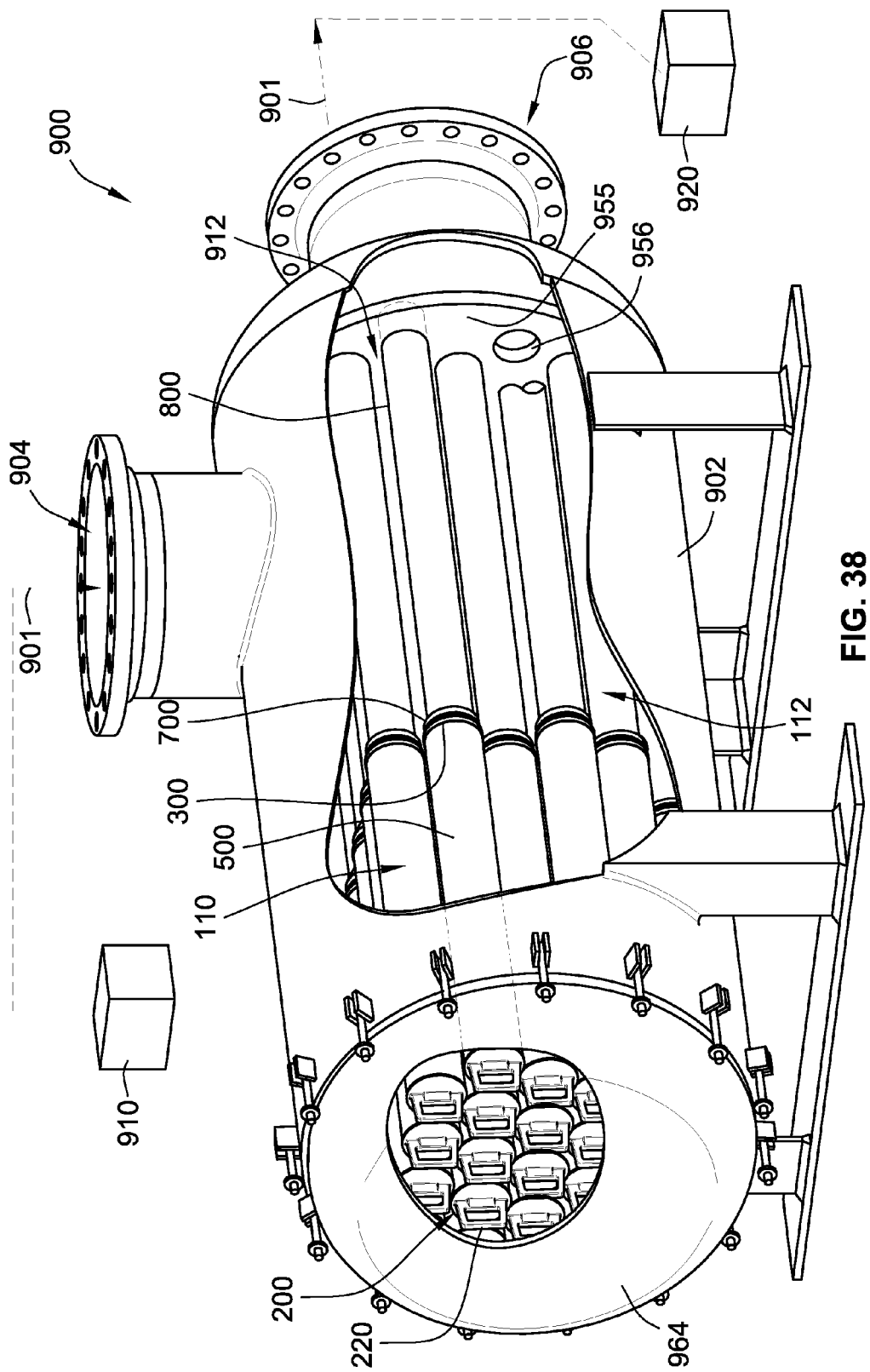
FIG. 38 is partial perspective cross-sectional view of another embodiment of a pressure vessel assembly according to one aspect of the present application that may employ the filter elements and/or pipe assemblies of any embodiment discussed herein.

FIG. 38 illustrates one embodiment of a pressure vessel assembly according to one aspect of the present application. The pipe 800 is shown coupled with an aperture 956 in a partition plate 955. The partition plate 955 can have a multitude of apertures 956 to which a corresponding multitude of pipes 800 may be secured. Typically, the pipes 800 are coupled to their corresponding apertures 956 in the partition plate 955 such that contaminated fluid from the inner space 912 of the pressure vessel assembly 900 cannot leak between the aperture 956 of the partition plate 955 and the pipe 800. The pipes 800 can be, but are not limited to be, coupled to the apertures 956 in the partition plate 955 via any mechanical coupling means generally known in the art, such as, but not limited to, welding.

However, as will be understood by one of ordinary skill in the art, the means for coupling the pipes 800 to the apertures 956 of the partition plate 955 will be dependent on specific operating conditions such as, but not limited to, the materials the pipe 800 and partition plate 955 are made from, the pressure expected within the pressure vessel assembly 900, the contaminated fluid to be filtered or the temperature within the pressure vessel assembly, etc.

Next, the operation of a typical pressure vessel assembly 900 will be explained. According to one embodiment of the present application, a pressure vessel assembly 900 is provided having a multitude of pipe assemblies 112 that are secured to a corresponding number of apertures 956 located on a partition plate 955.

In use, an operator will form a strong and robust seal between the annular seal 350 of each filter element 110 to their corresponding pipe assembly 112. Once the operator has sealing engaged the filter elements 110 to their corresponding pipe assemblies to form a complete and robust seal between the filter elements 110 and the pipe assemblies 112, the operator will increase the pressure in the high pressure reservoir 910 until a predetermined threshold pressure is reached. As will be readily understood by one of ordinary skill in the art, gases and fluids flow from high-pressure environments to low-pressure environments. Once the predetermined threshold pressure is reached within the high pressure reservoir 910, it will force the contaminated fluid to be exit the high pressure reservoir 910 to enter the inlet port 904 of the pressure vessel assembly 900 and to flow into the inner space 912 of the pressure vessel assembly 900.

Once inside the inner space 912, the contaminated fluid will continue to flow towards the low pressure environment of the low pressure reservoir 920 by passing through the tubular ring of filter media 500 of the filter element 110. As the contaminated fluid passes from the inner space 912 of the pressure vessel assembly through the tubular ring of filter media 500 the contaminates in the contaminated fluid are filtered by the filter media 501 such that only filtrate enters the internal cavity 503 of the tubular ring of filter media 500.

Once the filtrate enters the internal cavity 503 of the tubular ring of filter media 500 it will continue to flow axially along the internal cavity 503 of the tubular ring of filter media 500 towards the pipe assembly 112 en route to the low pressure environment of the low pressure reservoir 920. The filtrate will eventually flow axially toward the pipe assembly 112 and enter the pipe 800 after passing through the open end cap 300 that is sealingly engaged to the pipe assembly 112 via the annular seal 350, which acts to prevent filtrate from leaking out of the internal cavity 503 of the tubular ring of filter media 500 and also prevents the leaking of contaminated fluid into the pipe assembly 112 between the filter element 110 and the pipe assembly 112.

As the filtrate continues along its path toward the low pressure environment of the low pressure reservoir 920 it flows axially along the pipe 800 and through the apertures 956 of the partition plate 955 until it reaches the outlet port 906 of the pressure vessel assembly 900. Once the filtrate reaches the outlet port 906 it will finally flow to the low pressure environment of the low pressure reservoir 920 where the operator can harvest the filtrate whose contaminates have been removed via filtering the contaminated fluid through the tubular ring of filter media 500.

As will be appreciated by one of ordinary skill in the art, the operation of the pressure vessel assembly 900 is not meant to be limited solely to the operation described above and it is envisioned that the pressure vessel assembly 900 may be used in any manner generally known in the filtration arts. Indeed, as one of ordinary skill in the art will readily recognize, the pressure vessel assembly 900 can have, but is not limited to have, a mode of operation where the fluid flows in the reverse direction as in the operation of the pressure vessel assembly 900 described above, such that the contaminated fluid enters the internal cavity 503 of the tubular ring of filter media 500 and is then filtered as it exits the tubular ring of filter media 500 leaving only filtrate in the inner space 912 of the pressure vessel assembly 900.

Thus, the pressure vessel assembly 900 governed by the principles of this application may have many different modes of operation or uses and is not meant to be limited to only those modes of operation or uses described herein.

Figure 39:
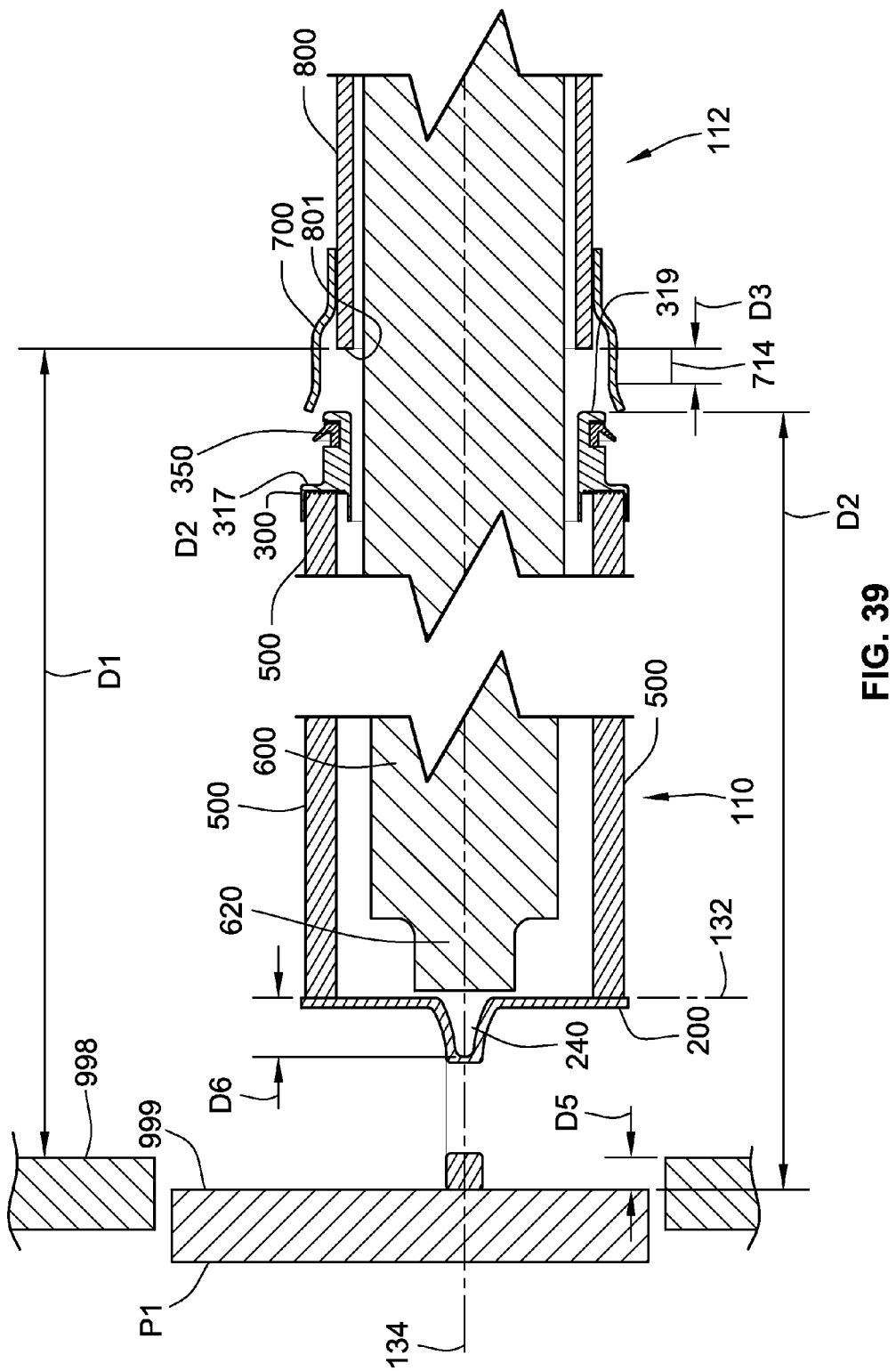
FIG. 39 is a partial side cross-sectional view of one embodiment of a filter element that is not sealingly engaged with one embodiment of a pipe assembly according to one aspect of the present application and further illustrating that according to one aspect of the present application a lid of the pressure vessel assembly, such as either pressure vessel assembly shown in FIG. 38 or 39, in the open position when the filter element is not sealingly engaged with the pipe assembly.

FIGS. 39 and 40 illustrate a partial cross-sectional view of the interior of one embodiment of a pressure vessel assembly 900 (see FIG. 37; see also FIG. 38) and one embodiment of the filter element 110 and pipe assembly 112 according to one aspect of the present application. Further illustrated in FIGS. 39 and 40 is a lid 999 of the pressure vessel assembly 900. The lid 999 being releasabley engageable between an open position P1 (see FIG. 39) and a closed position P2 (see FIG. 40), where when the lid 999 is in the closed position P2 it allows a user to operate the pressure vessel assembly 900.

FIG. 39 illustrates one embodiment of a pressure vessel assembly 900 and a filter element 110, further illustrating that the key 620 of the support bar 600 is not properly inserted into the key receptacle 240 of the filter element 110, thus, the filter element 110 cannot sealingly engage with the pipe assembly 112, therefore, the filter element 110 cannot form a strong and robust seal with the pipe assembly 112. FIG. 39 also illustrates the filter element 110 abutting against the lid 999 thereby causing the lid 999 to remain in the open position, as generally indicated as P1.

FIG. 39 also illustrates the principle that according to one aspect of the present application it is envisioned that D1 is greater than D2, but less than D2 minus D3, where D1 represents a first maximum axial length illustrated as the axial length between the interior surface 998 of a pressure vessel assembly 900 and an axial abutment of the pipe assembly 112; D2 represents a second maximum axial length of one embodiment of a filter element 110; and D3 represents a maximum axial distance of the sealing surface 714 where the filter element 110 can sealing engage the pipe assembly 112 to form a strong and robust seal between the filter element 110 and the pipe assembly 112.

In FIGS. 39 and 40, D1 or the first maximum axial length is represented at one end by the interior surface 998 of the pressure vessel assembly 900 and at the second end the axial abutment of the pipe assembly 112, which is represented as the front end 801 of the pipe 800.

However, as will be understood by those having ordinary skill in the art the D1 or the first maximum axial length is not meant to be limited to the illustrated embodiment and the first maximum axial length D1 can be, but is not limited to, any surface of the pressure vessel or any abutment of the pipe assembly or the pressure vessel that prevents any further axial movement of the filter element 110.

In FIGS. 39 and 40, D2 or the second maximum axial length of the filter element 110 is represented as axial length between the foremost portion of the closed end cap 200 and the rearmost portion represented by the distal end 319 of the open end cap 300.

However, as will be understood by those having ordinary skill in the art, D2 or the second maximum axial length of the filter element 110 is not meant to be limited to the illustrated embodiment and D2 or the second maximum axial length can be, but is not limited to, any surface at the foremost end of the filter element 110 and any surface designed to abut against the pipe assembly 112 or section of the pressure vessel to prevent further axial movement of the filter element 110.

Figure 43:
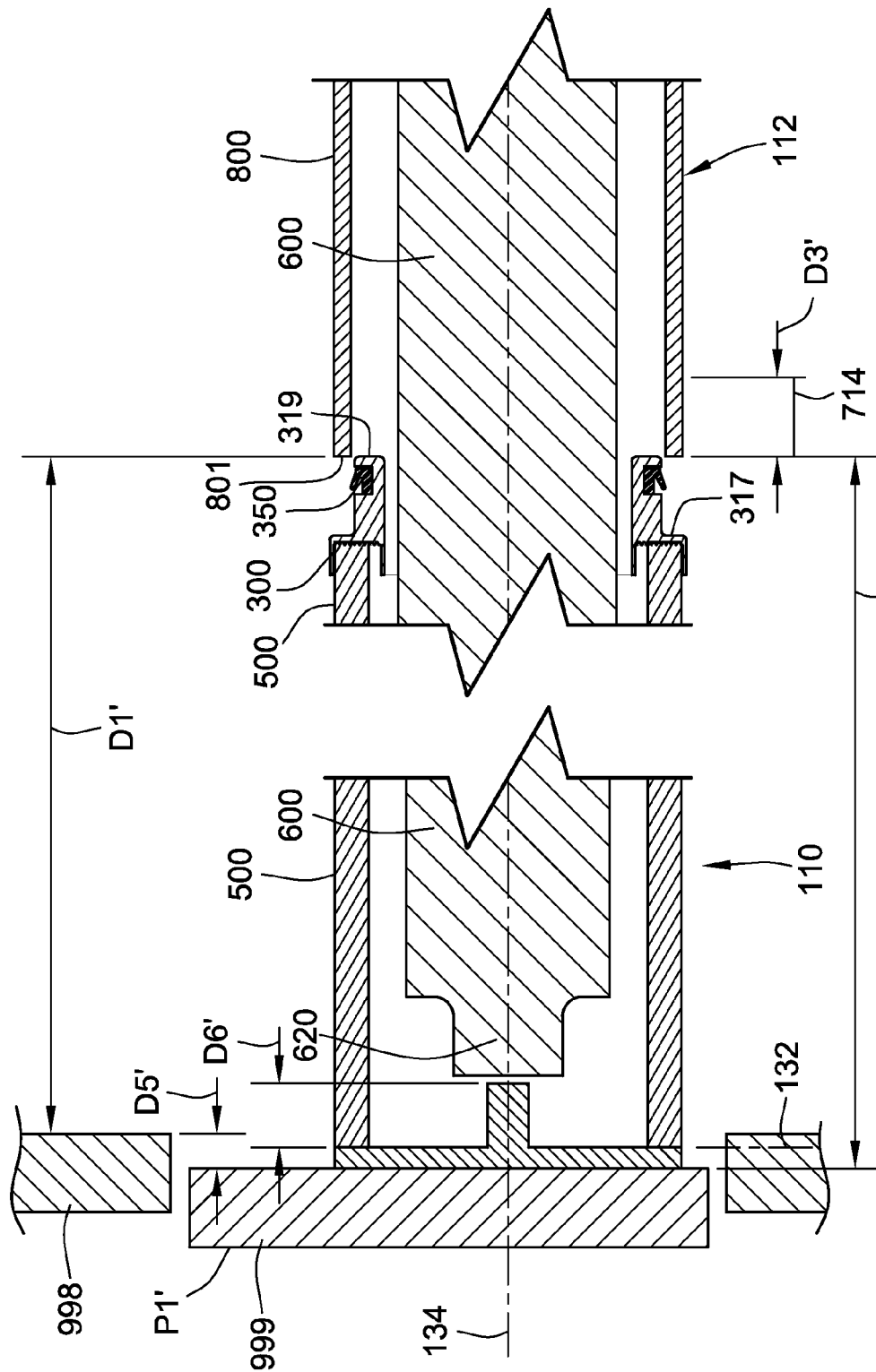
FIG. 43 is a partial cross-sectional view of one embodiment of a filter element that is not sealingly engaged with one embodiment of a pipe assembly inside a pressure vessel assembly according to one aspect of the present application and further illustrating the lid of the pressure vessel assembly according to one aspect of the present application in the open position because the filter element is abutting the lid of the pressure vessel assembly.
Figure 44:
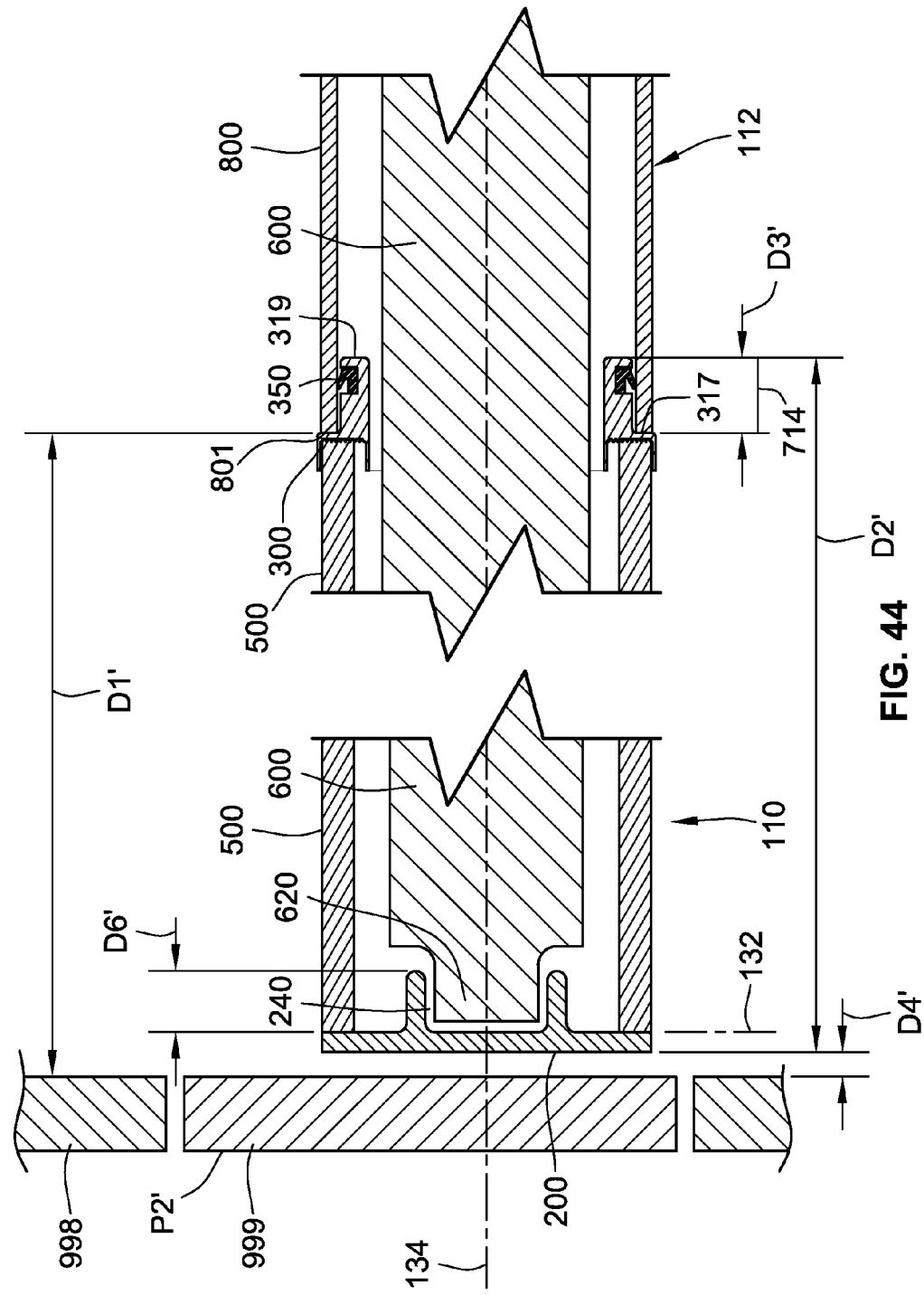
FIG. 44 is a partial cross-sectional view of the FIG. 44 illustrating the filter element sealingly engaged with the pipe assembly inside the pressure vessel assembly according to one aspect of the present application and further illustrating the lid of the pressure vessel assembly in the closed position because the axial movement of the filter element when it sealing engages with the pipe assembly has provided enough clearance for the lid of the pressure vessel assembly to move into the closed position.

For example, in another embodiment D2 can be, but is not limited to, the axial length between a first surface 210 of one embodiment of a closed end cap 200 that does not contain a handle 220 and the distal end 319 of the open end cap 300 (see FIG. 43; see also FIG. 44).

In FIGS. 39 and 40, D3 or the maximum axial distance of the sealing surface between the filter element 110 and the pipe assembly 112 is represented by the axial distance of the annular sealing surface 714 of the sealing cup 700.

However, as will be understood by those having ordinary skill in the art, D3 or the maximum axial distance of the sealing surface 714 is not meant to be limited to the illustrated embodiment and D3 or the maximum axial distance of the sealing surface 714 can be, but is not limited to, any surface of the pipe assembly 112 that provides a sealing surface 714 for the annular seal 350 to form a strong and robust seal against. For example, in one embodiment according to one aspect of the present application D3 can be, but is not limited to, the distance of a sealing surface 714 on the inner wall 870 of the pipe 800 of the pipe assembly 112 (see FIG. 41; see also FIG. 43 and FIG. 44).

In yet another embodiment, D3 can be, but is not limited to, an axial distance of the sealing surface 714 on the external wall 875 of a pipe 800 of one embodiment of a pipe assembly 112 (see FIG. 42).

Next, FIGS. 39 and 40 illustrate the principle that according to one aspect of the present application D2 is less than D1, but D2 is greater than D1 minus D3. Stated differently, FIGS. 39 and 40 illustrate that according to one aspect of the present application D2 or the second maximum axial length of the filter element 110 must be less than D1 or the maximum axial length between the interior 998 of a pressure vessel and an axial abutment of the pipe assembly, but D2 being less than D1 or the maximum axial length between the interior 998 of a pressure vessel and an axial abutment of the pipe assembly plus D3 or the maximum axial distance of the sealing surface 714 that provides a surface for the annular seal 350 of the filter element 110 to form a strong and robust seal with the pipe assembly 112.

Further, in FIGS. 39 and 40, D6 represents the maximum axial insertion distance of the key receptacle 240. Additionally, in FIG. 39, D5 represents the distance between the open position P1 of the lid 999 and the closed position P2 of the lid 999. Finally, as illustrated in FIG. 40, D4 represents the clearance distance between the filter element 110 and the lid 999 when the lid 999 is in the closed position P2.

As will be appreciated by one of ordinary skill in the art, such an arrangement requires that the key 620 of the support bar 600 be properly inserted into the key receptacle 240 of the closed end cap 200 because if the key 620 is not inserted into the key receptacle 240, then the lid 999 will not be able to be moved into its closed position P2 that is flush with the interior surface 998 of the pressure vessel assembly 900. Thus, as illustrated in FIG. 39, the foremost end of the closed end cap 200 of the improperly inserted filter element 110 will abut against the lid 999 and prevent the lid 999 from moving into its closed position P2 (see FIG. 40).

Therefore, according to one principle of the present application it is envisioned that an operator will be prevented from using the pressure vessel assembly 900 if all of the filter elements 110 are not properly inserted with their corresponding pipe assemblies 112 and have formed a strong and robust seal with their corresponding pipe assemblies 112 because if the lid 999 remains in the open position P1 the pressure vessel assembly 900 will be incapable of creating the pressure gradient required to force the contaminated fluid from the high pressure reservoir 910 through the filter elements 110 and then force the filtrate into the low pressure reservoir 910 for harvesting (see FIG. 37; see also FIG. 38).

Further, according to another aspect of the present application, if the lid 999 can be moved to the closed position P2 then the operator knows that the key 620 has been inserted into the key receptacle 240, thus, the filter element 110 has formed a strong and robust seal with the pipe assembly 112 because if the key 620 has not been properly inserted into the key receptacle 240 then the key 620 will abut against the closed end cap 200 to prevent any further axial movement of the filter element 110, which will prevent the operator from moving the lid 999 to the closed position P2.

Therefore, according to one aspect of the present application it is envisioned that when D2 is less than D1, but D2 is greater than D1 minus D3 that the operator will be provided a positive indication that all of the filter elements 110 are properly inserted to form a strong and robust seal to their corresponding pipe assemblies 112 if the operator is capable of moving the lid 999 of the pressure vessel assembly 900 from its open position P1 to its closed position P2.

FIGS. 43 and 44 illustrate a partial cross-section of one embodiment of a pressure vessel assembly 900 and one embodiment of a filter element 110 and pipe assembly 112 according to one aspect of the present application. As illustrated in FIGS. 43 and 44, the filter element 110 has a closed end cap 200 that has a flat first surface 210 and does not include a handle 220 projecting from its first surface 210 as does the embodiment illustrated FIG. 3.

In addition, the illustrated embodiment of the filter element 110 in FIGS. 43 and 44 has a key receptacle 240 outwardly extending from the second surface 211 of the closed end cap 200 instead of the key receptacle 240 inwardly extending into the closed end cap 200 (see FIG. 6).

Furthermore, the embodiment of the pipe assembly 112 illustrated in FIGS. 43 and 44 does not have a seal cup 700, as does the embodiment illustrated in FIG. 39 and FIG. 40. Instead, the annular seal 350 is shown forming a strong and robust seal with the sealing surface 714 located on the interior wall 870 (see FIG. 41) of the pipe 800.

However, as will be readily understood by one having ordinary skill in the art, it is envisioned that the annular seal 350 can form a strong and robust seal with a sealing surface 714 located on the external wall 875 (see FIG. 42) of the pipe 800 that is part of the pipe assembly 112 and still be governed by the principles of the present application.

In addition, FIGS. 43 and 44 also illustrate the principle that according to one embodiment of the present application D2' is greater than D1', but less than D1' plus D3', where D1' is a first maximum axial length between the interior wall 998 of the pressure vessel 900 and an axial abutment of the pipe assembly 112; D2' is a second maximum axial length of the filter element 110; and D3' is the maximum axial distance of the sealing surface 714.

As illustrated in FIGS. 43 and 44 D6' represents the maximum axial insertion length of the key receptacle 240. Additionally, in FIG. 43 D5' represents the distance between the open position P1 of the lid 999 and the closed position P2 of the lid 999. Finally, in FIG. 44 D4' represents the clearance distance between the filter element 110 and the lid 999 when the lid 999 is in the closed position P2'.

Thus, according to one aspect of the present application, the second maximum axial length D2' between the closed end cap 200 and the open end cap 300 of the filter element 110 must be greater than the first maximum axial length D1' represented by the axial length between interior wall 998 of the pressure vessel assembly 900 and the axial abutment, represented by the front end 801 of the pipe 800, but less than D2' plus the maximum axial distance D3', which is represented by the axial distance of the sealing wall 714, which is the axial distance the filter element 110 can be inserted into the pipe 800 to form a strong and robust seal between the annular seal 350 and the interior wall 870 of the pipe 800 before any further axial movement of the filter element 110 is prevented from the distal abutment 317 making contact with the axial abutment, which is represented by the front end 801 of the pipe 800 of the pipe assembly 112.

As discussed above and as will be appreciated by one of ordinary skill in the art, such an arrangement requires the key 620 to be properly received by the key receptacle 240 because if the key 620 is not properly inserted into the key receptacle 240 then the lid 999 will be unable to move from the open position P1 to the closed position P2 (see FIG. 44).

As also discussed above, using such an arrangement an operator will be unable to use the pressure vessel assembly 900 if the lid 999 is not moved to the closed position P2 because it will not be possible to create a sufficient pressure gradient between the high pressure reservoir 910 and the low pressure reservoir 920 to force the contaminated fluid through the tubular ring of filter media 500 of the filter element 110 and then force the fluid into the low pressure reservoir 920 to be harvested (see FIG. 37; see also FIG. 38).

Furthermore, as also described above, if the operator is able to close the lid 999 then the operator knows that the key 620 is properly inserted into the key receptacle 240, thus, each of the filter elements 110 must be forming a strong and robust seal with their corresponding pipe assemblies 112 within the pressure vessel assembly 900.

As will be further appreciated by those of ordinary skill in the art, a pressure vessel assembly 900 according to one embodiment of the present application may have a multitude of filter elements 110 that must be properly inserted into a multitude of corresponding pipe assemblies 112 before the lid 999 of the pressure vessel assembly 900 can move to closed position P1. Therefore, if the operator is capable of closing the lid 999 of the pressure vessel assembly 900 then the operator knows that all of the filter elements 110 are properly inserted and have formed a strong and robust seal with each of their corresponding pipe assemblies 112.

As will be appreciated by one of ordinary skill in the art, this prevents the operator from having to check each filter element 110 to ensure that the key 620 has been properly inserted into the key receptacle 240 because the operator knows that if the lid 999 is capable of being closed then each of the keys 620 is correctly inserted into its corresponding key receptacle 240, which means that each of the filter elements 110 has formed a strong and robust seal with each of their corresponding pipe assemblies 112.

As one of ordinary skill in the art will readily appreciate, the principles described above are not limited to pressure vessel assemblies 900 with back flow plates 964 or lids 999. Indeed, it is conceived that the principles of this application can be applied to any lid, aperture, or opening of a pressure vessel assembly 900 or any other filter system or apparatus, such as, but not limited to pressure vessel assemblies 900 having a flat head closures.

Next, a few of the advantages the subject matter disclosed in the present application has over the prior art will be discussed. Typically, prior art filter element sealing assemblies included a filter element-sealing seat welded to a flow pipe, a support bar, a threaded bolt, seal plate, nut, washer, and gasket. In addition, typical flow pipes in the prior art would be welded to a support plate that is welded to the pressure vessels inside surface. The support plate will separate the pressure vessel's first stage from its second stage and will act as a stopping point designed to force the unfiltered gas through the filter elements sealed on the filter element sealing assembly. The filter element slides over a "z" shaped support bar.

Once fully engaged, the filter element seal gasket will contact the sealing assembly. Next, a seal plate will be installed and pressed up against the filter element's opposite end, followed by a gasket, washer, and sealing nut. The sealing nut will be tightened to compress the sealing plate against the filter element and the filter element against the sealing seat. The process to replace a typical filter element in the prior art is normally slow, but provides a positive seal of the filter element preventing contaminant bypass.

Furthermore, the replacement and installation process in the prior art is dependent on the operator following instructions, including properly installing the filter element and the associated hardware. For example, the operator needs to apply the appropriate amount of torque to the sealing nut to form a positive seal between the filter element and the sealing seat. If the operator over-torques the sealing nut and the filter element compresses the support core to the point that it bends and loses contact with its sealing surface. Once the contact is lost between the support core and the sealing surface it will allow contaminants to bypass the filter media. As torque wrenches are not normally available to the operator, it leaves trying to determine the narrow sealing torque gap up to the operator's feel and judgment. This makes the improper installation of the filter element assembly a possible occurrence that could result in contaminants being able to bypass the filter media.

Next, according to one aspect of the present application a typical method of removing and replacing one embodiment of a filter element 110 from one embodiment of a pipe assembly 112 located in one embodiment of a pressure vessel assembly 112 will be discussed. In typical use, the filter element 110 will be attached to a pipe assembly 112 located within the interior of a pressure vessel assembly 900. Many, but not all, pressure vessel assemblies 900 have a back flow plate 964 or a lid 999 that is removably coupled to the pressure vessel assembly 900 and can be removed to expose the filter element(s) 110 located within the inner space 912 of the pressure vessel assembly 900.

Once the back flow plate 964 or lid 999 is removed, an operator can grasp the closed end cap 200 of the filter element 110 and apply a linear force on the filter element 110 in a direction away from the pipe assembly 112. Once the operator applies enough linear force on the filter element 110 in a direction away from the pipe assembly 112 it will cause the annular seal 350 to unseat and uncouple from the portion of the pipe assembly 112 it has formed a strong and robust seal against. Once the used filter element 110 has been unseated and uncoupled from the pipe assembly 110, the operator will continue to apply a linear force on the filter element 110 in a direction away from the pipe assembly 112 until the filter element 110 has been removed from the pressure vessel assembly 900 through the back flow plate 964 or lid 999. After disposing of the used filter element 110, the operator will begin the process of installing a new filter element 110 into the pipe assembly 112 that has been left exposed from the removal of the used filter element 110.

The operator will position the new filter element 110 into the pressure vessel assembly 900 through the back flow plate 964 or lid 999 so that the open end cap 300 of the filter element 110 is the first section of the filter element 110 to enter the back flow plate 964 or lid 999. The operator will then align the filter element 110 so that the support bar 600 enters the flow opening 305 of the open end cap 300. Once the operator has the support bar 600 positioned within the flow opening 305 of the open end cap 300, the operator will apply an axial force to the closed end cap 200 of the new filter element 110 until the filter element 110 slides along the support bar 600 and abuts the pipe assembly 112.

As will be understood by one of ordinary skill in the art, as the axial force to the closed end cap 200 is applied to the filter element 110 the filter element 110 is propped up by the support bar 600 that entered the filter element 110 through the flow opening 305 of the open end cap 300 and enters the tubular ring of filter media 500 as the operator applies axial force to the closed end cap 200 of the filter element 110.

Once the operator has positioned the new filter element 110 to abut the pipe assembly 112, the operator will then need to position the annular seal 350 so that a strong and robust seal is formed between the new filter element 110 and the pipe assembly 112. In one embodiment the annular seal 350 of the filter element 110 may form a strong and robust seal with the seal cup 700 of the pipe assembly 112 (see FIG. 33).

In another embodiment, the annular seal 350 of the filter element 110 may form a strong and robust seal with an inner wall 870 of the pipe 800 of the pipe assembly 112 (see FIG. 41).

In still yet another embodiment the annular seal 350 of the filter element 110 may form a strong and robust seal with an external wall 875 of the pipe 800 of the pipe assembly 112 (see FIG. 42).

As will be understood by those of ordinary skill in the art, the position or sealing means is not meant to be limited to the above examples and it is conceived that any portion of the filter element 110 may form a strong and robust seal with any portion of the pipe assembly 112 and that any sealing means generally known in the art may be used to form the strong and robust seal between the filter element 110 and the pipe assembly 112.

Once the operator has positioned the filter element 110 at least partially within the pressure vessel assembly 900 so that the open end cap 300 abuts pipe assembly 112, the operator will align the key receptacle 240 on the filter element 110 with the key 620 on the support bar 600, which ensures that a strong and robust seal is formed between the new filter element 110 and the pipe assembly 112.

In one embodiment, the key receptacle 240 may be located on the closed end cap 200 and the key 600 may be located on the support bar 600. However, as will be appreciated by one of ordinary skill in the art, the position of the key receptacle 240 and the key 600 is not meant to be limited to the above embodiment. Indeed, it is envisioned that the key receptacle 240 may be located by at any suitable position on the filter element 110, support bar 600, or pipe assembly 112. Likewise, it is envisioned that the key 600 may be located on at any suitable position on the filter element 110, the support bar 600, or the pipe assembly 112.

However, according to one aspect of the present application, when the key 620 is located on the support bar 600 or pipe assembly 112 the key receptacle 240 must be located on the filter element 110 and when the key 620 is located on the filter element 110 the key receptacle 240 must be located on either the support bar 600 or the pipe assembly 112.

In one embodiment according to one aspect of the present application where the key receptacle 240 is located on the closed end cap 200 of the filter element 110 and the key 600 is located on the support bar 600, the operator may have to rotate the filter element 110 while the open end cap 300 of the filter element 110 abuts the seal cup 700 of the pipe assembly 112 until the key 600 and the key receptacle 240 are aligned along the same axis such as, but not limited to, the transverse axis 132 or the intersecting axis 136, so that the key 600 may enter the key receptacle 240 when the operator applies enough axial force on the closed end cap 200, such that filter element 110 shifts towards the pipe assembly 112 and the annular seal 350 on the filter element 110 forms a strong and robust seal with the pipe assembly 112, thereby preventing any bypass of fluids between the filter element 110 and the pipe assembly 112 when the pressure vessel assembly 900 is in operation.

According to one embodiment of the present application the key 620 will only enter the key receptacle 240 if a strong and robust seal has been formed between the filter element 110 and the pipe assembly 112. This eliminates any of the guess work by the operator installing the filter element 110 into the pipe assembly 112 because if the key 620 engages the key receptacle 240 the operator knows that the filter element 110 has formed a strong and robust seal with the pipe assembly 112, thereby, eliminating the need for the operator to try and determine if the filter element 110 has been installed into the pipe assembly 112 correctly.

In addition, this provides the operator with a positive indication that the filter element 110 has engaged with the pipe assembly 112 to form a strong and robust seal between the filter element 110 and the pipe assembly 112. Therefore, the operator need not worry about any inadvertent flow of contaminated fluid between the seal formed between the filter element 110 and the pipe assembly 112 if the key 620 has been received by the key receptacle 240.

According to one aspect of the present application, an operator may install the filter element 110 into a pressure vessel assembly 900 having a back flow plate 964 or lid 999. According to the one aspect of the present application when an operator installs the filter element 110, the operator will only be able to close the back flow plate 964 or lid 999 of the pressure vessel assembly 900 if the filter element 110 has formed a strong and robust seal with the pipe assembly 112.

Therefore, the operator is given a positive indication that each of the filter elements 110 are properly engaged and have formed a strong and robust seal with each of their respective pipe assemblies 112 if the back flow plate 964 or lid 999 of the pressure vessel assembly 900 is capable of closing.

Likewise, if the back flow plate 964 or lid 999 of the pressure vessel assembly 900 cannot close, the operator knows that at least one of the filter elements 110 has not properly engaged with and formed a strong and robust seal with at least one of the pipe assemblies 112.

Further, because the back flow plate 964 or lid 999 of the pressure vessel assembly 900 cannot close until all of the filter elements 110 have formed a strong and robust seal with their respective pipe assemblies 112 it prevents the operator from using the pressure vessel assembly 900 until each of the filter elements 110 has formed a strong and robust seal with each of their respective pipe assemblies 112 because the back flow plate 964 or lid 999 must be closed in order to create the high pressure environment needed within inner space 912 of the pressure vessel assembly 900 to force the contaminated fluid through the tubular ring of filter media 500 where the contaminant will be removed from the fluid.

Therefore, the operator knows that if he is able to close the back flow plate 964 or lid 999 of the pressure vessel assembly 900 that all of the filter elements 110 are engaged with their respective pipe assemblies 112, thus, the operator knows that when the pressure vessel assembly 900 is turned on all of the contaminated fluid must bypass the tubular ring of filter media 500 to exit the pressure vessel assembly 900.

As used herein "Key" refers to a small piece of shaped metal of the support or other such body with a configuration to fit the wards of a particular lock such as any of the "key receptacles" disclosed herein to allow for installation. A "key receptacle" may also be referred to as a "lock" and is configured and sized to receive the key.

Preferably, the key and/or the key receptacle (i.e. lock) are aligned and intersect the central axis.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to one of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element, comprising:
   a tubular ring of filter media extending axially along a central axis between front and rear ends, the tubular ring of media defining an inner cavity;
   an open end cap secured to the front end, the open end cap defining an opening;
   an annular seal mounted to the open cap in surrounding relation of the open end cap,
   a closed end cap secured to the rear end and enclosing the inner cavity at the rear end, the closed end cap having an internal surface along the inner cavity and an external surface facing away from the inner cavity;
   a key receptacle arranged along or proximate to the internal surface facing the inner cavity; and
   an annular well structure with inner and external annular walls projecting from a disc portion of the annular well structure of the open end cap, the tubular ring telescopically received by the well structure and bonded within the annular well structure.

2. The filter element of claim 1, wherein the key receptacle is spaced from the tubular ring of filter media and intersects the central axis.

3. The filter element of claim 2, wherein the key receptacle is formed by a continuous or discontinuous surrounding wall defining a slot that extends along a transverse axis that is perpendicular to the central axis, the slot intersecting the central axis.

4. The filter element of claim 1, wherein the rear end is integrally welded to a closed end wall of the closed end cap and wherein the key receptacle is formed by a continuous wall defining a slot that projects from the closed end wall and away from the front end.

5. The filter element of claim 1, wherein the closed end cap has an imperforate central region covering the inner cavity without any holes therein thereby preventing fluid communication through the closed end cap.

6. The filter element of claim 1, wherein the closed end cap further comprises a handle projecting from the external surface that is opposite the key receptacle, the key receptacle extending along a transverse axis extending perpendicularly to the central axis, the handle being aligned with the transverse axis.

7. The filter element of claim 1, wherein a maximum axial length is defined between the open end cap and the closed end cap, wherein the maximum axial length is between 12 and 84 inches.

8. A pressure vessel assembly comprising:
a pressure vessel comprising:
an external shell having an inlet port and an outlet port;
a partition plate dividing the shell into an inlet side fluidly connected to the inlet port and an outlet side fluidly connected to the outlet port;
the partition plate defining a hole; and
a pipe assembly defining an annular sealing wall; and
a filter element according to claim 4, further comprising;
an aligning means integrated into the filter element for aligning the annular seal of the filter element to form a proper sealing relationship with the annular sealing wall of the pipe assembly.

9. A pressure vessel assembly comprising:
a pressure vessel comprising:
an external shell with a back flow plate or a lid of the external shell; and
a filter element according to claim 1;
wherein the back flow plate has a close proximal relationship to the closed end cap; and
wherein a support bar has a key located within the pressure vessel assembly;
whereby the closed end cap interferes with the closure of the back flow plate or lid unless the key of the support bar is inserted into the key receptacle of the closed end cap.

10. A method for installing a filter element into a pressure vessel, comprising:
pushing a filter element according to claim 1 along a central axis into sealing engagement with the pressure vessel, the pressure vessel having an annular sealing wall that engages with the annular seal of the filter element;
installing the filter element over a support bar with the support bar being received into the internal cavity of the filter element; and
closing a back flow plate or lid of the pressure vessel that is arranged in spaced relation to the sealing engagement and over an end of the filter element, wherein the flow plate or lid will not properly close if the filter element is not properly in sealing engagement.

11. The method of claim 10, further comprising:
keying a key and the key receptacle between the filter element and the support bar to allow for installing, wherein if the keying is not conducted, the flow plate or lid will not properly close.

12. The method of claim 11, further comprising:
rotating the filter element to facilitate the keying, wherein the support bar includes the key that rides along the end cap and outside of the key receptacle until rotated into alignment with the key receptacle.

13. The method of claim 11, wherein the key comprises a necked down end portion projecting at the terminating end of the support bar.

14. The method of claim 10, wherein the annular seal is a radial seal; and
wherein the annular sealing wall has a sealing surface extending over an axial span to allow the filter to slide in sealing engagement.

15. The method of claim 14, wherein the sealing wall is sized such that when the back flow plate or lid is properly closed the filter element can slide along the sealing wall over a range of axial movement in sealing engagement with the sealing wall and will engage the flow plate or lid that acts as a stop to limit the movement of the filter element within the range of axial movement to ensure proper sealing engagement.

16. A filter element, comprising:
a tubular ring of filter media extending axially along a central axis between front and rear ends, the tubular ring of media defining an inner cavity;
an open end cap secured to the front end, the open end cap defining an opening,
an annular seal mounted to the open end cap in surrounding relation of the open end cap;
a closed end cap secured to the rear end and enclosing the inner cavity at the rear end, the closed end cap having an internal surface along the inner cavity and an external surface facing away from the inner cavity;
a key receptacle arranged along or proximate to the internal surface facing the inner cavity; and
wherein the closed end cap further comprises a handle projecting from the external surface that is opposite the key receptacle, the key receptacle extending along a transverse axis extending perpendicularly to the central axis, the handle being aligned with the transverse axis the handle defining a loop structure secured to a closed end wall of the closed end cap and defining a through opening sized to be grasped.

17. A pressure vessel assembly, comprising:
a filter element comprising:
a tubular ring of filter media extending axially along a central axis between front and rear ends, the tubular ring of media defining an inner cavity;
an open end cap secured to the front end, the open end cap defining an opening;
an annular seal mounted to the open end cap in surrounding relation of the open end cap;
a closed end cap secured to the rear end and enclosing the inner cavity at the rear end, the closed end cap having an internal surface along the inner cavity and an external surface facing away from the inner cavity; and
a key receptacle arranged along or proximate to the internal surface facing the inner cavity; and
a pressure vessel comprising:
an external shell having an inlet port and an outlet port;
a partition plate dividing the shell into an inlet side fluidly connected to the inlet port and an outlet side fluidly connected to the outlet port; the partition plate defining a hole;
a pipe assembly connected to the hole and including a pipe extending into at least one of the inlet and outlet sides; the pipe assembly including an annular axial abutment and an annular sealing wall extending from the axial abutment an axial distance and in surrounding relation of the axial abutment; and
a support bar fixed relative to the pipe assembly and extending concentrically relative to the annular sealing wall and axially away from the axial abutment, and
the tubular ring of media being received on the support bar with the support bar projecting into the inner cavity;
the support bar projecting through the opening; and
the annular seal sealing against an inner peripheral surface of the annular sealing wall in a fully installed position.

18. The pressure vessel assembly of claim 17, further comprising a back flow plate or lid arranged in axial spaced relation to the axial abutment and separated thereby by a first maximum axial length in a closed position;
    wherein the back flow plate or lid is moveable from the closed position to an open position, the filter element being installable and removable from the pressure vessel when in the open position; and
    wherein the back flow plate or lid will not transition to the closed position when the filter element is installed in the pressure vessel without the annular seal sealing on the annular sealing wall.

19. The pressure vessel assembly of claim 18, wherein a second maximum axial length is defined as the axial length between the open end cap and the closed end cap;
    a maximum axial distance defined as the axial distance of the annular sealing wall; and
    wherein the second maximum axial length being less than the first maximum axial length and being no less than the first maximum axial length minus the axial distance.

20. The pressure vessel assembly of claim 17, wherein the support bar has a key;
    wherein the key receptacle and the key provide a positive visual indication of a full seal engagement between the annular seal and the sealing wall, due to the full insertion of the key within the key receptacle.

21. The pressure vessel assembly of claim 17, wherein the support bar has a key;
    wherein the closed end cap has a handle;
    wherein the closed end cap has an axis of rotation that is 360° ; and
    wherein a full seal engagement between the annular seal and the sealing wall can be determined by the location of the handle about its 360° axis of rotation.

22. The pressure vessel assembly of claim 17, wherein the support bar includes a key;
    wherein engagement of the key and the key receptacle positions the annular seal perpendicularly to the annular sealing wall, thereby ensuring a maximum compression of the annular seal against the annular sealing wall.

23. A method of using the filter element in the pressure vessel assembly of claim 17, comprising the step of aligning the key receptacle with a key located on the support bar by rotating the closed end cap until the key receptacle is aligned with the key and is stationary along a transverse axis.

24. The method of claim 23, further comprising the step of providing an axial force to the closed end cap, whereby the axial force moves the filter element in a longitudinal direction toward a pipe assembly urging the key into the key receptacle.

25. The method of claim 24, further comprising the step of inserting the closed end cap into a seal cup defining the sealing wall causing the annular seal to contact the sealing wall, thereby creating a seal that prevents fluid from leaking between the closed end cap and the annular sealing wall.

26. A pressure vessel assembly comprising:
    a pressure vessel comprising:
        an external shell having an inlet port, and an outlet port;
        a partition plate dividing the shell into an inlet side fluidly connected to the inlet port and an outlet side fluidly connected to the outlet port;
        the partition plate defining a hole;
        a pipe assembly connected to the hole and including a pipe extending into at least one of the inlet and outlet sides, the pipe assembly including an annular axial abutment and an annular sealing wall extending from the axial abutment a maximum axial distance and in surrounding relation of the axial abutment; and
        a support bar secured to the pipe assembly and extending concentrically relative to the annular sealing wall and axially away from the axial abutment, and a back flow plate or lid arranged in axial spaced relation to the axial abutment and separated thereby by a first maximum axial length in a closed position;
    a filter element comprising:
        a tubular ring of filter media extending axially along a central axis between front and rear, the tubular ring of media defining an inner cavity;
        an open end cap secured to the front end, the open end cap defining an opening;
        an annular seal mounted to the open end cap in surrounding relation of the open end cap;
        a closed end cap secured to the rear end and enclosing the inner cavity at the rear end, the closed end cap having an internal surface along the inner cavity and an external surface facing away from the inner cavity, and
        a key receptacle arranged along or proximate to the internal surface facing the inner cavity;
    wherein the inner cavity of the tubular ring of media is sized and configured to receive the support bar;
    wherein the open end cap defines an opening that is sized and configured to receive the support bar;
    wherein the annular seal has an outer periphery sized to be received and seal against the annular sealing wall; and
    wherein a second maximum axial length is defined as the axial length between the open end cap and the closed end cap; and
    wherein the second maximum axial length is less than the first maximum axial length, and being no less than the first maximum axial length minus the maximum axial distance.

27. The pressure vessel assembly of claim 26, wherein the closed end cap has an imperforate central region covering the inner cavity without any holes therein, thereby preventing fluid communication through the closed end cap.

28. The pressure vessel assembly of claim 27, wherein the closed end cap includes the key receptacle and receives a key projecting from the support bar at a predetermined angular orientation.

29. The pressure vessel assembly of claim 26, wherein the closed end cap further comprises a handle projecting from a side opposite the key receptacle, the key receptacle extending along a transverse axis extending transverse to the second maximum axial length, the handle being aligned in the transverse axis.

30. The pressure vessel assembly of claim 26, wherein the second maximum axial length is between 12 and 84 inches.

31. A pressure vessel assembly comprising
    a pressure vessel comprising:
        an external shell having an inlet port and an outlet port,
        a partition plate dividing the shell into an inlet side fluidly connected to the inlet port and an outlet side fluidly connected to the outlet port;
        the partition plate defining a hole, and
    a pipe assembly defining an annular sealing wall; and
    a filter element comprising,
        a tubular ring of filter media extending axially along a central axis between front and rear ends, the tubular ring of media defining an inner cavity;

an open end cap secured to the front end, the open end cap defining an opening;

an annular seal mounted to the open end cap in surrounding relation of the open end cap, a closed end cap secured to the rear end and enclosing the inner cavity at the rear end, the closed end cap having an internal surface along the inner cavity and an external surface facing away from the inner cavity; and a key receptacle arranged along or proximate to the internal surface facing the inner cavity, an aligning means integrated into the filter element for aligning the annular seal of the filter element to form a proper sealing relationship with the annular sealing wall of the pipe assembly;

wherein the aligning means of the filter element comprises:
a handle on a first surface of the closed end cap, wherein the handle defines a loop structure that defines a through opening that is sized to be grasped.

32. A pressure vessel assembly comprising:

a pressure vessel comprising;

an external shell having an inlet port and an outlet port;

a partition plate dividing the shell into an inlet side fluidly connected to the inlet port and an outlet side fluidly connected to the outlet port;

the partition plate defining a hole; and a pipe assembly defining an annular sealing wall; and a filter element comprising, a tubular ring of filter media extending axially along a central axis between front and rear ends, the tubular ring of media defining an inner cavity;

an open end cap secured to the front end, the open end cap defining an opening;

an annular seal mounted to the open end cap in surrounding relation of the open end caps;

a closed end cap secured to the rear end and enclosing the inner cavity at the rear end, the closed end cap having an internal surface along the inner cavity and an external surface facing away from the inner cavity, and a key receptacle arranged along or proximate to the internal surface facing the inner cavity;

an aligning means intergrated into the filter element for aligning the annular seal of the filter element to form a proper sealing relationship with the annular sealing wall of the pipe assembly;

wherein the aligning means of the filter element comprises:
the key receptacle and a key located on a support bar; and wherein the closed end cap can be rotated to align the key receptacle with the key, thereby providing the correct alignment of the filter element during installation.

33. A method for installing a filter element into a pressure vessel comprising:

pushing the filter element along a central axis into sealing engagement with the pressure vessel, the filter element comprising:

a tubular ring of filter media extending axially along a central axis between front and rear ends, the tubular ring of media defining an inner cavity;

an open end cap secured to the front end, the open end cap defining an opening an annular seal mounted to the open end cap in surrounding relation of the open end cap, a closed end cap secured to the rear end and enclosing the inner cavity at the rear end, the closed end cap having an internal surface along the inner cavity and an external surface facing away from the inner cavity; and a key receptacle arranged along or proximate to the internal surface facing the inner cavity, the pressure vessel having an annular sealing wall that engages with the annular seal of the filter element;

installing the filter element over a support bar with the support bar being received into the internal cavity of the filter element;

closing a back flow plate or lid of the pressure vessel that is arranged in spaced relation to the sealing engagement and over an end of the filter element wherein the flow plate or lid will not properly close if the filter element is not properly in sealing engagement;

keying a key and the key receptacle between the filter element and the support bar to allow for installing, wherein if the keying is not conducted, the flow plate or lid will not properly close;

rotating the filter element to facilitate the keying, wherein the support bar includes the key that rides along the end cap and outside of the key receptacle until rotated into alignment with the key receptacle, wherein the end cap includes a handle; and further comprising, manipulating the handle to align the key receptacle and the key.

34. The method of claim 33, wherein a plurality of said filter element are installed in the pressure vessel, each having the handle, and wherein when installed properly, all of the handles have a long axis that align in an orientation parallel to each other.

* * * * *

UNITED STATES PATENT AND TRADEMARK OFFICE
CERTIFICATE OF CORRECTION

| | | |
|---|---|---|
| PATENT NO. | : 10,195,558 B2 | Page 1 of 1 |
| APPLICATION NO. | : 14/951869 | |
| DATED | : February 5, 2019 | |
| INVENTOR(S) | : Andrew Dye et al. | |

It is certified that error appears in the above-identified patent and that said Letters Patent is hereby corrected as shown below:

In the Claims

Column 32, Claim 1, Line 32:
The words "an annular seal mounted to the open cap in surrounding" should correctly read --an annular seal mounted to the open end cap in surrounding--

Column 37, Claim 32, Line 39:
The words "rounding relation of the open end caps" should correctly read --rounding relation of the open end cap--

Signed and Sealed this
Eleventh Day of June, 2019

Andrei Iancu
*Director of the United States Patent and Trademark Office*